US011851600B2

(12) United States Patent
Mulcahy et al.

(10) Patent No.: US 11,851,600 B2
(45) Date of Patent: Dec. 26, 2023

(54) POLYMERIZABLE LC MATERIAL AND POLYMER FILM

(71) Applicant: Merck Patent GmbH, Darmstadt (DE)

(72) Inventors: Stephen Mulcahy, Feltham (GB); Owain Llyr Parri, Feltham (GB)

(73) Assignee: Merck Patent GmbH, Darmstadt (DE)

(*) Notice: Subject to any disclaimer, the term of this patent is extended or adjusted under 35 U.S.C. 154(b) by 0 days.

(21) Appl. No.: 17/529,872

(22) Filed: Nov. 18, 2021

(65) Prior Publication Data

US 2022/0162505 A1 May 26, 2022

(30) Foreign Application Priority Data

Nov. 20, 2020 (EP) .................................... 20208857

(51) Int. Cl.

| | |
|---|---|
| ***G02F 1/1333*** | (2006.01) |
| ***C09K 19/38*** | (2006.01) |
| ***C09K 19/58*** | (2006.01) |
| ***G02B 5/30*** | (2006.01) |
| *C09K 19/04* | (2006.01) |

(52) U.S. Cl.

CPC ........ *C09K 19/3866* (2013.01); *C09K 19/586* (2013.01); *G02B 5/3016* (2013.01); *C09K 2019/0448* (2013.01)

(58) Field of Classification Search

CPC ...... G02B 5/30; G02B 5/3016; G02B 5/3083; G02F 1/1333; G02F 1/133528; G02F 1/133711

See application file for complete search history.

(56) References Cited

U.S. PATENT DOCUMENTS

| | | | | |
|---|---|---|---|---|
| 5,389,698 | A | 2/1995 | Chigrinov et al. | |
| 5,602,661 | A | 2/1997 | Schadt et al. | |
| 6,009,758 | A | 1/2000 | Petrich et al. | |
| 6,514,578 | B1 | 2/2003 | Farrand | |
| 6,669,865 | B1 * | 12/2003 | Coates | G02B 5/3016 522/170 |
| 6,717,644 | B2 | 4/2004 | Schadt et al. | |
| 7,038,745 | B2 | 5/2006 | Weber et al. | |
| 7,060,200 | B1 | 6/2006 | Farrand et al. | |
| 7,187,424 | B2 * | 3/2007 | Parri | G02F 1/133636 349/120 |
| 7,597,942 | B2 | 10/2009 | May et al. | |
| 2003/0072893 | A1 | 4/2003 | Nakano et al. | |
| 2005/0035353 | A1 | 2/2005 | Adachi et al. | |
| 2006/0119783 | A1 | 6/2006 | Fukuoka et al. | |
| 2006/0172090 | A1 | 8/2006 | Syundo | |
| 2011/0134020 | A1 | 6/2011 | Jeong et al. | |
| 2015/0175564 | A1 | 6/2015 | Sakamoto et al. | |
| 2015/0277007 | A1 | 10/2015 | Matsuyama et al. | |
| 2017/0369783 | A1 | 12/2017 | Horiguchi et al. | |
| 2018/0006274 | A1 | 1/2018 | Kim et al. | |
| 2018/0120487 | A1 | 5/2018 | Ikeda et al. | |
| 2019/0079236 | A1 * | 3/2019 | Hung | G02F 1/133555 |
| 2022/0162505 | A1 * | 5/2022 | Mulcahy | G02B 27/283 |

FOREIGN PATENT DOCUMENTS

| | | | |
|---|---|---|---|
| EP | 0888565 | A1 | 1/1999 |
| EP | 0940707 | A1 | 9/1999 |
| EP | 1249483 | A1 | 10/2002 |
| EP | 1514316 | A2 | 3/2005 |
| GB | 2315072 | A | 1/1998 |
| GB | 2328207 | A | 2/1999 |
| GB | 2329393 | A | 3/1999 |
| GB | 2388599 | A | 11/2003 |
| WO | 9800428 | A1 | 1/1998 |
| WO | 9804651 | A1 | 2/1998 |
| WO | 0120394 | A1 | 3/2001 |
| WO | 0193652 | A2 | 12/2001 |
| WO | 2008119427 | A1 | 10/2008 |
| WO | 2016104317 | A1 | 6/2016 |
| WO | 2016171041 | A1 | 10/2016 |
| WO | 2016184543 | A1 | 11/2016 |
| WO | 2017079867 | A1 | 5/2017 |

OTHER PUBLICATIONS

Extended European Search Report for European Application No. 21 208 654.0, dated Jul. 22, 2022, 7 pages.

* cited by examiner

*Primary Examiner* — Geraldina Visconti
(74) *Attorney, Agent, or Firm* — RatnerPrestia

(57) ABSTRACT

An optical component and a electro optical devices comprising the optical component. Further, a cholesteric polymerizable liquid crystalline (LC) material, preferably utilized in an optical component in accordance with the present invention, a process for the production of the cholesteric polymerizable LC material, a process to convert the cholesteric polymerizable material into a polymer film, a polymer film obtainable from the cholesteric polymerizable LC material, and the use of the polymer films in an optical component or device comprising a polymer film.

12 Claims, No Drawings

POLYMERIZABLE LC MATERIAL AND POLYMER FILM

CROSS-REFERENCE TO RELATED APPLICATIONS

This application is a U.S. non-provisional application filed under 35 U.S.C. § 111(a), claiming priority under 35 U.S.C. § 119(a) of European Application No. 20208857.1, filed Nov. 20, 2020, the entire contents of which are incorporated herein by reference for all purposes.

TECHNICAL FIELD

The instant invention relates to an optical component and electro optical devices comprising the optical component. The instant invention further relates to a cholesteric polymerizable liquid crystalline (LC) material, preferably utilized in an optical component in accordance with the present invention, to a process for the production of the cholesteric polymerizable LC material, to a process to convert the cholesteric polymerizable material into a polymer film, to a polymer film obtainable from the cholesteric polymerizable LC material, and to the use of the polymer films in an optical component or device comprising a polymer film in accordance with the invention.

BACKGROUND AND PRIOR ART

Organic light emitting diode (OLED) displays require a circular polarizer in the display stack to reduce reflections of external light and increase the ambient contrast ratio. This is because the electrodes in an OLED display are reflective and without the utilization of a circular polarizer, the ambient light reflecting off the electrodes will make it hard to see the image being displayed. The disadvantage of using a circular polarizer for this application is that ~50% of emitted light is blocked from leaving the display by the circular polarizer. This large loss in efficiency can lead to the utilization of more than one emissive layer per colour as well as increased power consumption to make up for the loss in brightness.

For instance US 2005/035353 A1 discloses light emitting displays which produce a bright image by efficiently emitting light radiated from a light-emitting thin-film layer to the viewer side, and also produces a high-quality image of high contrast ratio and changing in color to a limited extent over a wide viewing angle range even in a bright atmosphere. The light emitting displays are provided with a plurality of light-emitting devices, each device having a light-emitting thin-film layer and a light reflective surface in this order on the back side, and a circularly polarized light reflective layer which separates incident light into two types of circularly polarized components, one being reflected and the other transmitted by the reflective layer, an optical compensation layer, a quarter-wave plate and a polarizer on the front side, wherein the optical compensation layer is composed of a transparent body working as an optical indicatrix having little refractive index distribution in the in-plane direction and having a refractive index in the thickness direction different from that in the in-plane direction.

US 2018/006274 A1 discloses an optical member for enhancing luminance and an organic light-emitting display device having the same. An optical member includes: a linear polarizer, a blue cholesteric liquid crystal (CLC) layer configured to transmit light, the light having only one of: a left-handed circularly polarized light component and a right-handed circularly polarized light component, and a quarter wave plate configured to convert the transmitted light, having the left-handed circularly polarized light component or right-handed circularly polarized light component, into linear polarized light, wherein the blue cholesteric liquid crystal (CLC) layer and the quarter wave plate are located on a same side of the linear polarizer.

US 2011/134020 A1 discloses an organic light emitting diode display is disclosed. The display includes a first semitransparent electrode, an organic emissive layer placed on the first semitransparent electrode, a second semitransparent electrode placed on the organic emissive layer, and a first selective reflection layer placed on the second semitransparent electrode.

EP 1514316 A1 discloses An electroluminescent device, such as a light emitting diode, which has a light-reflecting surface causing undesirable reflection of ambient light incident on the device is provided with a combination of a reflective circular polarizer and an absorbing circular polarizer to suppress the undesirable reflection of ambient light thus improving the contrast of the device when used under high intensity ambient lighting conditions while maintaining a satisfactory brightness. The reflection band of the reflective circular polarizer regions of the reflective circular polarizer are preferably tuned to the corresponding emission band of the luminescent regions of the electroluminescent device to further increase the contrast of the device while substantially maintaining the same brightness.

The above-mentioned approaches are effective for each emissive pixel; however, an OLED is typically pixelated into three (or sometimes more) pixels and only parts of the surface area contain a blue emitter. Although the blue reflecting layer helps to increase the transmission of the blue, it also increases the reflectance because both the left-handed and right-handed portion of the external ambient unpolarized light are able to be reflected from the OLED emitter surface in such a way that it is transmitted through the linear polarizer part of the achromatic circular polarizer.

In summary, there is a great demand for improved optical components as well as improved or alternative materials utilized in the optical component.

SUMMARY OF THE INVENTION

Surprisingly, the inventors have found an optical component that does not show the above-mentioned drawbacks and have furthermore found CLC materials that help to further improve these components.

The invention relates to an optical component comprising a linear polarizer, a quarter wave plate and a patterned or structured light reflecting polymer film.

The invention further relates to the use of an optical component as described above and below in an electrooptical device, preferably in an OLED.

The invention further relates to a process for the production of the optical component as described above and below.

The invention further relates to an electrooptical device, preferably an OLED, comprising the optical component as described above and below.

The instant invention further relates to a cholesteric polymerizable liquid crystalline (LC) material as described above and below, to a process for the production of such cholesteric polymerizable LC material and to a process to convert the cholesteric polymerizable material into a polymer film comprising as well as a polymer film obtainable from the cholesteric polymerizable LC material and the use of the polymer films in optical components and optical devices as described above and below, as well as to optical components and optical devices comprising such polymer film.

TERMS AND DEFINITIONS

As used herein, the term "polymer" will be understood to mean a molecule that encompasses a backbone of one or more distinct types of repeating units (the smallest constitutional unit of the molecule) and is inclusive of the commonly known terms "oligomer", "copolymer", "homopolymer" and the like. Further, it will be understood that the term polymer is inclusive of, in addition to the polymer itself, residues from initiators, catalysts, and other elements attendant to the synthesis of such a polymer, where such residues are understood as not being covalently incorporated thereto. Further, such residues and other elements, while normally removed during post polymerisation purification processes, are typically mixed or co-mingled with the polymer such that they generally remain with the polymer when it is transferred between vessels or between solvents or dispersion media.

The term "polymerisation" means the chemical process to form a polymer by bonding together multiple polymerizable groups or polymer precursors (polymerizable compounds) containing such polymerizable groups.

The terms "film" and "layer" include rigid or flexible, self-supporting or freestanding films with mechanical stability, as well as coatings or layers on a supporting substrate or between two substrates.

The term "liquid crystal" or "LC" relates to materials having liquid-crystalline mesophases in some temperature ranges (thermotropic LCs) or in some concentration ranges in solutions (lyotropic LCs). They obligatorily contain mesogenic compounds.

The terms "mesogenic compound" and "liquid crystal compound" mean a compound comprising one or more calamitic (rod- or board/lath-shaped) or discotic (disk-shaped) mesogenic groups. The term "mesogenic group" means a group with the ability to induce liquid-crystalline phase (or mesophase) behaviour. The compounds comprising mesogenic groups do not necessarily have to exhibit a liquid-crystalline mesophase themselves. It is also possible that they show liquid-crystalline mesophases only in mixtures with other compounds, or when the mesogenic compounds or materials, or the mixtures thereof, are polymerised. This includes low-molecular-weight non-reactive liquid-crystalline compounds, reactive or polymerizable liquid-crystalline compounds, and liquid-crystalline polymers.

The term "reactive mesogen" means a polymerizable mesogenic or liquid crystal compound, preferably a monomeric compound. These compounds can be used as pure compounds or as mixtures of reactive mesogens with other compounds functioning as photoinitiators, inhibitors, surfactants, stabilizers, chain transfer agents, non-polymerizable compounds, etc.

Polymerizable compounds with one polymerizable group are also referred to as "monoreactive" compounds, compounds with two polymerizable groups as "direactive" compounds, and compounds with more than two polymerizable groups as "multireactive" compounds. Compounds without a polymerizable group are also referred to as "non-reactive or non-polymerizable" compounds.

The Irradiance ($E_e$) or radiation power is defined as the power of electromagnetic radiation (dθ) per unit area (dA) incident on a surface:

$$E_e = d\theta/dA.$$

The radiant exposure or radiation dose ($H_e$), is as the irradiance or radiation power ($E_e$) per time (t):

$$H_e = E_e \cdot t.$$

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "director" is known in prior art and means the preferred orientation direction of the long molecular axes (in case of calamitic compounds) or short molecular axes (in case of discotic compounds) of the liquid-crystalline or RM molecules. In case of uniaxial ordering of such anisotropic molecules, the director is the axis of anisotropy.

The term "alignment" or "orientation" relates to alignment (orientational ordering) of anisotropic units of material such as small molecules or fragments of big molecules in a common direction named "alignment direction". In an aligned layer of liquid-crystalline or RM material the liquid-crystalline director coincides with the alignment direction so that the alignment direction corresponds to the direction of the anisotropy axis of the material.

The terms "uniform orientation" or "uniform alignment" of a liquid-crystalline or RM material, for example in a layer of the material, mean that the long molecular axes (in case of calamitic compounds) or the short molecular axes (in case of discotic compounds) of the liquid-crystalline or RM molecules are oriented substantially in the same direction. In other words, the lines of liquid-crystalline director are parallel.

The term "homeotropic structure" or "homeotropic orientation" refers to a film wherein the optical axis is substantially perpendicular to the film plane.

The term "planar structure" or "planar orientation" refers to a film wherein the optical axis is substantially parallel to the film plane.

The term "negative (optical) dispersion" refers to a birefringent or liquid crystalline material or layer that displays reverse birefringence dispersion where the magnitude of the birefringence (Δn) increases with increasing wavelength (λ). I.e. $|\Delta n\ (450)|<|\Delta n\ (550)|$, or $\Delta n\ (450)/\Delta n\ (550)<1$, where Δn (450) and Δn (550) are the birefringence of the material measured at wavelengths of 450 nm and 550 nm respectively. In contrast, positive (optical) dispersion" means a material or layer having $|\Delta n\ (450)|>|\Delta n\ (550)|$ or $\Delta n\ (450)/\Delta n\ (550)>1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Since the optical retardation at a given wavelength is defined as the product of birefringence and layer thickness as described above [R(λ)=Δn(λ)·d], the optical dispersion can be expressed either as the "birefringence dispersion" by the ratio Δn(450)/Δn(550), or as "retardation dispersion" by the ratio R(450)/R(550), wherein R(450) and R(550) are the retardation of the material measured at wavelengths of 450 nm and 550 nm respectively. Since the layer thickness d does not change with the wavelength, R (450)/R (550) is equal to Δn (450)/Δn (550). Thus, a material or layer with negative or reverse dispersion has R (450)/R (550)<1 or |R (450)|<|R (550)|, and a material or layer with positive or normal dispersion has R (450)/R (550)>1 or |R (450)|>|R (550)|.

In the present invention, unless stated otherwise "optical dispersion" means the retardation dispersion i.e. the ratio R (450)/R (550).

The term "high dispersion" means that the absolute value of the dispersion shows a large deviation from 1, whereas the term "low dispersion" means that the absolute value of the dispersion shows a small deviation from 1. Thus "high negative dispersion" means that the dispersion value is significantly smaller than 1, and "low negative dispersion" means that the dispersion value is only slightly smaller than 1.

The retardation (R(λ)) of a material can be measured using a spectroscopic ellipsometer, for example the M2000 spectroscopic ellipsometer manufactured by J. A. Woollam Co., This instrument is capable of measuring the optical retardance in nanometres of a birefringent sample e.g. Quartz over a range of wavelengths typically, 370 nm to 2000 nm. From this data, it is possible to calculate the dispersion (R(450)/R(550) or Δn(450)/Δn(550)) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, NE, USA). Unless stated otherwise, this method is used to determine the retardation of the materials, films and devices described in this invention.

The term "A plate" refers to an optical retarder utilizing a layer of uniaxially birefringent material with its extraordinary axis oriented parallel to the plane of the layer.

The term "C plate" refers to an optical retarder utilizing a layer of uniaxially birefringent material with its extraordinary axis oriented perpendicular to the plane of the layer.

In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate".

An A (or C) plate comprising a film of optically uniaxial birefringent material with negative birefringence, such as discotic anisotropic materials is also referred to as "negative A (or C) plate" or "−A (or C) plate" depending on the orientation of the discotic materials. A film made from a cholesteric calamitic material with a reflection band in the UV part of the spectrum also has the optics of a negative C plate.

The birefringence Δn is defined as follows $$\Delta n = n_e - n_o$$

wherein $n_e$ is the extraordinary refractive index and $n_o$ is the ordinary refractive index, and the average refractive index $n_{av.}$ is given by the following equation:

$$n_{av.} = ((2n_o^2 + n_e^2)/3)^{1/2}$$

The average refractive index $n_{av.}$ and the ordinary refractive index $n_o$ can be measured using an Abbe refractometer. Δn can then be calculated from the above equations.

The term VIS light or simply "light" refers to electromagnetic radiation having a wavelength in the range from 350 nm to 800 nm.

The term UV light refers to electromagnetic radiation having a wavelength in the range from 250 nm to 350 nm.

Unless the context clearly indicates otherwise, as used herein plural forms of the terms herein are to be construed as including the singular form and vice versa.

All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm In case of doubt the definitions as given in C. Tschierske, G. Pelzl and S. Diele, Angew. Chem. 2004, 116, 6340-6368 shall apply.

Unless explicitly stated otherwise in the given generic formulae, the following terms have the following meanings:

"Carbyl group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). "Hydrocarbyl group" denotes a carbyl group, which additionally contains one or more H atoms and optionally one or more heteroatoms, such as, for example, N, O, S, P, Si, Se, As, Te or Ge.

A carbyl or hydrocarbyl group can be a saturated or unsaturated group. Unsaturated groups are, for example, aryl, alkenyl, or alkinyl groups. A carbyl or hydrocarbyl group having more than 3 C atoms can be straight chain, branched and/or cyclic and may contain spiro links or condensed rings.

Preferred carbyl and hydrocarbyl groups are optionally substituted alkyl, alkenyl, alkinyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms.

Further preferred carbyl and hydrocarbyl groups are $C_1$-$C_{40}$ alkyl, $C_2$-$C_{40}$ alkenyl, $C_2$-$C_{40}$ alkinyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkinyl, $C_3$-$C_{22}$ allyl, $C_4$-$C_{22}$ alkyldienyl, $C_6$-$C_{12}$ aryl, $C_6$-$C_{20}$ arylalkyl, and $C_2$-$C_{20}$ heteroaryl.

Further preferred carbyl and hydrocarbyl groups are straight-chain, branched or cyclic alkyl radicals having 1 to 40, preferably 1 to 25 C atoms, more preferably 1 to 12 C atoms, which are unsubstituted or mono- or polysubstituted by F, Cl, Br, I or CN and in which one or more non-adjacent $CH_2$ groups may each be replaced, independently of one another, by —C($R^x$)═C($R^x$)—, —C≡C—, —N($R^x$)—, —O—, —S—, —CO—, —CO—O—, —O—CO—, —O—CO—O— in such a way that O and/or S atoms are not linked directly to one another.

Above, $R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, n-hexyl, 2-ethylhexyl, n-heptyl, n-octyl, n-nonyl, n-decyl, n-undecyl, n-dodecyl, dodecanyl, trifluoro-methyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkinyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S, and Se.

Particular preference is given to mono-, bi-, or tricyclic aryl groups having 6 to 25 C atoms and mono-, bi- or tricyclic heteroaryl groups having 2 to 25 C atoms, which optionally contain fused rings, and which are optionally substituted. Preference is furthermore given to 5-, 6-, or 7-membered aryl and heteroaryl groups, in which, in addition, one or more CH groups may be replaced by N, S, or O in such a way that O atoms and/or S atoms are not linked directly to one another.

Preferred aryl groups are, for example, phenyl, biphenyl, terphenyl, [1,1':3',1" ]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxa-linimidazole, benzoxazole, naphthoxazole, anthroxazole, phen-anthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those that contain exclusively single bonds, and partially unsaturated rings, i.e. those that may also contain multiple bonds. Heterocyclic rings contain one or more heteroatoms, preferably selected from Si, O, N, S, and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi-, or tricyclic groups having 3 to 25 C atoms, which optionally contain fused rings, and which are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, (non-aromatic) alicyclic and heterocyclic groups optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, OH, CN, $NO_2$, NCO, NCS, OCN, SCN, C(═O)N($R^x$)$_2$, C(═O)$Y^x$, C(═O)$R^x$, C(═O)O$R_x$, N($R^x$)$_2$, in which $R^x$ has the above-mentioned meaning, and above $Y^x$ denotes halogen, optionally substituted silyl, optionally substituted aryl or heteroaryl having 4 to 40, preferably 4 to 20 ring atoms, and straight-chain or branched alkyl, alkenyl, alkinyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^y$, —$OR^y$, —CO—$R^y$, —CO—O—$R^y$, —O—CO—$R^y$ or —O—CO—O—$R^y$, in which $R^y$ denotes H, a straight-chain, branched or cyclic alkyl chain having 1 to 12 C atoms.

In the formula shown above and below, a substituted phenylene ring

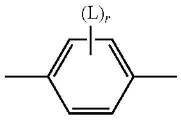

is preferably

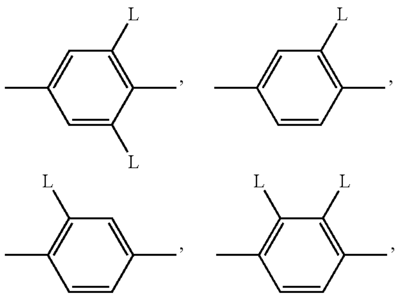

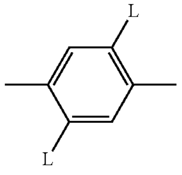

or

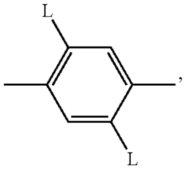

in which L has, on each occurrence identically or differently, one of the meanings given above and below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, most preferably F, Cl, $CH_3$, $OCH_3$, $COCH_3$ or $OCF_3$.

"Halogen" denotes F, Cl, Br or I, preferably F or Cl, more preferably F.

The term "cycloheteroalkyl ring" or ""cycloheteroalkyl" within the meaning of the present invention is denoted to mean a non-aromatic monocyclic or polycyclic alkyl ring comprising at least one heteroatom and may, also be referred to as heterocycloalkyl ring.

The term "alkylaryl" as used in the context of the present invention relates to radicals with the -alkyl-aryl structure which are attached via the alkyl group. Both the alkyl group and the aryl group include substituted radicals in this context. With regard to the term "substituted", reference is made to the above remarks.

The term "alkylheteroaryl" as used in the context of the present invention relates to radicals with the -alkyl-heteroaryl structure which are attached via the alkyl group. Both the alkyl group and the heteroaryl group include substituted radicals in this context. With regard to the term "substituted", reference is made to the above remarks.

"Polymerizable groups" (P) are preferably selected from groups containing a C=C double bond or C≡C triple bond, and groups which are suitable for polymerisation with ring opening, such as, for example, oxetane or epoxide groups.

Preferably, polymerizable groups (P) are selected from the group consisting of $CH_2$=$CW^1$—COO—, $CH_2$=$CW^1$—CO—,

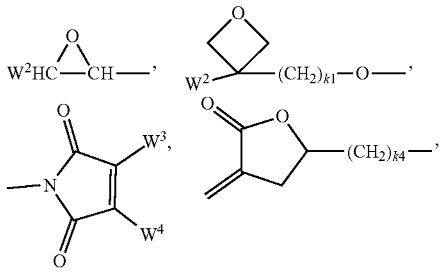

$CH_2$=$CW^2$—$(O)_{k3}$—, $CW^1$=CH—CO—$(O)_{k3}$—, $CW^1$=CH—CO—NH—, $CH_2$=$CW^1$—CO—NH—, $CH_3$—CH=CH—O—, $(CH_2$=$CH)_2$CH—OCO—, $(CH_2$=CH—$CH_2)_2$CH—OCO—, $(CH_2$=$CH)_2$CH—O—, $(CH_2$=CH—$CH_2)_2$N—, $(CH_2$=CH—$CH_2)_2$N—CO—, $CH_2$=$CW^1$—CO—NH—, $CH_2$=CH—$(COO)_{k1}$-Phe-$(O)_{k2}$—, $CH_2$=CH—$(CO)_{k1}$-Phe-$(O)_{k2}$—, Phe-CH=CH—, in which $W^1$ denotes H, F, Cl, CN, $CF_3$, phenyl or alkyl having 1 to 5 C atoms, in particular H, F, Cl or $CH_3$, $W^2$ denotes H or alkyl having 1 to 5 C atoms, in particular H, methyl, ethyl or n-propyl, $W^3$ and $W^4$ each, independently of one another, denote H, Cl or alkyl having 1 to 5 C atoms, Phe denotes 1,4-phenylene, which is optionally substituted by one or more radicals L as being defined above but being different from P-Sp, preferably preferred substituents L are F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl, and $k_1$, $k_2$ and $k_3$ each, independently of one another, denote 0 or 1, $k_3$ preferably denotes 1, and $k_4$ is an integer from 1 to 10.

Particularly preferred polymerizable groups P are $CH_2$=CH—COO—, $CH_2$=$C(CH_3)$—COO—, $CH_2$=CF—COO—, $CH_2$=CH—, $CH_2$=CH—O—, $(CH_2$=$CH)_2$CH—OCO—, $(CH_2$=$CH)_2$CH—O—,

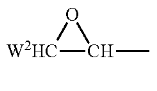

and

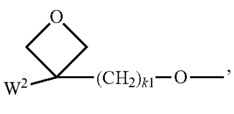

in which $W^2$ denotes H or alkyl having 1 to 5 C atoms, in particular H, methyl, ethyl or n-propyl, Further preferred polymerizable groups (P) are vinyloxy, acrylate, methacrylate, fluoroacrylate, chloroacrylate, oxetane and epoxide, most preferably acrylate or methacrylate, in particular acrylate.

Preferably, all multireactive polymerizable compounds and subformulae thereof contain instead of one or more radicals P-Sp-, one or more branched radicals containing two or more polymerizable groups P (multireactive polymerizable radicals).

Suitable radicals of this type, and polymerizable compounds containing them, are described, for example, in U.S. Pat. No. 7,060,200 B1 or US 2006/0172090 A1.

Particular preference is given to multireactive polymerizable radicals selected from the following formulae:

—X-alkyl-$CHP^x$—$CH_2$—$CH_2P^y$ I*a

—X-alkyl-$C(CH_2P^x)(CH_2P^y)$—$CH_2P^z$ I*b

—X-alkyl-$CHP^xCHP^y$—$CH_2P^z$ I*c

—X-alkyl-$C(CH_2P^x)(CH_2P^y)$—$C_{aa}H_{2aa+1}$ I*d

—X-alkyl-$CHP^x$—$CH_2P^y$ I*e

—X-alkyl-$CHP^xP^y$ I*f

—X-alkyl-$CP^xP^y$—$C_{aa}H_{2aa+1}$ I*g

—X-alkyl-$C(CH_2P^v)(CH_2P^w)$—$CH_2OCH_2$—$C(CH_2P^x)(CH_2P^y)CH_2P^z$ I*h

—X-alkyl-$CH((CH_2)_{aa}P^x)((CH_2)_{bb}P^y)$ I*i

—X-alkyl-$CHP^xCHP^y$—$C_{aa}H_{2aa+1}$ I*k in which alkyl denotes a single bond or straight-chain or branched alkylene having 1 to 12 C atoms, in which one or more non-adjacent $CH_2$ groups may each be replaced, independently of one another, by $C(R^x)$=$C(R^x)$, C≡C, $N(R^x)$, O, S, CO, COO, OCO, OCOO in such a way that O and/or S atoms are not linked directly to one another, and in which, in addition, one or more H atoms may be replaced by F, Cl or CN, where $R^x$ has one the above-mentioned meaning, $_{aa}$ and $_{bb}$ each, independently of one another, denote 0, 1, 2, 3, 4, 5 or 6, X has one of the meanings indicated for X', and $P^v$ to $P^z$ each, independently of one another, have one of the meanings indicated above for P.

Preferred spacer groups Sp are selected from the formula Sp'-X', so that the radical "P-Sp-" conforms to the formula "P-Sp'-X'—", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each be replaced, independently of one another, by —O—, —S—, —NH—, —$NR^{xx}$—, —$SiR^{xx}R^{yy}$—, —CO—, —COO—, —OCO—, —OCO—O—, —S—CO—, —CO—S—, —$NR^{xx}$—CO—O—, —O—CO—$NR^{0xx}$—, —$NR^{xx}$—CO—$NR^{yy}$—, —CH=CH— or —C≡C— in such a way that O and/or S atoms are not linked directly to one another, X' denotes —O—, —S—, —CO—, —COO—, —OCO—, —O—COO—, —CO—$NR^{xx}$—, —$NR^{xx}$—CO—, —$NR^{xx}$—CO—$NR^{yy}$—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^{xx}$—, —$CY^{xx}$=$CY^{xx}$—, —C≡C—, —CH=CH—COO—, —OCO—CH=CH— or a single bond, $R^{xx}$ and $R^{yy}$ each, independently of one another, denote H or alkyl having 1 to 12 C atoms, and $Y^{xx}$ and $Y^{yy}$ each, independently of one another, denote H, F, Cl or CN.

X' is preferably —O—, —S— —CO—, —COO—, —OCO—, —O—COO—, —CO—$NR^{xx}$—, —$NR^{xx}$—CO—, —$NR^{xx}$—CO—$NR^{yy}$— or a single bond.

Typical spacer groups Sp' are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^{xx}R^{yy}$—$O)_{p1}$—, in which p1 is an integer from 1 to 12, q1 is an integer from 1 to 3, and $R^{xx}$ and $R^{yy}$ have the above-mentioned meanings.

Particularly preferred groups —X'-Sp'- are —$(CH_2)_{p1}$—, —O—$(CH_2)_{p1}$—, —OCO—$(CH_2)_{p1}$—, —OCOO—$(CH_2)_{p1}$—, in which p1 is an integer from 1 to 12.

Particularly preferred groups Sp' are, for example, in each case straight-chain, methylene, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the present invention,

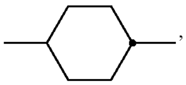,
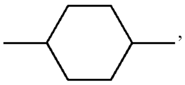,
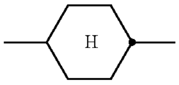
and
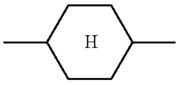

denote trans-1,4-cyclohexylene, and

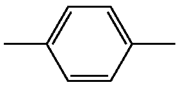
and
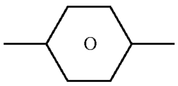

denote 1,4-phenylene.

For the present invention the groups —COO— or —$CO_2$— denote an ester group of formula

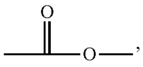, and the groups —OCO—, —$O_2C$— or —OOC— denote an ester group of formula

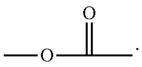.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

All concentrations are quoted in percent by weight and relate to the respective mixture as a whole, all temperatures are quoted in degrees Celsius and all temperature differences are quoted in differential degrees.

DETAILED DESCRIPTION

The invention relates to an optical component comprising a polarizer, a quarter wave plate and a structured or patterned light reflecting polymer film.

In a further preferred embodiment of the invention, the optical component in accordance with the present invention comprises at least one polarizer, which is arranged on one side of the layer of the quarter wave plate.

Preferably the polarizer corresponds to a linear polarizer.

Preferred polarizers can be reflective or absorptive polarizers.

A reflective polarizer in the sense of the present application reflects light having one polarisation direction or one type of circular-polarized light, while being transparent to light having the other polarisation direction or the other type of circular-polarized light.

Absorptive polarizer absorbs light having one polarisation direction or one type of circular-polarized light, while being transparent to light having the other polarisation direction or the other type of circular-polarized light. The reflection or absorption is usually not quantitative; meaning that complete polarisation of the light passing through the polarizer does not take place.

For the purposes of the present invention, both absorptive and reflective polarizers can be employed. Preference is given to the use of polarizers, which are in the form of thin optical films.

Examples of reflective polarizers which can be used in accordance with the invention are DRPF (diffusive reflective polarizer film, 3M), DBEF (dual brightness enhanced film, 3M), DBR (layered-polymer distributed Bragg reflectors, as described in U.S. Pat. Nos. 7,038,745 and 6,099,758) and APF (advanced polarizer film, 3M).

Examples of absorptive polarizers, which can be employed in the optical component according to the invention, are the Itos XP38 polarizer film and the Nitto Denko GU-1220DUN polarizer film.

Suitable quarter-wave plates for the optical component of the present application are designed to have the retarded phase axis aligned in such a way that circularly polarized light transmitted by the polarizer and quarterwave plate rotates in the direction opposite to that of circularly polarized light to which the structured or patterned light reflecting polymer film exhibits selective reflection.

Suitable quarter wave plates are commonly known by the expert and preferably are made of one or more optical anisotropic polymer films, preferably two or more optical anisotropic polymer films, preferably obtainable from a polymerizable liquid crystalline material.

In a preferred embodiment the quarter wave plate comprises at least one optical polymer film in which the polymerizable liquid crystalline material is uniformly homeotropic aligned and at least one which is one polymer film in which the polymerizable liquid crystalline material is uniformly homogenous aligned.

In a preferred embodiment a suitable quarter wave plates are preferably are made of one or more optical anisotropic polymer films, preferably two or more optical anisotropic polymer films, preferably obtainable from a polymerizable liquid crystalline material having preferably an optical negative dispersion.

In a preferred embodiment such polymerizable liquid crystalline material utilized for one or more of the optical polymer films of the quarter wave plate of the instant invention, comprises one or more compounds of formula T, $$R^{T1}\text{-}(A^{T1}Z^{T1})_{m1}\text{-}G^{T1}\text{-}(Z^{T2}\text{-}A^{T2})_{m2}\text{-}R^{T2} \qquad \mathrm{T}$$

wherein $R^{T1}$ and $R^{T2}$ each and independently from another denotes H or hydrocarbon group having 1 to 20 carbon atoms, the group may have a substituent group, any carbon atom may be substituted with a heteroatom, and at least one of $R^{T1}$ and $R^{T2}$ denotes P-Sp-, P denotes a polymerizable group Sp denotes a spacer group, $A^{T1}$ and $A^{T2}$ each and independently and in each occurrence denote a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, whereby these groups may be unsubstituted or may be substituted with one or more of substituent groups L, L denotes each and independently in each occurrence F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms preferably 1 to 12 carbon atoms, in which one $—CH_2—$ or two or more non-adjacent $—CH_2—$ may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted by F, or L may denote a group represented by P-Sp-, $Z^{T1}$ and $Z^{T2}$ each independently represent —O—, —S—, $—OCH_2—$, $—CH_2O—$, $—CH_2CH_2—$, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, $—SCH_2—$, $—CH_2S—$, $—CF_2O—$, $—OCF_2—$, $—CF_2S—$, $—SCF_2—$, —CH═CH—COO—, —CH═CH—OCO—, —COO—CH═CH—, —OCO—CH═CH—, $—COO—CH_2CH_2—$, $—OCO—CH_2CH_2—$, $—CH_2CH_2—COO—$, $—CH_2CH_2—OCO—$, $—COO—CH_2—$, $—OCO—CH_2—$, $—CH_2—COO—$, $—CH_2—OCO—$, —CH═CH—, —N═N—, —CH═N—, —N═CH—, —CH═N—N═CH—, —CF═CF—, —C≡C—, a single bond, or a group represented by $—CR^{01}R^{02}O—$ or $—OCR^{01}R^{02}—$, $R^{01}$ and $R^{02}$ each independently represent a hydrogen atom, F, Cl, Br, I, or a linear or branched alkyl group having 1 to 20 carbon atoms, preferably 1 to 12 carbon atoms, in which one $—CH_2—$ or two or more non-adjacent $—CH_2—$ may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—

CH═CH—, —OCO—CH═CH—, —CH═CH—, —CF═CF—, or —C≡C—, and any hydrogen atom in the alkyl group may be substituted with F or Cl;

$G^{T1}$ denotes a group selected from formulae M-1 to M-8,

M-1

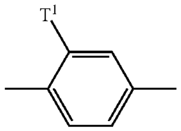

M-2

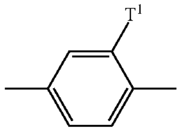

M-3

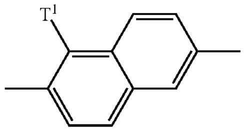

M-4

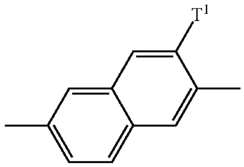

M-5

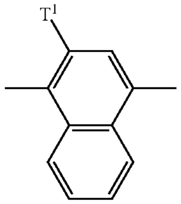

M-6

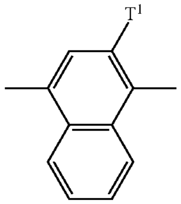

M-7

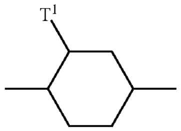

M-8

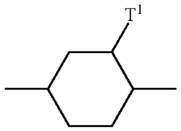

M-9

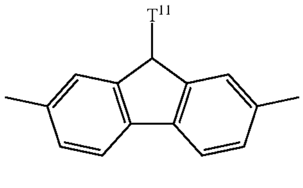

whereby these groups may be unsubstituted or substituted with one or more of the substituent groups L, $T^1$ denotes a group selected from formulae $T^{1-1}$ and $T^{1-2}$ below, $T^{1-1}$

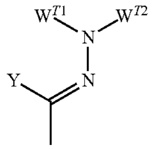

$T^{1-2}$

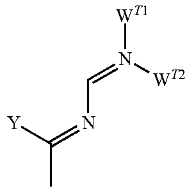

$W^{T1}$ denotes a group containing an aromatic group and/or non-aromatic group having 1 to 40 carbon atoms, preferably 1 to 20 carbon atoms, which may be substituted, the aromatic group may be a hydrocarbon ring or a heterocyclic ring, and the non-aromatic group may be a hydrocarbon group or a group in which any carbon atom in a hydrocarbon group is substituted with a heteroatom (provided that, oxygen atoms are not directly connected with each other), $W^{T2}$ denotes a hydrogen atom or a linear or branched alkyl group having 1 to 20 carbon atoms, preferably 1 to 12 carbon atoms, in which one —$CH_2$— or two or more non-adjacent —$CH_2$— groups may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted with F, or $W^{T2}$ may denote a group of 2 to 30 carbon atoms having at least one aromatic group, and the group may be unsubstituted or may be substituted with one or more of substituent groups L, or $W^{T2}$ may denote a group by P-Sp-, Y denotes a hydrogen atom, F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms, in which one —$CH_2$— or two or more non-adjacent —$CH_2$— may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted with F, or Y may represent a group represented by P-Sp-, m1 and m2 each independently represent an integer of 1 to 6.

Preferably, the polymerizable LC material for the quarter wave plate comprises one, two or more compounds of formula T, more preferably one compound of formula T.

Preferably the compounds of formula T are selected from the group of compounds wherein at least one of $R^{T1}$ and $R^{T2}$ denotes P-Sp- and the other $R^{T1}$ or $R^{T2}$ denotes preferably a hydrogen atom, F, Cl, Br, I a pentafluorosulfuranyl group, a cyano group, a nitro group, an isocyano group, a thioisocyano group, or a linear or branched alkyl group having 1 to 20 carbon atoms, in which any hydrogen atom in the group may be substituted with F and one —$CH_2$— or two or more non-adjacent —$CH_2$— may be each independently substituted with —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH═CH—COO—, —CH═CH—OCO—, —COO—CH═CH—, —OCO—CH═CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH═CH—, —N═N—, —CH═N—N═CH—, —CF═CF—, or —C≡C—, more preferably a hydrogen atom, F, Cl, or a linear or branched alkyl group having 1 to 12 carbon atoms, in which one —$CH_2$— or two or more non-adjacent —$CH_2$— may be each independently substituted with —O—, —COO—, —OCO—, or —O—CO—O—, even more preferably a hydrogen atom, F, Cl, or a linear alkyl group or linear alkoxy group having 1 to 8 carbon atoms, and particularly preferably a linear alkyl group or linear alkoxy group having 1 to 8 carbon atoms.

In another preferred embodiment, both $R^{T1}$ and $R^{T2}$ denote P-Sp-.

In further preferred embodiment $A^{T1}$ and $A^{T2}$ in formula T each independently in each occurrence denotes preferably a 1, 4-phenylene group, a 1,4-cyclohexylene group, or a naphthalene-2, 6-diyl group, which may be unsubstituted or may be substituted each and independently in each occurrence with one or more of the substituent groups L:

A-I

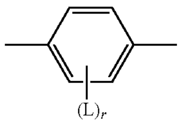

A-II

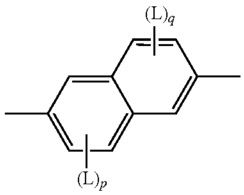

A-III

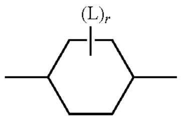

wherein r denotes an integer between 0 and 4, p and q denote each and independently an integer between 0 and 3.

In Further preferred embodiment $A^{T1}$ and $A^{T2}$ in formula T each independently and in each occurrence denote a group selected from formulae A-1 to A-11 below,

A-1

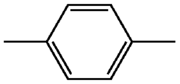

A-2

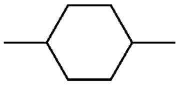

A-3

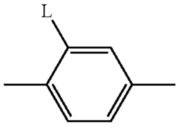

A-4

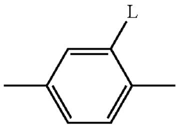

A-5

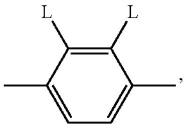

,

A-6

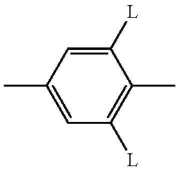

A-7

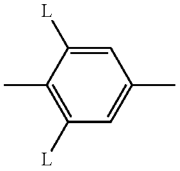

A-8

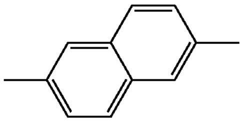

A-9

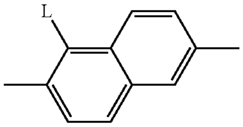

A-10

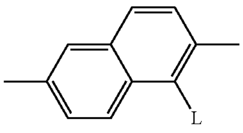

A-11

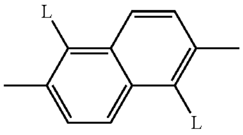

further preferred a group selected from formulae (A-1) to (A-8), and particularly preferred a group selected from formulae (A-1) to (A-4).

In a preferred embodiment, the group $A^{T1}$ connected to the group $Z^{T1}$ adjacent to the group $G^{T1}$ and the group represented by $A^{T2}$ connected to the group $Z^{T2}$ adjacent to the group $G^{T1}$, $A^{T1}$ and $A^{T2}$ each independently denote preferably a 1, 4-cyclohexylene group, which may be unsubstituted or may be substituted with one or more of the substituent groups L (A-III), and more preferably a group represented by formula A-2.

In another preferred embodiment and when a plurality of the groups $A^{T1}$ and $A^{T2}$ exist, the group represented by $A^{T1}$ and $A^{T2}$ is selected independently from $A^{T1}$ and $A^{T2}$ adjacent to $G^{T1}$, groups $A^{T1}$ and $A^{T}$ 2 non-adjacent or adjacent to $G^{T1}$ may be identical of different and each independently represent preferably a 1, 4-phenylene group or a naphthalene-2, 6-diyl group which may be unsubstituted or may be substituted with one or more of the substituent groups L, more preferably a group selected from formulae (A-1) and (A-3) to (A-11), further preferably a group selected from formulae (A-1) and (A-3) to (A-8), and particularly preferably a group selected from formulae (A-1), (A-3), and (A-4).

$Z^{T1}$ and $Z^{T2}$ denote each independently in each occurrence —O—, —S—, —$OCH_2$—, —$CH_2O$—, —$CH_2CH_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —$SCH_2$—, —$CH_2S$—, —$CF_2O$—, —$OCF_2$—, —$CF_2S$—, —$SCF_2$—, —CH═CH—COO—, —CH═CH—OCO—, —COO—CH═CH—, —OCO—CH═CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH═CH—, —N═N—, —CH═N—, —N═CH—, —CH═N—N═CH—, —CF═CF—, —C═C—, a single bond, or a group represented by —$CR^{01}R^{02}O$— or —$OCR^{01}R^{02}$— wherein, $R^{01}$ and $R^{02}$ each independently have the same meaning as $R^{01}$ and $R^{02}$ in formula T.

If a plurality of $Z^{T1}$ exist, they may be different from each other or identical to each other, if a plurality of $Z^{T2}$ exist, they may be different from each other or identical to each other.

In another preferred embodiment and when a plurality of $Z^{T1}$ and $Z^{T2}$ exist, preferably, at least one of $Z^{T1}$ and $Z^{T2}$ directly connected to the $G^{T1}$ group contained in formula T denotes a single bond and the other group of $Z^{T1}$ and $Z^{T2}$ is represented by —COO—, —OCO—, —$CR^{01}R^{02}O$— or —$OCR^{0-1}R^{02}$— wherein, $R^{01}$ and $R^{02}$ each independently have the same meaning as $R^{01}$ and $R^{02}$ in formula T.

In another preferred embodiment, $Z^{T1}$ and $Z^{1T2}$ directly connected to the $G^{T1}$ group contained in formula T denotes a group represented by —COO—, —OCO—, —$CR^{01}R^{02}O$— or —$OCR^{01}R^{02}$—, wherein, $R^{01}$ and $R^{02}$ each independently have the same meaning as $R^{01}$ and $R^{02}$ in formula T.

Further, when a plurality of $Z^{T1}$ and $Z^{T2}$ exist, preferable groups other than the group represented by —$CR^{01}R^{02}O$— or —$OCR^{01}R^{02}$— each independently represent preferably —$OCH_2$—, —$CH_2O$—, —COO—, —OCO—, —$CF_2O$—, —$OCF_2$—, —$CH_2CH_2$—, —$CF_2CF_2$—, —CH═CH—COO—, —CH═CH—OCO—, —COO—CH═CH—, —OCO—CH═CH—, —COO—$CH_2CH_2$—, —OCO—$CH_2CH_2$—, —$CH_2CH_2$—COO—, —$CH_2CH_2$—OCO—, —CH═CH—, —CF═CF—, —C═C—, —C≡C—, or a single bond, more preferably —$OCH_2$—, —$CH_2O$—, —COO—, —OCO—, —$CF_2O$—, —$OCF_2$—, —$CH_2CH_2$—, —COO—$CH_2CH_2$—, —OCO—$CH_2CH_2$—, —$CH_2CH_2$—COO—, —$CH_2CH_2$—OCO—, —CH═CH—, —C≡C—, or a single bond, further preferably —$OCH_2$—, —$CH_2O$—, —COO—, —OCO—, —$CF_2O$—, —$OCF_2$—, or a single bond, more preferably —$OCH_2$—, —$CH_2O$—, —COO—, —OCO—, or a single bond, and particularly preferably —$OCH_2$—, —$CH_2O$—, —COO—, or —OCO—.

In formula T, m1 and m2 each independently represent an integer of 1 to 6, preferably m1+m2 denotes an integer of 1 to 6.

More preferably m1 and m2 each independently represent an integer of 1 to 3, and particularly preferably an integer of 1 or 2. Preferably, m1 and m2 are identical to each other, however it is likewise preferred that m1 and m2 are different.

Each of the groups represented by formulae (M-1) to (M-8) as given above is preferably selected from the group of formulae (M-1-1) to (M-9-1) as given below:

M-1-1

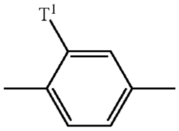

M-2-1

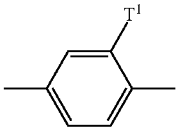

M-2-1

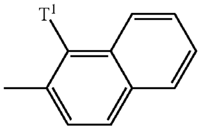

M-4-1

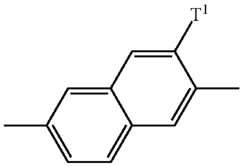

M-5-1

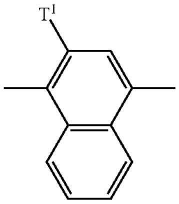

M-6-1

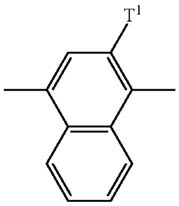

M-7-1

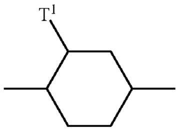

-continued

M-8-1

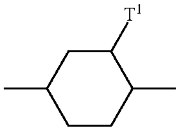

M-9-1

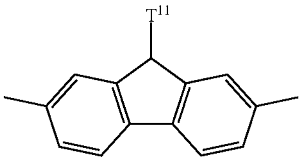

wherein, $T^1$ has the same meaning as given above, more preferably a group selected from formulae (M-1-1) to (M-9-1), and especially preferably a group represented by formula (M-1-1), (M-2-1) or (M-9-1) and in particular a group represented by formula (M-1-1) or (M-2-1).

In formulae ($T^1$-1) or ($T^1$-2), preferably, Y denotes a hydrogen atom, F, Cl, a nitro group, a cyano group, a linear or branched alkyl group having 1 to 20 carbon atoms, in which any hydrogen atom in the group may be substituted with F and one $—CH_2—$ or two or more non-adjacent $—CH_2—$ may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, or a group represented by P-Sp-, more preferably, Y denotes a hydrogen atom or a linear or branched alkyl group having 1 to 15 carbon atoms, in which any hydrogen atom in the group may be substituted with F and one $—CH_2—$ or two or more non-adjacent $—CH_2—$ may be each independently substituted with —O—, —COO—, or —OCO—, further preferably, Y denotes a hydrogen atom or a linear or branched alkyl group having 1 to 10 carbon atoms, in which any hydrogen atom in the group may be substituted with F, and particularly preferably, Y denotes a hydrogen atom or a linear alkyl group having 1 to 8 carbon atoms.

The aromatic group contained in $W^{T1}$ denotes preferably a group selected from formulae (W-1) to (W-18) below each of which may be unsubstituted or substituted with one or more of substituent groups L:

W-1

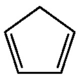

W-2

W-3

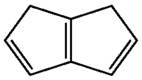

W-4

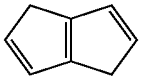

W-5

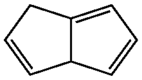

-continued

W-6

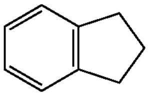

W-7

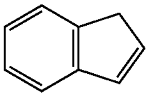

W-8

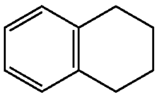

W-9

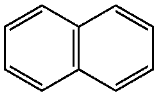

W-10

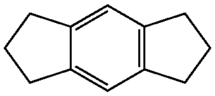

W-11

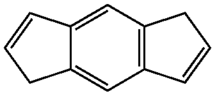

W-12

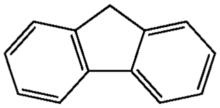

W-13

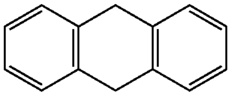

W-14

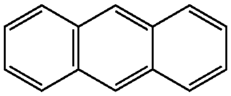

W-15

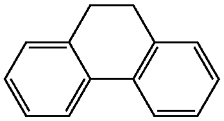

W-16

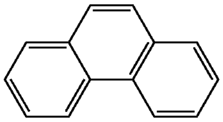

W-17

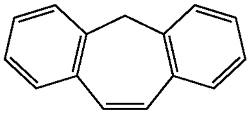

W-18

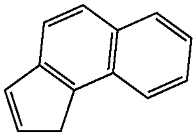

wherein, the ring structure may have a bond to $T^{1-1}$ or $T^{1-2}$ at any position thereof, a group in which two or more aromatic groups selected from these groups are linked by a single bond may be formed, any —CH═ may be each independently substituted with —N═, and —$CH^2$— may be each independently substituted with —O—, —S—, —$NR^T$— wherein, $R^T$ denotes a hydrogen atom or an alkyl group having 1 to 20 carbon atoms, —CS—, or —CO—, provided that these groups do not contain a —O—O-bond. Further, these groups may be unsubstituted or may be substituted with one or more of the aforementioned substituent groups L.

The group represented by formula (W-1) denotes preferably a group selected from formulae (W-1-1) to (W-1-8) below each of which may be unsubstituted or may be substituted with one or more of the aforementioned substituent groups L:

W-1-1

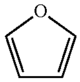

W-1-2

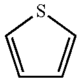

W-1-3

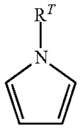

W-1-4

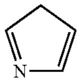

W-1-5

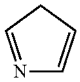

W-1-6

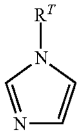

W-1-7

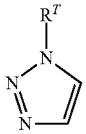

W-1-8

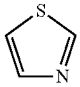

wherein, these groups may have a bond a bond to $T^{1-1}$ or $T^{1-2}$ at any possible position, and $R^T$ denotes a hydrogen atom or an alkyl group having 1 to 8 carbon atoms.

The group represented by formula (W-2) denotes preferably a group selected from formulae (W-2-1) to (W-2-8) below each of which may be unsubstituted or may be substituted with one or more of the aforementioned substituent groups L:

W-2-1

W-2-2

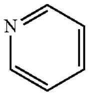

W-2-3

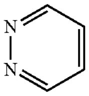

W-2-4

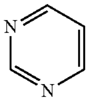

W-2-5

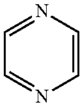

W-2-6

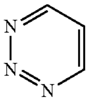

W-2-7

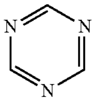

W-2-8

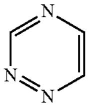

wherein, these groups have a bond a bond to $T^{1-1}$ or $T^{1-2}$ at any possible position.

The group represented by formula (W-3) denotes preferably a group selected from formulae (W-3-1) to (W-3-6) below each of which may be unsubstituted or may be substituted with one or more of the aforementioned substituent groups L:

W-3-1

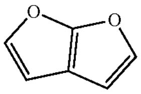

W-3-2

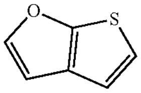

W-3-3

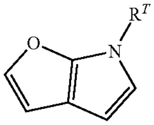

W-3-4

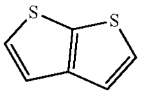

-continued

W-3-5

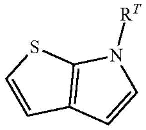

W-3-6

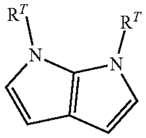

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-4) denotes preferably a group selected from formulae (W-4-1) to (W-4-9) below each of which may be unsubstituted or may be substituted with one or more of the aforementioned substituent groups L:

W-4-1

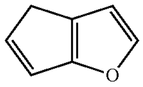

W-4-2

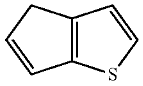

W-4-3

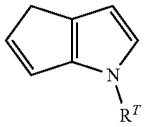

W-4-4

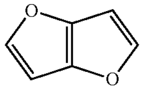

W-4-5

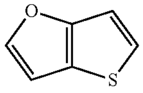

W-4-6

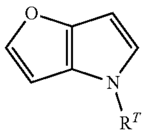

W-4-7

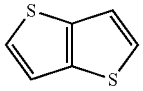

W-4-8

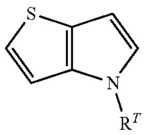

-continued

W-4-9

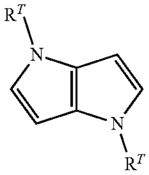

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-5) is preferably a group selected from formulae (W-5-1) to (W-5-13) below each of which may be unsubstituted or may be substituted with one or more of the aforementioned substituent groups L:

W-5-1

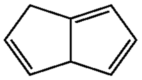

W-5-2

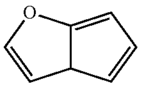

W-5-3

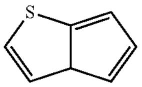

W-5-4

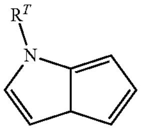

W-5-5

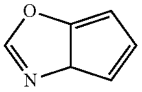

W-5-6

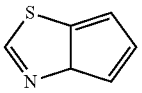

W-5-7

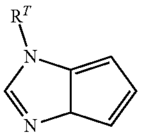

W-5-8

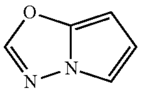

W-5-9

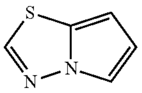

W-5-10

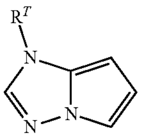

-continued

W-5-11

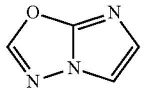

W-5-12

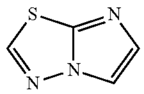

W-5-13

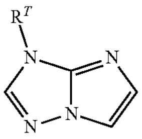

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-6) denotes preferably a group selected from formulae (W-6-1) to (W-6-12) below each of which may be unsubstituted or may be substituted with one or more of the aforementioned substituent groups L:

W-6-1

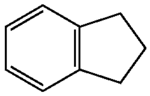

W-6-2

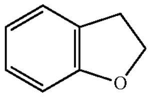

W-6-3

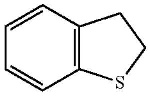

W-6-4

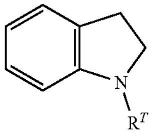

W-6-5

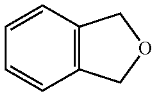

W-6-6

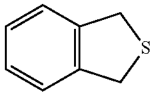

W-6-7

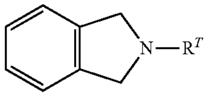

W-6-8

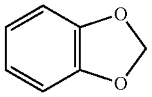

-continued

W-6-9

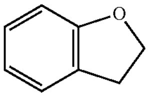

W-6-10

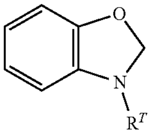

W-6-11

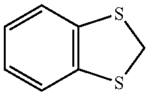

W-6-12

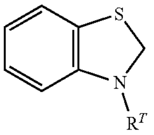

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-7) denotes preferably a group selected from formulae (W-7-1) to (W-7-8) below each of which may be unsubstituted or may be substituted with one or more of the aforementioned substituent groups L:

W-7-1

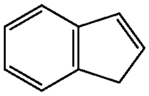

W-7-2

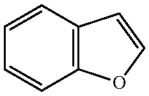

W-7-3

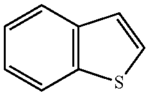

W-7-4

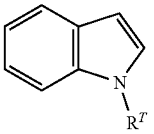

W-7-5

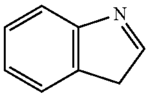

W-7-6

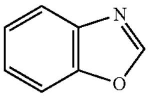

W-7-7

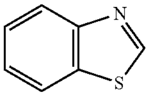

-continued

W-7-8

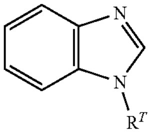

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-8) denotes preferably a group selected from formulae (W-8-1) to (W-8-19) below each of which may be unsubstituted or may be substituted with one or more of the aforementioned substituent groups L:

W-8-1

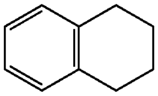

W-8-2

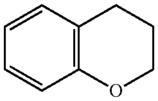

W-8-3

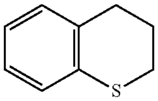

W-8-4

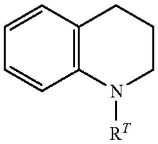

W-8-5

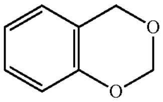

W-8-6

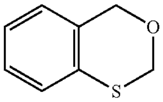

W-8-7

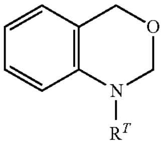

W-8-8

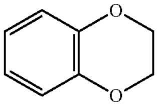

W-8-9

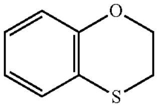

-continued

W-8-10

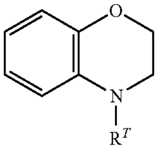

W-8-11

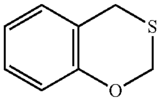

W-8-12

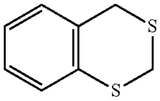

W-8-3

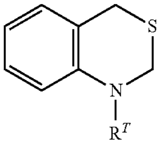

W-8-4

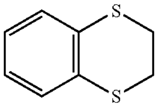

W-8-15

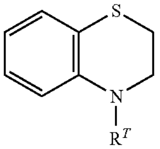

W-8-16

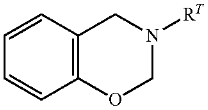

W-8-17

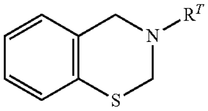

W-8-18

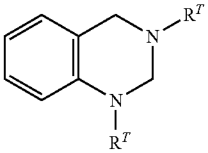

W-8-19

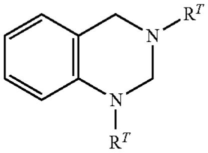

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-9) denotes preferably a group selected from formulae (W-9-1) to (W-9-7) below each of which may be unsubstituted or may be substituted with one or more of the aforementioned substituent groups L:

W-9-1
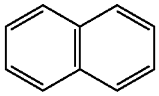
W-9-2
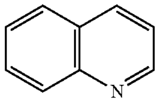
W-9-3
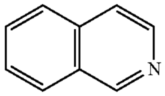
W-9-4
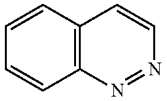
W-9-5
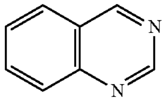
W-9-6
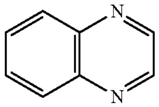
W-9-7
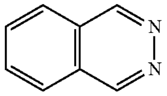
wherein, these groups may have a bond to $T^{1-1}$ or $T^{1-2}$ at any possible position.
The group represented by formula (W-10) denotes preferably a group selected from formulae (W-10-1) to (W-10-16) below each of which may be unsubstituted or may be substituted with one or more of the aforementioned substituent groups L:
W-10-1
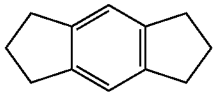
W-10-2
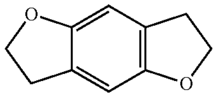
W-10-3
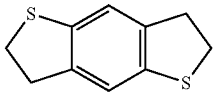
W-10-4
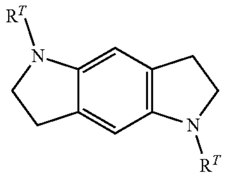
-continued
W-10-5
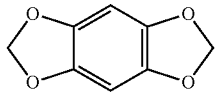
W-10-6
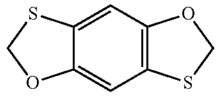
W-10-7
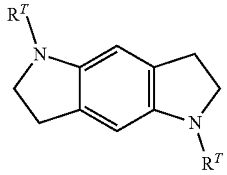
W-10-8
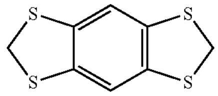
W-10-9
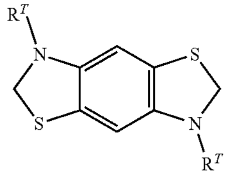
W-10-10
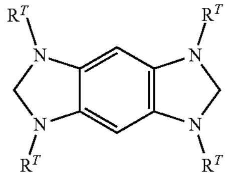
W-10-11
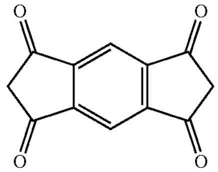
W-10-12
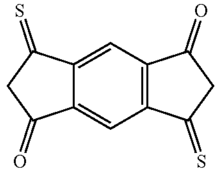
W-10-13
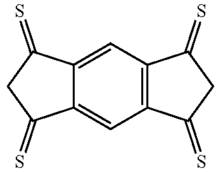
W-10-14
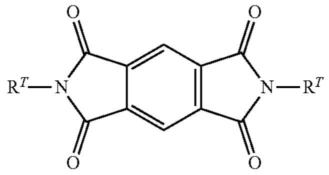

-continued

W-10-15

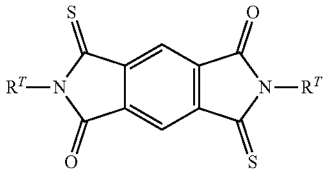

W-10-16

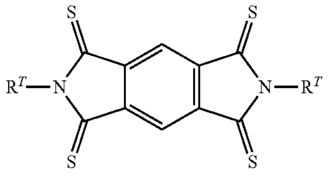

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-11) denotes preferably a group selected from formulae (W-11-1) to (W-11-10) below each of which may be unsubstituted or may be substituted with one or more of the aforementioned substituent groups L:

W-11-1

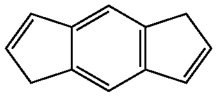

W-11-2

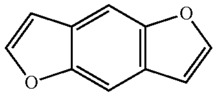

W-11-3

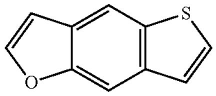

W-11-4

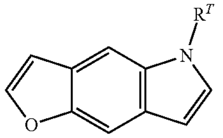

W-11-5

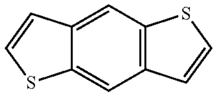

W-11-6

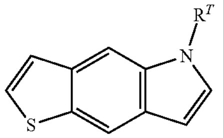

W-11-7

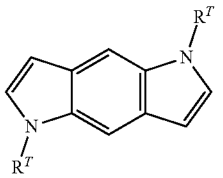

-continued

W-11-8

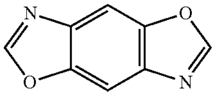

W-11-9

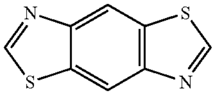

W-11-10

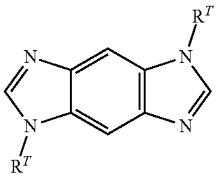

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-12) denotes preferably a group selected from formulae (W-12-1) to (W-12-4) below each of which may be unsubstituted or may be substituted with one or more of the aforementioned substituent groups L:

W-12-1

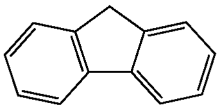

W-12-2

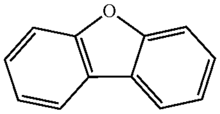

W-12-3

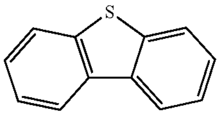

W-12-4

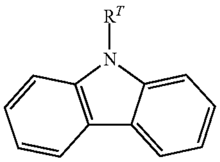

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-13) denotes preferably a group selected from formulae (W-13-1) to (W-13-10) below each of which may be unsubstituted or may be substituted with one or more of the aforementioned substituent groups L:

W-13-1

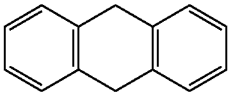

-continued

W-13-2

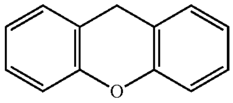

W-13-3

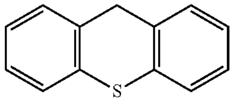

W-13-4

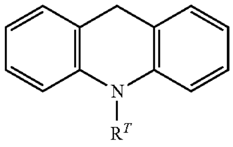

W-13-5

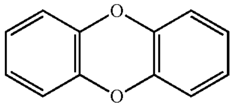

W-13-6

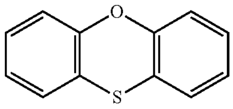

W-13-7

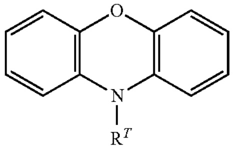

W-13-8

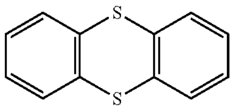

W-13-9

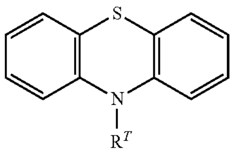

W-13-10

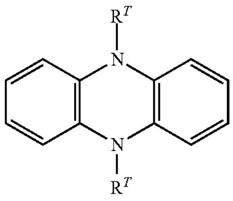

wherein, these groups may have a bond to $T^{1-1}$ or $T^{1-2}$ at any possible position, and $R^T$ denotes a hydrogen atom or an alkyl group having 1 to 8 carbon atoms.

The group represented by formula (W-18) denotes preferably a group selected from formulae (W-18-1) to (W-18-7) below each of which may be unsubstituted or may be substituted with one or more of the aforementioned substituent groups L:

W-18-1

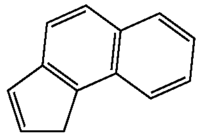

W-18-2

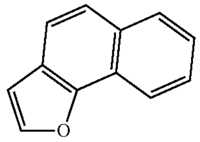

W-18-3

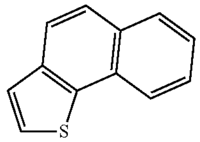

W-18-4

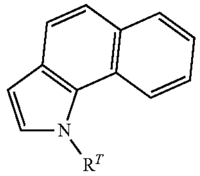

W-18-5

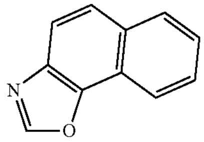

W-18-6

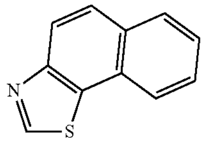

W-18-7

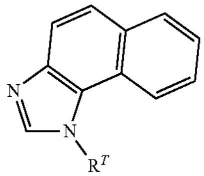

wherein, these groups may have a bond to $T^{1-1}$ or $T^{1-2}$ at any possible position, and $R^T$ denotes a hydrogen atom or an alkyl group having 1 to 8 carbon atoms.

The group containing the carbon ring or heterocyclic ring contained in $W^{T1}$ denotes preferably a group selected from formulae (W-1-1), (W-1-2), (W-1-3), (W-1-4), (W-1-5), (W-1-6), (W-2-1), (W-6-9), (W-6-11), (W-6-12), (W-7-2), (W-7-3), (W-7-4), (W-7-6), (W-7-7), (W-7-8), (W-9-1), (W-12-1), (W-12-2), (W-12-3), (W-12-4), (W-13-7), (W-13-9), (W-13-10), (W-14) and (W-18-6) each of which may be unsubstituted or may be substituted with one or more of the aforementioned substituent groups L, more preferably a group selected from formulae (W-2-1), (W-7-3), (W-7-7), (W-14) and (W-18-6) each of which may be unsubstituted or may be substituted with one or more of the aforementioned substituent groups L, further preferably a group selected from formulae (W-7-3), (W-7-7), (W-14) and (W-18-6) each of which may be unsubstituted or may be substituted with one or more of the aforementioned substituent groups L, still further preferably a group represented by formula (W-7-7), which may be unsubstituted or may be substituted with one or more of the aforementioned substituent groups L, and particularly preferably a group represented by formula (W-7-7-1) which may be unsubstituted or may be substituted with one or more of the aforementioned substituent groups L.

(W-7-7-1)

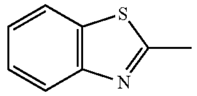

In formulae ($T^{1-1}$) or ($T^{1-2}$) the parameter $W^{T2}$ denotes preferably, a hydrogen atom, a linear or branched alkyl group having 1 to 20 carbon atoms, in which any hydrogen atom in the group may be substituted with F and one —$CH_2$— or two or more non-adjacent —$CH_2$— may be each independently substituted with —O—, —CO—, —COO—, —OCO—, —O—CO—O—, —CH═CH—COO—, —CH═CH—OCO—, —COO—CH═CH—, —OCO—CH═CH—, —CH═CH—, —CF═CF—, or —C≡C—, or a group represented by P-Sp-, more preferably, a hydrogen atom or a linear or branched alkyl group having 1 to 20 carbon atoms, in which any hydrogen atom in the group may be substituted with F and one —$CH_2$— or two or more non-adjacent —$CH_2$— may be each independently substituted with —O—, —CO—, —COO—, or —OCO—, or a group represented by P-Sp-, even more preferably, a hydrogen atom or a linear alkyl group having 1 to 12 carbon atoms, in which one —$CH_2$— or two or more non-adjacent —$CH_2$— may be each independently substituted with —O—, or a group represented by P-Sp-. Further, when $W^{T2}$ denotes a group having 2 to 30 carbon atoms, having at least one aromatic group which may be unsubstituted or may be substituted with one or more of the aforementioned substituent groups L, in particular, a group selected from formulae (W-1) to (W-18), each of which may be unsubstituted or may be substituted with one or more of the aforementioned substituent groups L. In this case, the more preferable structure thereof is the same as above.

Preferred combinations of $G^{T1}$, $T^{1-1}$ or $T^{1-2}$ and $W^{T1}$ are given in formulae (G-11) to (G-22) below:

(G-11)

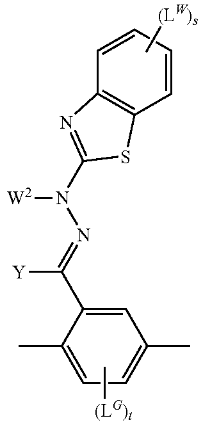

(G-12)

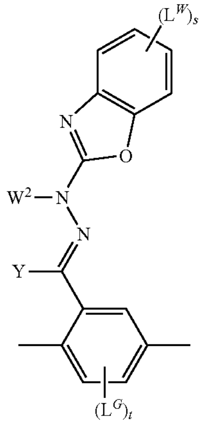

(G-13)

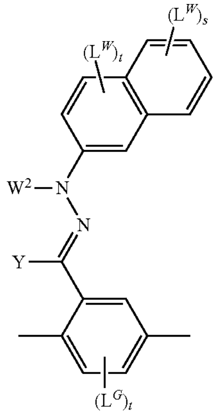

-continued
(G-14)
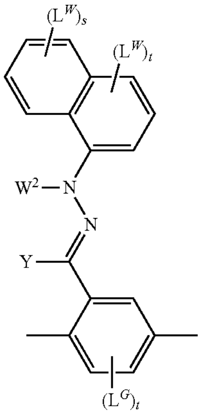
(G-15)
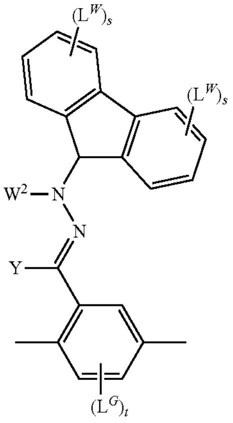
(G-16)
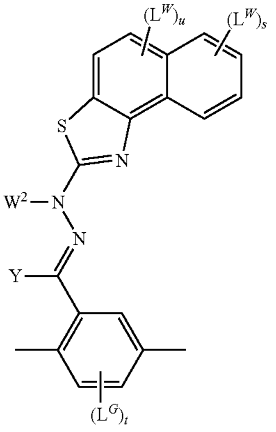
-continued
(G-17)
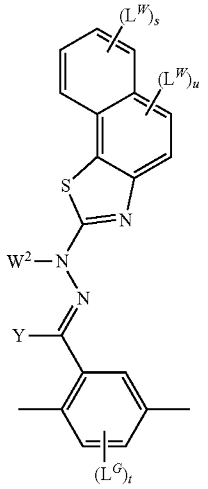
(G-18)
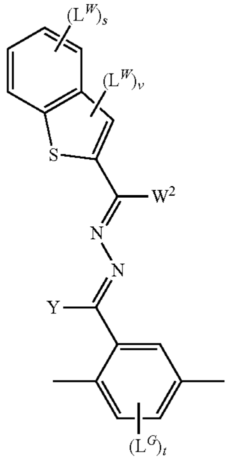
(G-19)
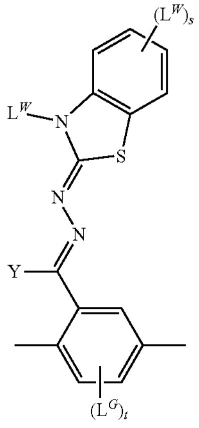

-continued (G-20)

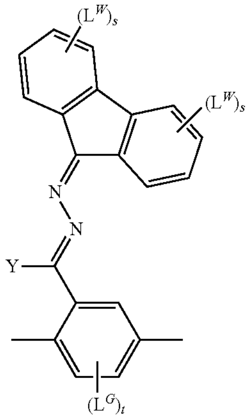

(G-21)

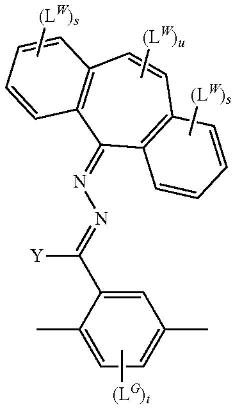

(G-22)

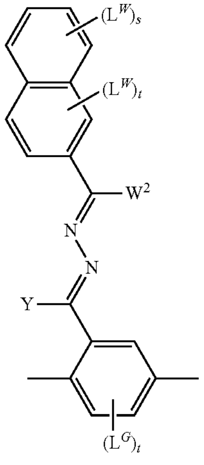

wherein, $L^G$, $L^W$, have each and independently in each occurrence one of the meanings as given above for L, Y, and $W^{T2}$ represent the same meanings as those described above, r denotes an integer of 0 to 5, s denotes an integer of 0 to 4, t denotes an integer of 0 to 3, u denotes an integer of 0 to 2, and v denotes 0 or 1. Further, these groups may be configured such that right and left thereof are reversed).

Further, in formulae (G-11) to (G-22), Y denotes more preferably a hydrogen atom, each of s, t, u, and v is further preferably 0, and a group selected from formulae (G-11-1) to (G-20-1) below is particularly preferable.

(G-11-1)

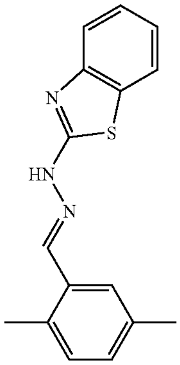

(G-11-2)

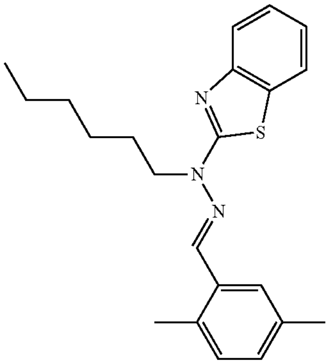

(G-11-3)

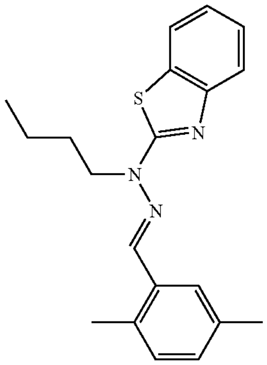

(G-11-4)

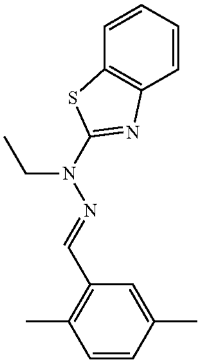

-continued
(G-11-5)
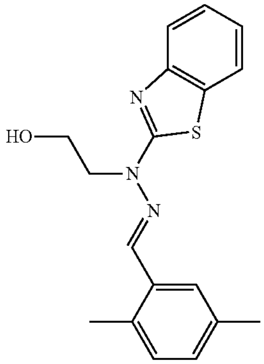
(G-11-6)
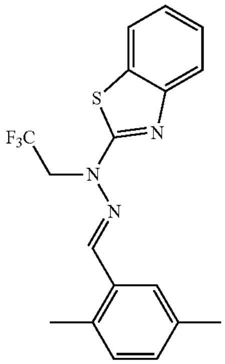
(G-11-7)
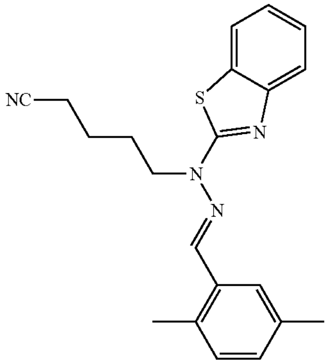
(G-11-8)
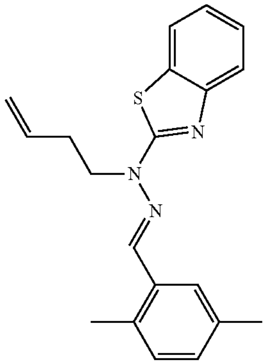
-continued
(G-11-9)
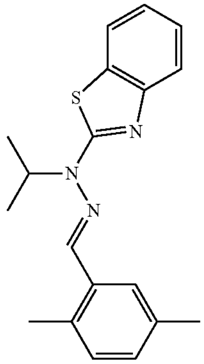
(G-11-10)
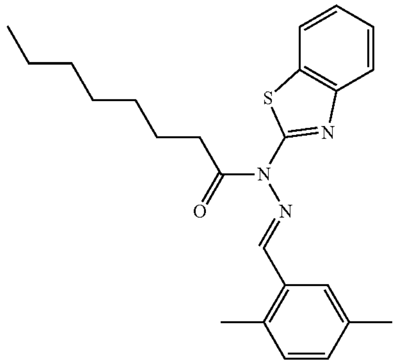
(G-11-11)
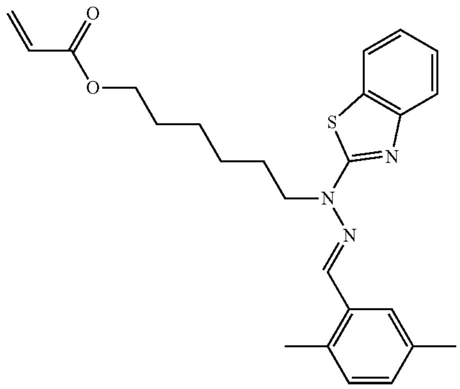
(G-11-12)
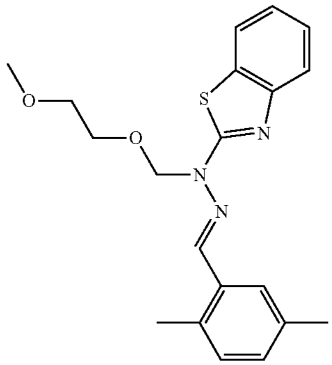

-continued
(G-11-13)
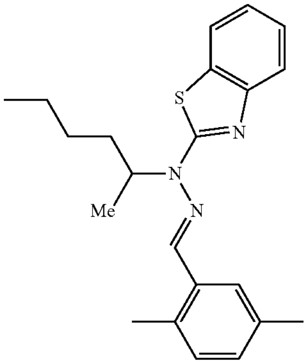
(G-11-14)
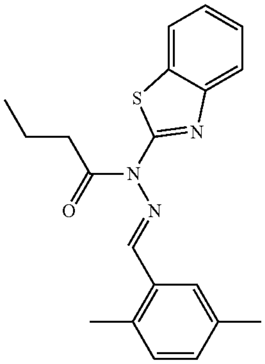
(G-11-15)
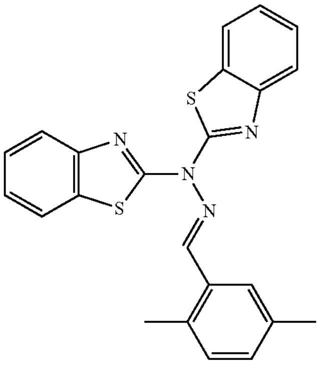
(G-11-16)
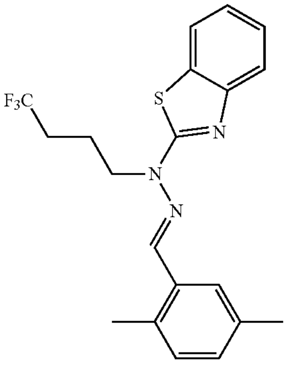
-continued
(G-11-17)
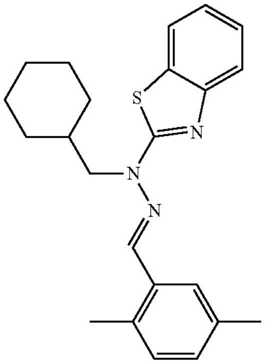
(G-11-18)
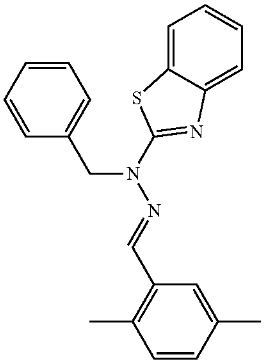
(G-11-19)
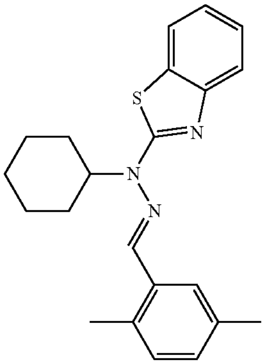
(G-11-20)
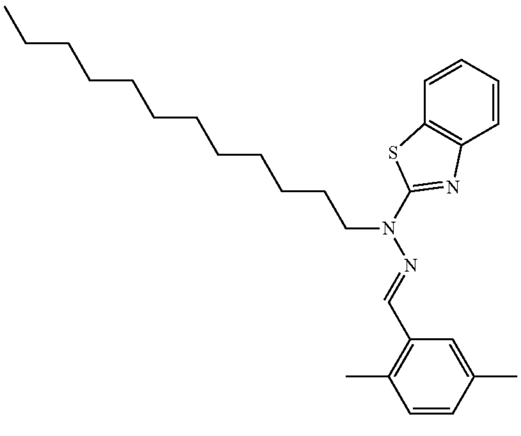

-continued
(G-11-21)
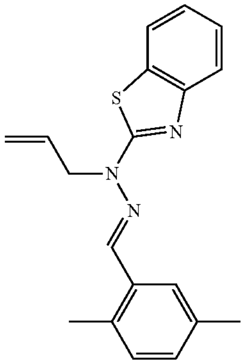
(G-11-22)
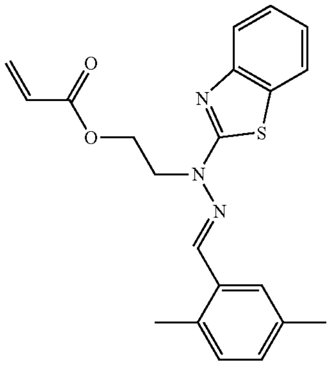
(G-11-23)
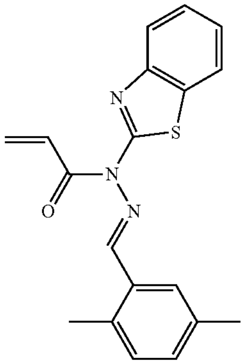
(G-11-24)
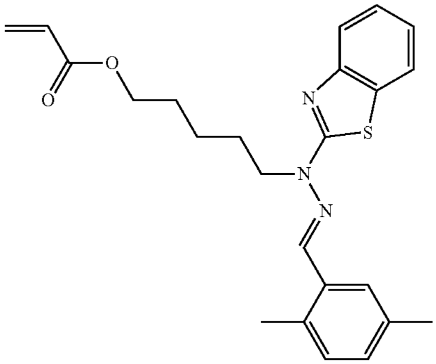
-continued
(G-11-25)
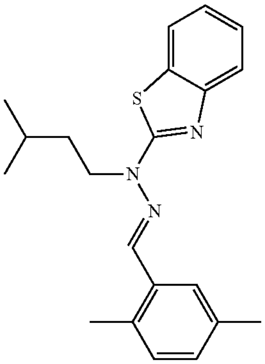
(G-11-26)
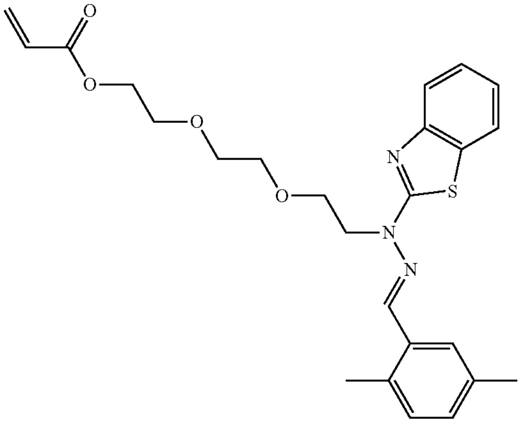
(G-15-1)
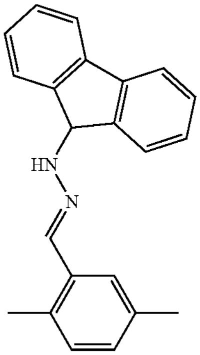
(G-16-1)
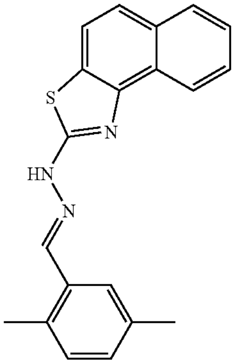

-continued (G-17-1)

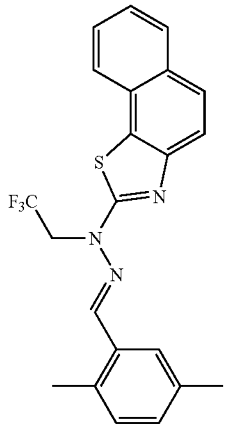

(G-20-1)

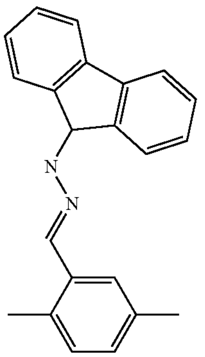

Preferred compounds of represented by formula T are preferably selected from the group of compounds of formula (TA-1) to (TA-3):

$$R^{T1}\text{-}A^{T11}\text{-}Z^{T11}\text{-}A^{T12}\text{-}ZT12\text{-}G^{T1}\text{-}Z^{T21}\text{-}A^{T21}\text{-}Z^{T22}\text{-}A^{T22}\text{-}R^{T2} \quad \text{(TA-1)}$$

$$R^{T1}\text{-}A^{T11}\text{-}Z^{T11}\text{-}A^{T12}\text{-}ZT12\text{-}G^{T1}\text{-}Z^{T21}\text{-}A^{T21}\text{-}R^{T2} \quad \text{(TA-2)}$$

$$R^{T1}\text{-}A^{T11}\text{-}Z^{T11}\text{-}G^{T1}\text{-}Z^{T21}\text{-}A^{T21}\text{-}R^{T2} \quad \text{(TA-3)}$$

wherein, $R^{T1}$, $R^{T2}$, and $G^{T1}$ have the same meanings as those in formula T, $A^{T11}$ to $A^{T22}$ have the same meanings as $A^{T1}$ and $A^{T2}$ in formula T, $Z^{T11}$ to $Z^{T22}$ have the same meanings as $Z^{T1}$ and $Z^{T2}$ in formula T, Preferable forms of each of the groups $R^{T1}$, $R^{T2}$, $G^{T1}$, $A^{T11}$ to $A^{T22}$ and $Z^{T11}$ to $Z^{T22}$ in formulae (TA-1) to (TA-3) are the same as those for formula T.

Specific examples and especially preferred compounds of formula T are disclosed e.g. in US 2015175564, WO 17079867 A1, WO16104317 A, US 2015277007 A1, or WO 16171041 A1 and in particular include compounds represented by formulae 1 to 5 of US 2015175564 A1, compounds represented by formulae (I-1) to (I-5), (I-8), (I-14), (I-16) to (I-36), (I-41), (I-54) to (I-65), (I-75) to (I-80), (I-82), (I-83), (I-86) to (I-97) and (I-121) to (I-125) of WO 17/079867 A1, compounds represented by formulae (A12-16) to (A12-18), (A14-1) to (A14-3) and (A141-1) to (A143-2) of WO 16104317 A1, compounds represented by formulae (2-A) to (2-D), (3-A) to (3-D), (4-A) to (4-D), (5-A) to (5-D), (7-A) to (7-D), (8-A) to (8-D), (9-A) to (9-D), (11-B) to (11-D), (12-b) to (12-D), (13-B) to (13-D), (22-B) to (22-D), (25-B) to (25-D), (40-A) to (40-D), (41-A) to (41-D), (42-A) to (42-D), (43-A) to (43-D), (44-A) to (44-D), (50-A) to (50-D), (52-A) to (52-D), (54-A) to (54-D), (55-A) to (55-D), or (56-A) to (56-D) of US 2015/0277007 A1, compounds represented by formulae (A) to (E) of WO 16171041 A1, or the compound of formula T-1

T-1

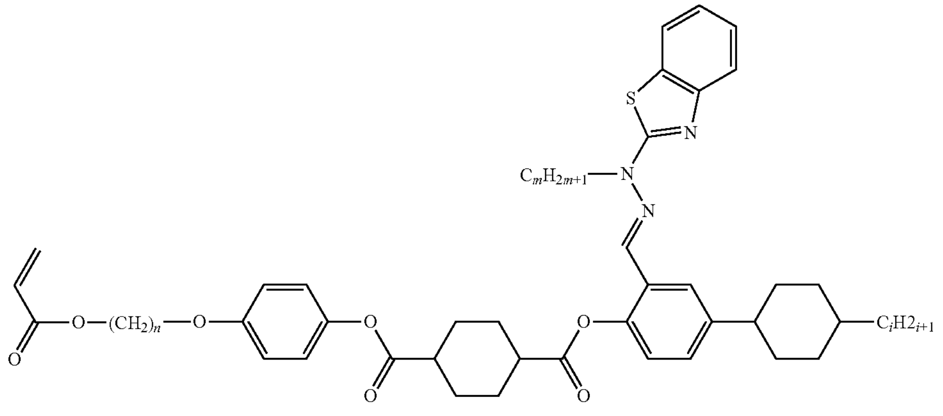

wherein m, n, and i denotes each and independently an integer between 1 and 8.

The compounds of the formulae (T), (TA-1) to (TA-3) and subformulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. Preferably they are prepared in analogy or in accordance to the disclosure given in WO 17/079867 A1.

The proportion of compounds of formula T in a polymerizable liquid-crystalline material utilized for the quarter wave plate as a whole, is preferably in the range from 10 to 99.9% by weight, more preferably in the range from 20 to 80% by weight and even more preferably in the range from 30 to 60% by weight.

Typically, the proportion of compounds of formula T in a polymerizable liquid-crystalline material utilized for the quarter wave plate as a whole, is preferably in the range from 10 to 99.9% by weight, more preferably in the range from 20 to 80% by weight and even more preferably in the range from 30 to 60% by weight.

In another preferred embodiment, the polymerizable liquid crystalline material utilized for the quarter wave plate comprises additionally to or instead of one or more compounds of formula T, one or more compounds of formula H,

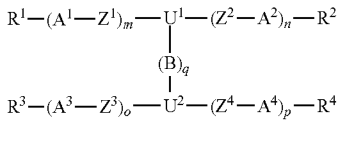

H wherein $U^1$ and $U^2$ are independently of each other selected from

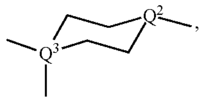,
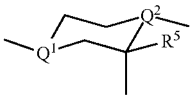
and
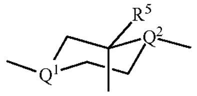

including their mirror images, wherein the rings $U^1$ and $U^2$ are bonded to the group —$(B)_q$— via the axial bond, and one or two non-adjacent $CH_2$ groups in these rings are optionally replaced by O and/or S, and the rings $U^1$ and $U^2$ are optionally substituted by one or more groups L, $Q^1$ and $Q^2$ are independently of each other CH or SiH, $Q^3$ is C or Si, B is in each occurrence independently of one another —C≡C—, —$CY^1$=$CY^2$— or an optionally substituted aromatic or heteroaromatic group, $Y^1$ and $Y^2$ are independently of each other H, F, Cl, CN or $R^0$, q is an integer from 1 to 10, preferably 1, 2, 3, 4, 5, 6 or 7, $A^1$ to $A^4$ are independently of each other, in each occurrence, selected from non-aromatic, aromatic or heteroaromatic carbocylic or heterocyclic groups, which are optionally substituted by one or more groups $R^5$, and wherein each of $-(A^1-Z^1)_m$—$U^1$—$(Z^2-A^2)_n-$ and $-(A^3-Z^3)_o$—$U^2$—$(Z^4-A^4)_p-$ does not contain more aromatic groups than non-aromatic groups and preferably does not contain more than one aromatic group, $Z^1$ to $Z^4$ are independently of each other, in each occurrence, —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_3$—, —$(CH_2)_4$—, —$CF_2CH_2$—, —$CH_2CF_2$—, —$CF_2CF_2$—, —CH=CH—, —$CY^1$=$CY^2$—, —CH=N—, —N=CH—, —N=N—, —CH=$CR^0$—, —C≡C—, —CH=CH—COO—, —OCO—CH=CH—, $CR^0R^{00}$ or a single bond, $R^0$ and $R^{00}$ are independently of each other H or alkyl with 1 to 12 C-atoms, m and n are independently of each other 0, 1, 2, 3 or 4, and p are independently of each other 0, 1, 2, 3 or 4, $R^1$ to $R^5$ are independently of each other identical or different groups selected from H, halogen, —CN, —NC, —NCO, —NCS, —OCN, —SCN, —C(=O)$NR^0R^{00}$, —C(=O)$X^0$, —C(=O)$R^0$, —$NH_2$, —$NR^0R^{00}$, —SH, —SRO, —$SO_3H$, —$SO_2R^0$, —OH, —$NO_2$, —$CF_3$, —$SF_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-, P is a polymerizable group, Sp is a spacer group or a single bond.

Preferably, the subgroups forming the bridging group B in formula H are preferably selected from groups having a bonding angle of 120° or more, preferably in the range of 180°. Very preferred are —C≡C— groups or divalent aromatic groups connected to their adjacent groups in para-position, like e.g. 1,4-phenylene, naphthalene-2,6-diyl, indane-2,6-diyl or thieno[3,2-b]thiophene-2,5-diyl.

Further possible subgroups include —CH=CH—, —$CY^1$=$CY^2$—, —CH=N—, —N=CH—, —N=N— and —CH=$CR^0$— wherein $Y^1$, $Y^2$, $R^0$ have the meanings given above.

Preferably the bridging group, or —$(B)_q$— in formula H, comprises one or more groups selected from the group consisting of —C≡C—, optionally substituted 1,4-phenylene and optionally substituted 9H-fluorene-2,7-diyl. The subgroups, or B in formula I, are preferably selected from the group consisting of —C≡C—, optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the bridging group, or —$(B)_q$— in formula I, are selected from —C≡C—, —C≡C—C≡C—, —C≡C—C≡C—C≡C—, —C≡C—C≡C—C≡C—C≡C—,

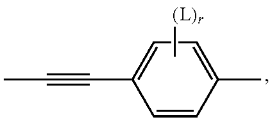,
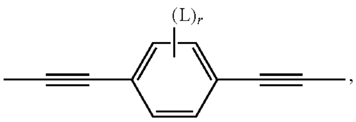,
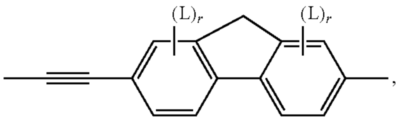,
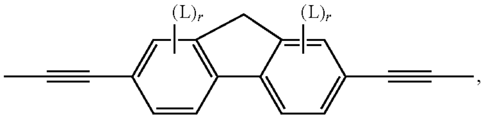,
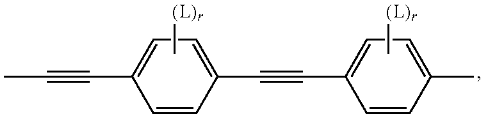,
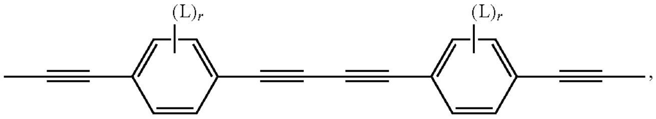,
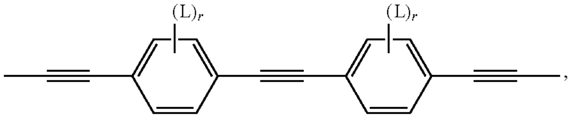,
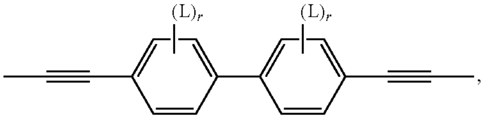,
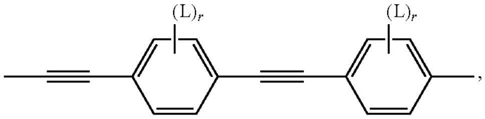,
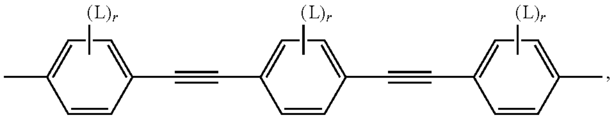, or
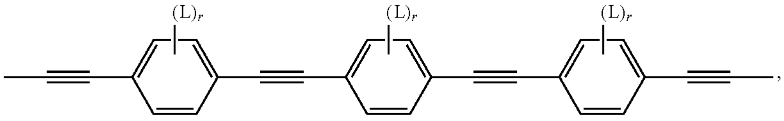, wherein r is 0, 1, 2, 3 or 4 and L has the meaning as described below.

In the guest compounds of the present invention, the non-aromatic rings of the mesogenic groups where the bridging group is attached, like $U^1$ and $U^2$ in formula H, are preferably selected from

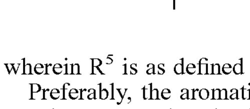,
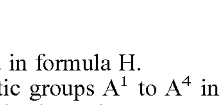,
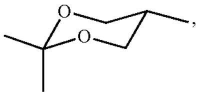,
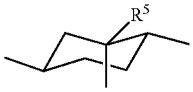 and
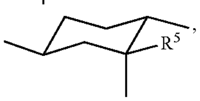, wherein $R^5$ is as defined in formula H.

Preferably, the aromatic groups $A^1$ to $A^4$ in formula H, may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and are optionally substituted.

Very preferred are compounds of formula H wherein m and p are 1 and n and o are 1 or 2. Further preferred are compounds of formula I wherein m and p are 1 or 2 and n and o are 0. Further preferred are compounds wherein m, n, o and p are 2.

In the compounds of formula H, the linkage groups connecting the aromatic and non-aromatic cyclic groups in the mesogenic groups, or $Z^1$ to $Z^4$, are preferably selected from —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_3$—, —$(CH_2)_4$—, —$CF_2CH_2$—, —$CH_2CF_2$—, —$CF_2CF_2$—, —CH═CH—, —$CY^1$═$CY^2$—, —CH═N—, —N═CH—, —N═N—, —CH═$CR^0$—, —C≡C—, —CH═CH—COO—, —OCO—CH═CH—, $CR^0R^{00}$ or a single bond, very preferably from —COO—, —OCO— and a single bond.

$R^0$ and $R^{00}$ are preferably selected from H, straight-chain or branched alkyl with 1 to 12 C atoms.

—$CY^1$═$CY^2$— is preferably —CH═CH—, —CF═CF— or —CH═C(CN)—.

$R^1$ to $R^5$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

In another preferred embodiment the compounds of formula H comprise one or more terminal groups, like $R^1$ to $R^4$, or substituents, like $R^5$, that are substituted by two or more polymerizable groups P or P-Sp- (multifunctional polymerizable groups).

Very preferred compounds of formula H are those of the following sub formulae:

Ha

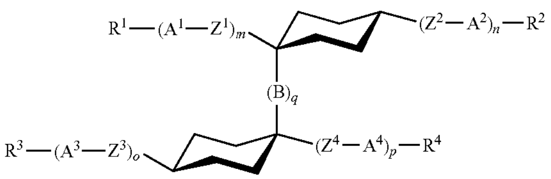

Hb

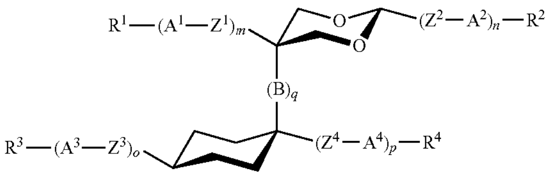

Hc

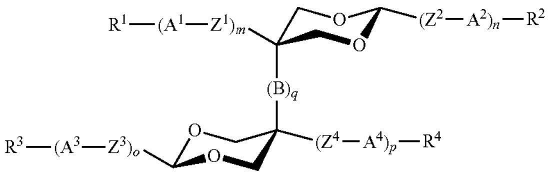

Hd

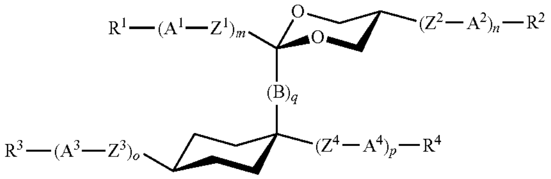

He

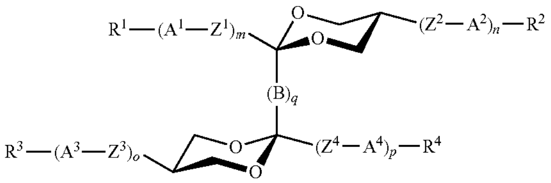

Hf

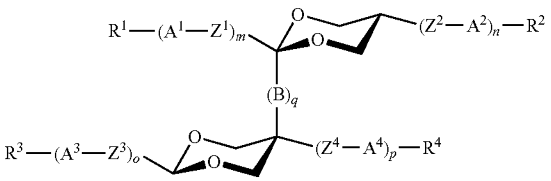

Hg

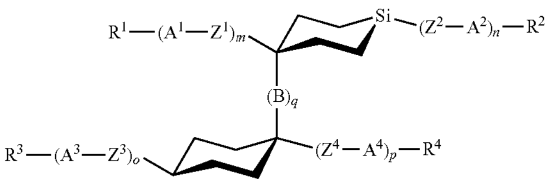

-continued

Hh

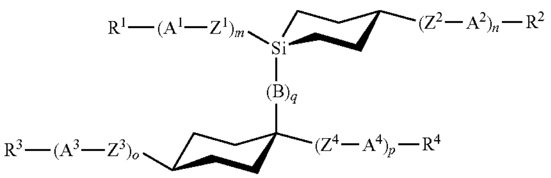

Hi

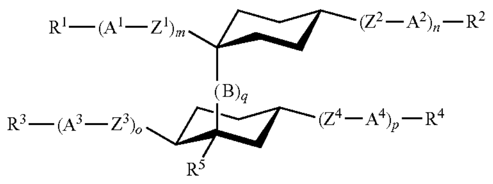

Hk

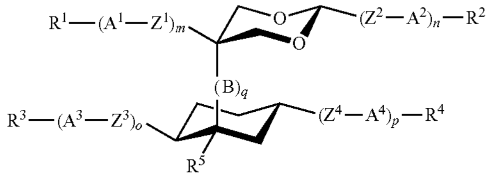

Hm

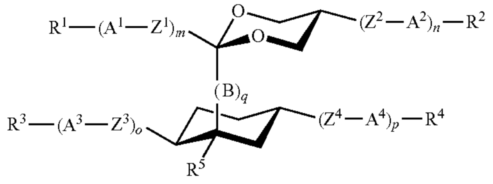

Hn

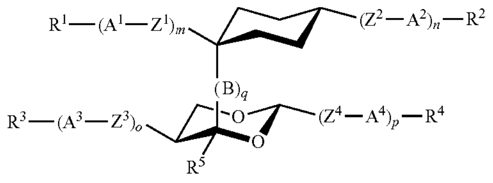

Ho

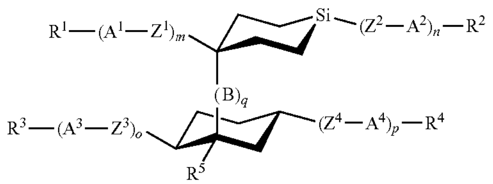

Hp

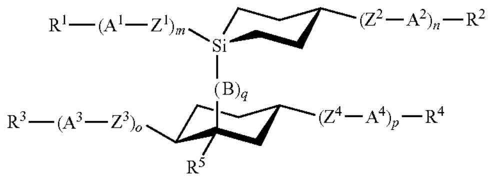

Hq

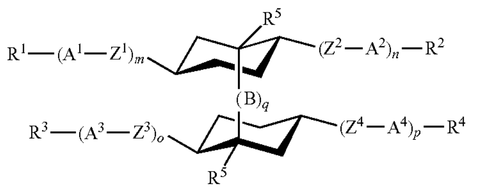

-continued
Hr
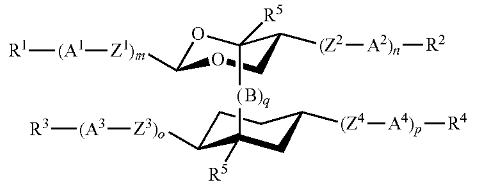
Hs
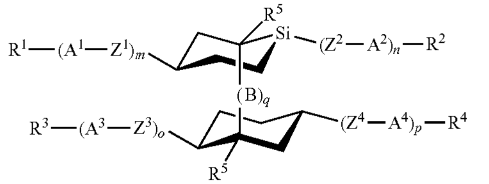
Ht
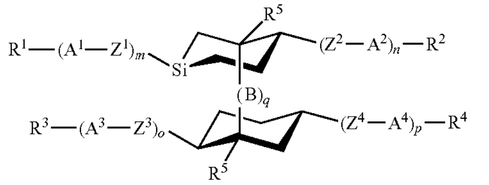
Hu
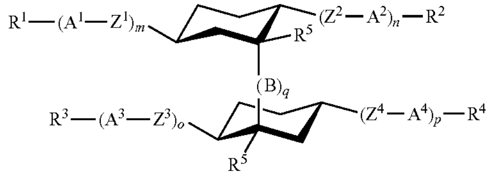
Hv
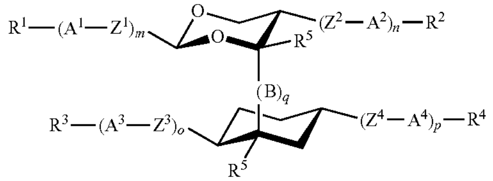
Hw
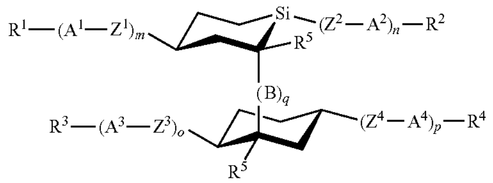
Hx
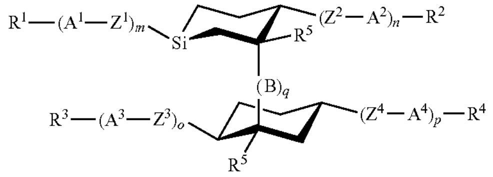
wherein $R^{1-5}$, $A^{1-4}$, $Z^{1-4}$, B, m, n, o, p and q have one the meanings given above under formula H.
Especially preferred are compounds of the following sub formulae:
H1
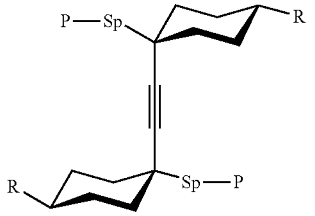
H2
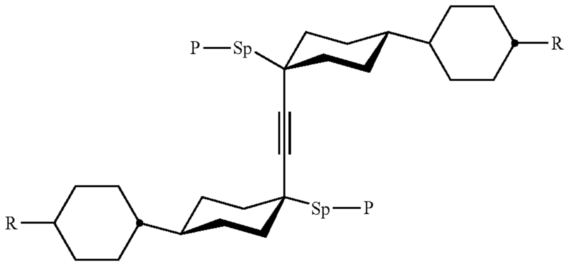
H3
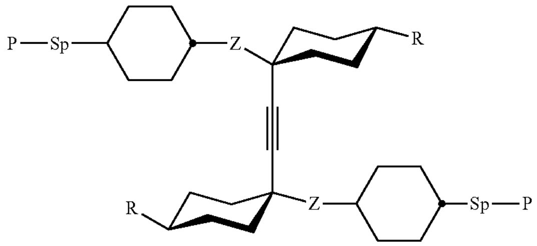
h4
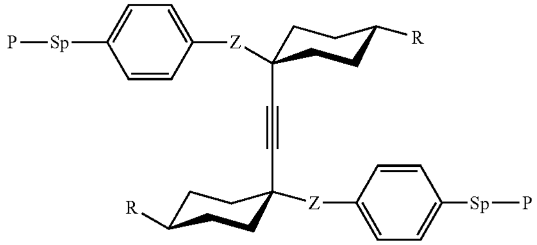
h5
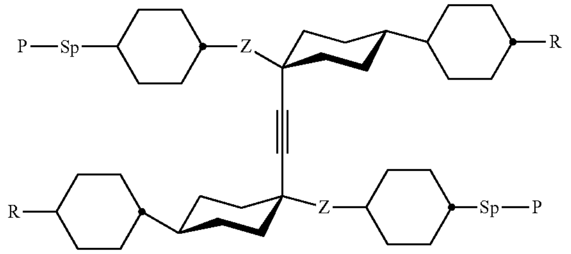
H6
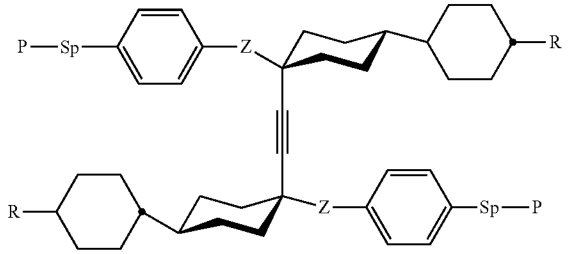

-continued
H7
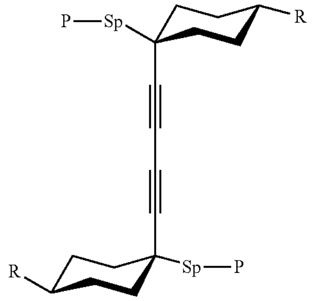
H8
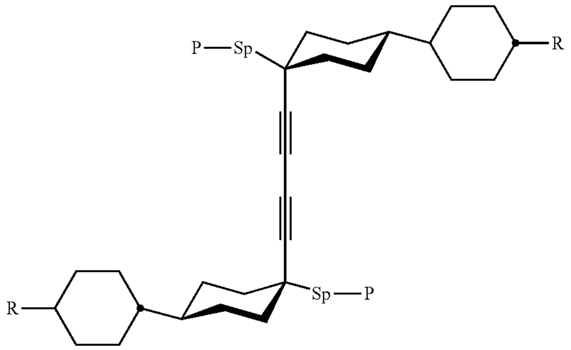
H9
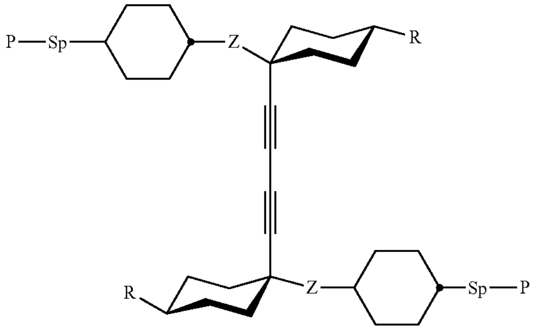
H10
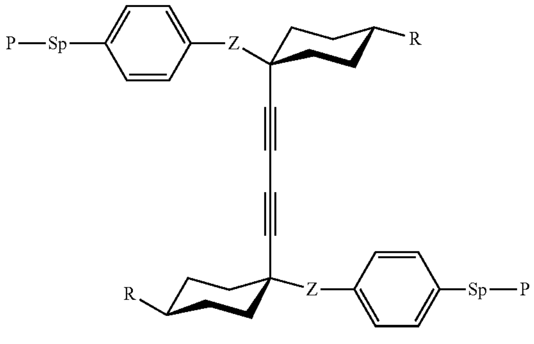
-continued
H11
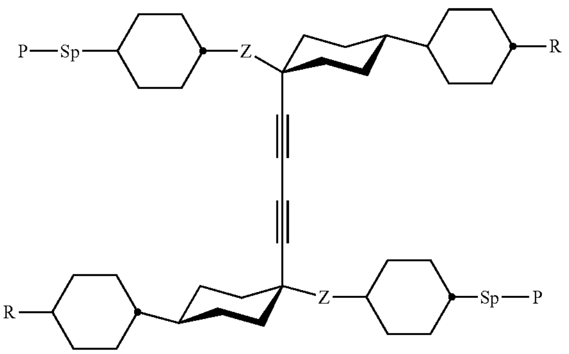
H12
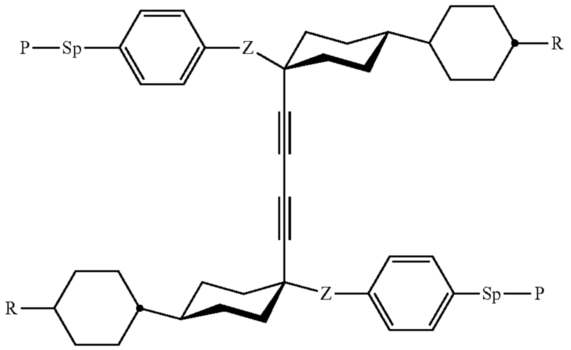
H13
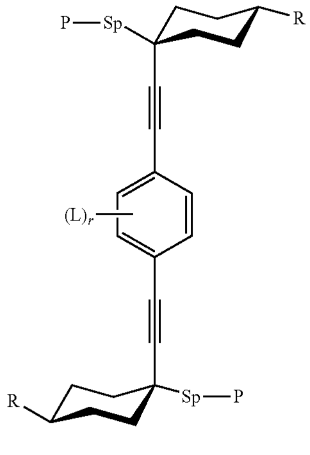

-continued
H14
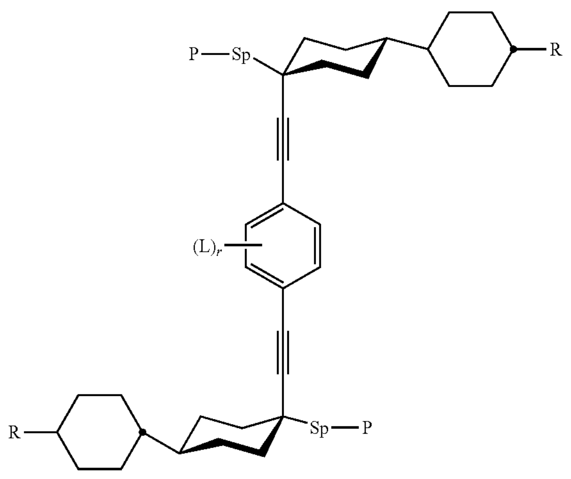
H15
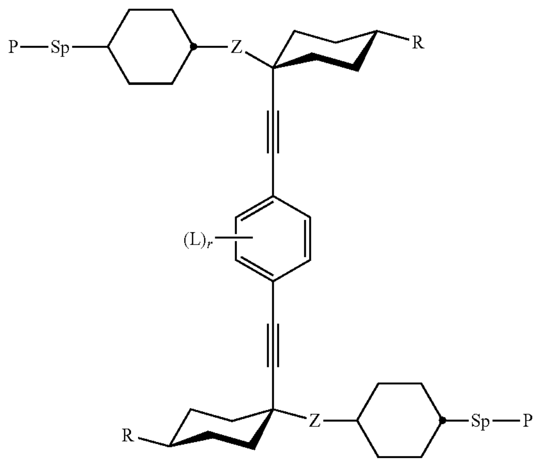
H16
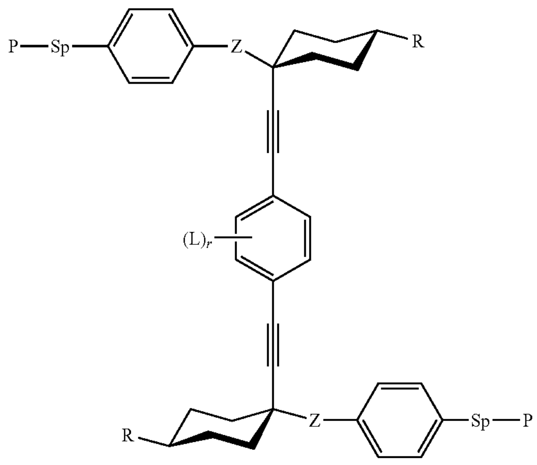
-continued
H17
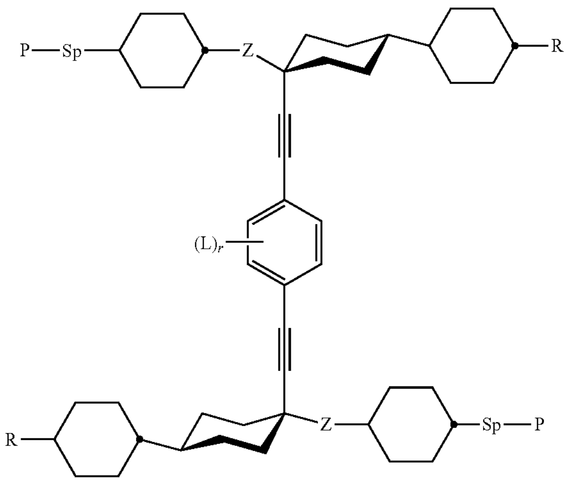
H18
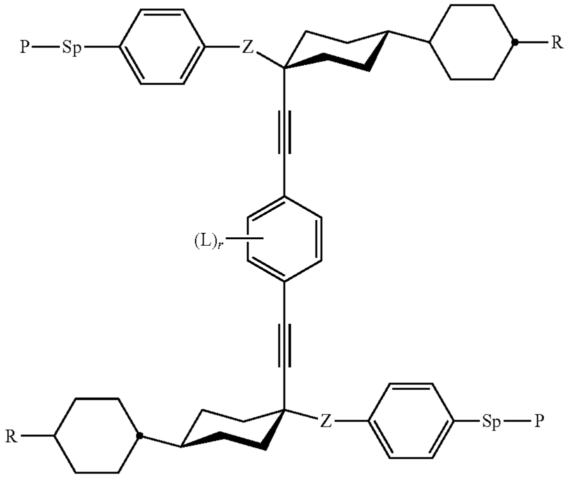
H19
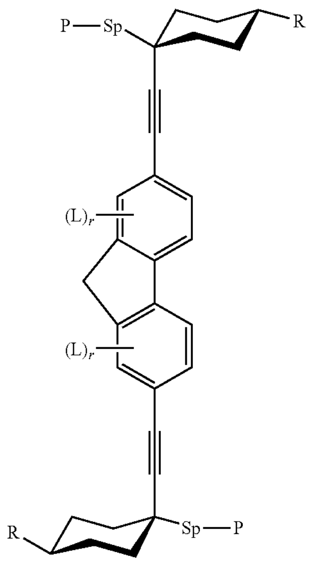

63
-continued
H20
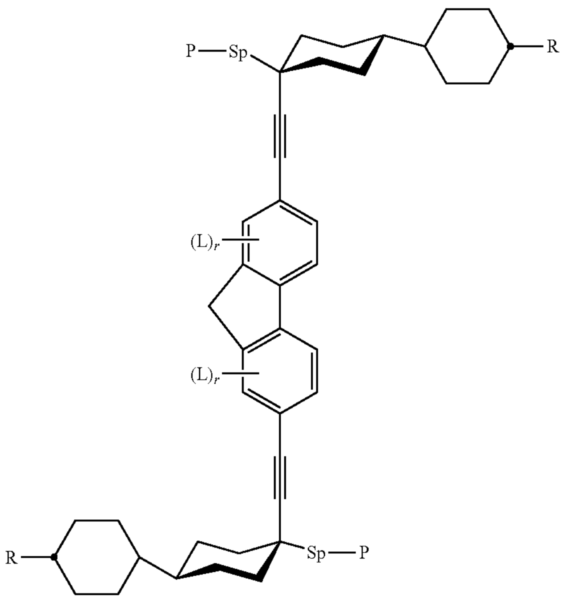
H21
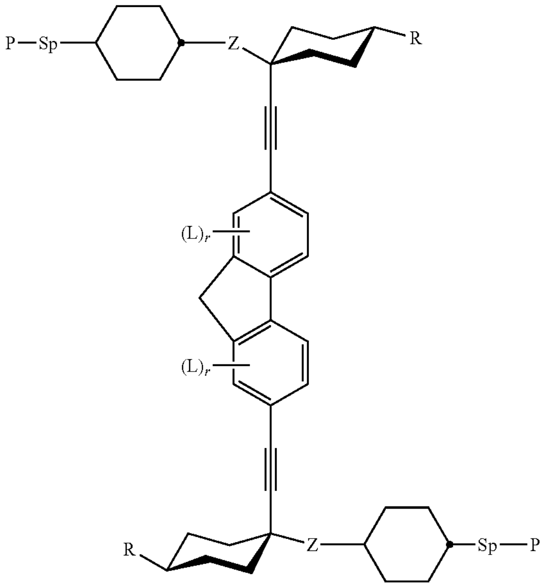
64
-continued
H22
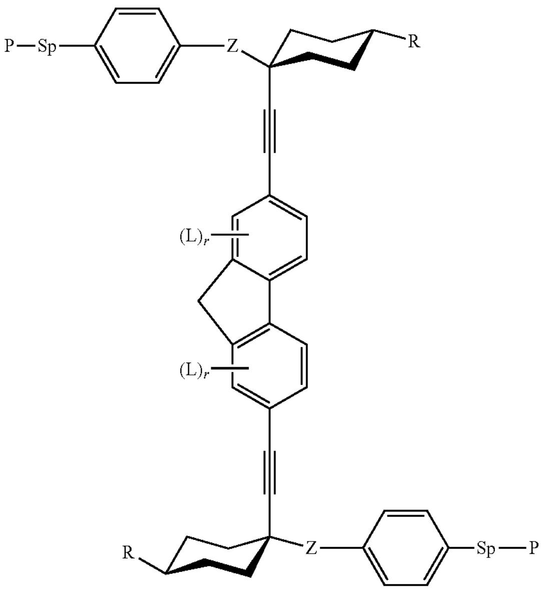
H23
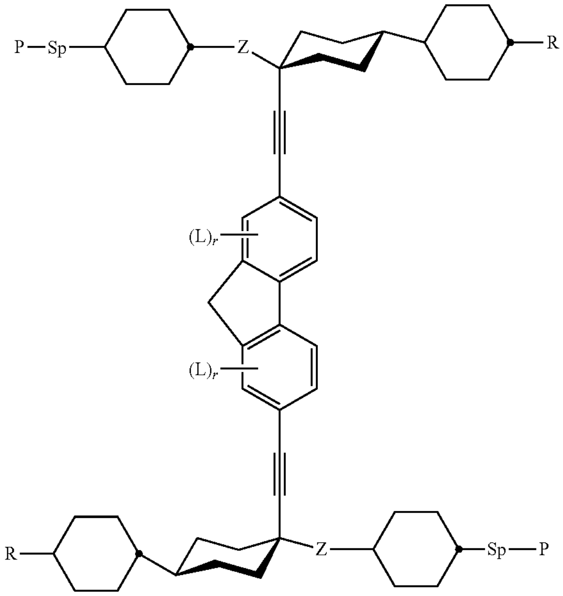

-continued

H24

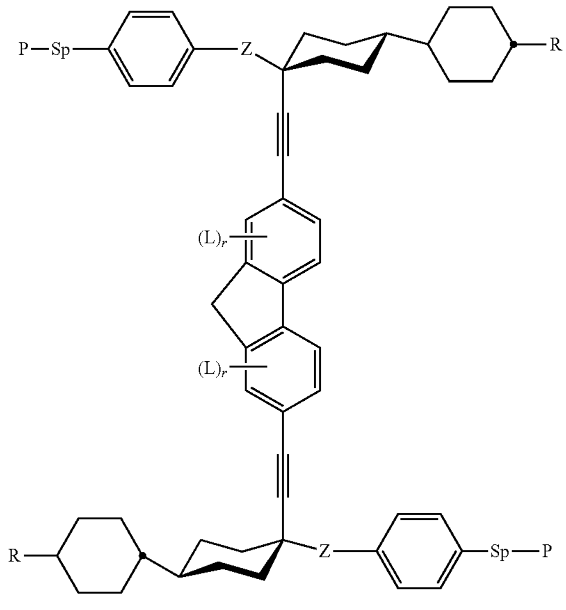

H25

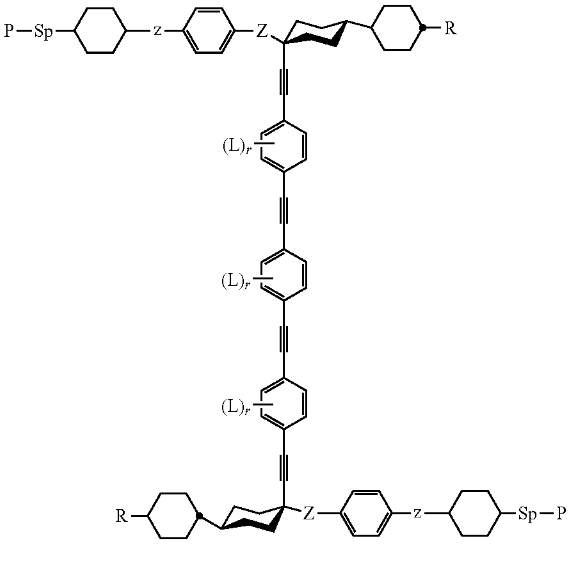

-continued

H26

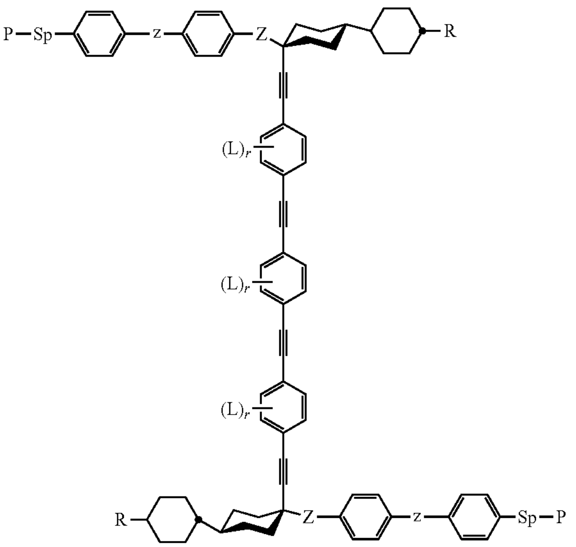

wherein Z has one of the meanings of $Z^1$ given above, R has one of the meanings of $R^1$ as given above that is different from P-Sp-, and P, Sp, L and r are as defined above, and the benzene rings in the mesogenic groups are optionally substituted by one or more groups L as defined above.

Preference is furthermore given to a polymerizable liquid crystalline medium wherein the compounds of formula H are selected from the group of compounds of formula H 25 or H 26, in particular wherein Z denotes —COO—, r is in each occurrence 0, and P, Sp are as defined above.

P-Sp- in these preferred compounds is preferably P-Sp'-X', with X' preferably being —O—, —COO— or —OCOO—.

The compounds of formula H and suitable methods for their preparation are disclosed e.g. in WO 2008/119427 A1.

Typically, the proportion of compounds of formula H in a polymerizable liquid-crystalline material utilized for the quarter wave plate as a whole, is preferably in the range from 10 to 99.9% by weight, more preferably in the range from 20 to 80% by weight and even more preferably in the range from 30 to 60% by weight.

Additionally, further polymerizable compounds can be added to the polymerizable LC material utilized for the quarter wave plate. These compounds are preferably mesogenic or liquid crystalline.

More preferably the LC material comprises one or more additional compounds selected from reactive mesogens (RMs), most preferably selected from mono- and direactive RMs, which are commonly known by the skilled person.

In a further preferred embodiment the polymerizable LC material utilized for the quarter wave plate optionally comprises one or more additives selected from the group consisting of polymerisation initiators, antioxidants, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and/or nanoparticles.

Typically, a method of preparing a quarter wave plate comprises at least the steps of providing a layer of a polymerizable LC material as described above onto a substrate, polymerising the polymerizable LC material by photopolymerisation, and optionally removing the polymerised LC material from the substrate and/or optionally providing it onto another substrate.

The quarter-wave plate is designed to have the retarded phase axis aligned in such a way that circularly polarized light transmitted by the polarizer and quarter wave plate rotates in the direction opposite to that of circularly polarized light to which the light reflecting polymer film exhibits selective reflection.

The light reflecting polymer film has a function of separating incident light into two different circularly polarized light components by reflecting or transmitting light in a given VIS wavelength range.

Preferably the light reflective polymer film corresponds to a cholesteric liquid crystal polymer film. Cholesteric liquid crystal polymer films exhibit a peculiar optical characteristic based on the helical molecular structure. More specifically, such polymer film separates incident light entering in parallel to the helical axis into two components at a wavelength corresponding to the helical pitch, depending on their helical rotational direction, the one rotating in one direction being reflected and the other being transmitted. This is known as selective reflection.

The central wavelength $\lambda_0$ in the selective reflection by the cholesteric liquid crystal polymer film and principal reflection wavelength range $\lambda_\Delta$ are given by $\lambda_0=n_{av.}*p$ and $\lambda_\Delta=\Delta n*p$, respectively, wherein, "p" is a helical pitch of the cholesteric liquid crystal polymer film, and $n_{av}$ and $\Delta n$ are average refractive index and birefringence (differential refractive index) of the liquid crystals that constitutes the cholesteric liquid crystal polymer film, respectively.

The birefringence $\Delta n$ herein is defined by equation $\Delta n=n_e-n_o$, wherein $n_e$ is the extraordinary refractive index and $n_o$ is the ordinary refractive index and the average refractive index $n_{av.}$ is given by equation $n_{av.}=[(2\ n_o^2+n_e^2)/3]^{1/2}$.

The extraordinary refractive index $n_e$ and the ordinary refractive index $n_o$ can be measured e.g. using a modified Abbe refractometer in accordance to "Merck Liquid Crystals, Physical Properties of Liquid Crystals", Status November 1997, Merck KGaA, Germany.

Suitable cholesteric polymerizable liquid crystal materials from which the patterned or structured cholesteric polymer film of the optical component is obtainable or obtained are commonly known by the skilled person and are described for example in WO2016/184543 A1, U.S. Pat. No. 6,514,578 B1, GB 2 388 599 B1, U.S. Pat. No. 7,597,942 B1, US 2003-072893 A1 and US 2006-0119783 A1.

As given above, the central wavelength $\lambda_0$ in the selective reflection by the cholesteric liquid crystal polymer film and principal reflection wavelength range $\lambda_\Delta$ are given by $\lambda_0=n_{av.}*p$ and $\lambda_\Delta=\Delta n*p$, respectively, wherein, "p" is a helical pitch of the cholesteric liquid crystal polymer film, and $n_{av}$ and $\Delta n$ are average refractive index and birefringence (differential refractive index) of the liquid crystals that constitutes the cholesteric liquid crystal polymer film, respectively.

The pitch induced by the chiral substance (p) is in a first approximation inversely proportional to the concentration (c) of the chiral material used. The constant of proportionality of this relation is called the helical twisting power (HTP) of the chiral substance and defined by the following equation HTP=1/(c*P0) wherein c is concentration of the chiral compound.

Accordingly, it is a matter of routine for the skilled artisan to select the required concentration of chiral compounds in the cholesteric polymerizable liquid-crystalline material in order to achieve the desired central wavelength $\lambda_0$ in the selective reflection or the required principal reflection wavelength range $\lambda_\Delta$ of the cholesteric liquid crystal polymer film.

In a preferred embodiment, the structured or patterned cholesteric LC polymer film exhibits a selective reflection wavelength in the range of the VIS light, preferably in the range from 350 nm to 500 nm, and more preferably in the range from 380 to 450 nm.

In accordance with the invention, the cholesteric LC polymer film and the polarizer in combination with the quarter wave plate are transmissive for circularly polarized light of the same handedness. The light ray is therefore transmitted by the cholesteric LC polymer film and able to reach the viewer, which after having passed the polarizer in combination with the quarterwave plate is linearly polarized.

The light reflecting polymer film has preferably a thickness of from 0.5 to 10 μm, very preferably from 0.5 to 5 μm, in particular from 0.5 to 3 μm.

A structured cholesteric LC polymer film in the sense of the instant application denotes a non-continuous cholesteric LC polymer film covering only parts of the whole surface of the optical component, for instance a non-continuous cholesteric LC polymer film which ins only provided onto distinct areas of the surfaces of the optical component.

In case of a structured cholesteric LC polymer, preferably, less than 90%, more preferably less than 70%, very preferably less than 50%, even more preferably less than 30%, especially less than 20%, in particular less than 15% of the whole area of one surface of the optical component are covered by the cholesteric LC polymer film.

In case of a structured cholesteric LC polymer, preferably, more than 3%, more preferably more than 5%, very preferably more than 7%, even more preferably more than 10% of the whole area of one surface of the optical component are covered by the cholesteric LC polymer film.

In a preferred embodiment, the structured cholesteric LC polymer film exhibits a selective reflection wavelength of VIS light, preferably in the range from 350 nm to 500 nm, and more preferably in the range from 380 to 450 nm.

A patterned cholesteric LC polymer film in the sense of the instant application denotes a continuous cholesteric LC polymer film exhibiting distinct areas of different selective wavelength reflection throughout the continuous layer of the polymer film for example having areas exhibiting a selective wavelength reflection in the UV light and areas with selective wavelength reflection of VIS light.

In case of a patterned cholesteric LC polymer, less than 90%, more preferably less than 70%, very preferably less than 50%, even more preferably less than 30%, especially less than 20%, in particular less than 15% of the whole area of the cholesteric LC polymer film exhibit a selective wavelength reflection of VIS light.

In case of a patterned cholesteric LC polymer, preferably, more than 3%, more preferably more than 5%, very preferably more than 7%, even more preferably more than 10% of the whole area of the cholesteric LC polymer film exhibit a selective wavelength reflection of VIS light.

In a preferred embodiment, the patterned cholesteric LC polymer film exhibits a selective reflection wavelength of VIS light in the range from 350 nm to 500 nm, and more preferably in the range from 380 to 450 nm.

In a preferred embodiment, the structured cholesteric LC polymer films are preferably obtainable from a cholesteric polymerizable LC material which is provided on distinct areas of substrate by Inkjet printing of the polymerizable cholesteric LC material CLC only on parts of the substrate and subsequent cure.

In another preferred embodiment the structured cholesteric LC polymer films are preferably obtainable from a cholesteric polymerizable LC material by a solvent wash process which comprises preferably the steps of providing a continuous layer of cholesteric polymerizable LC material onto a substrate, patterning by irradiating the layer of cholesteric polymerizable LC material through a photomask, and a washing step whereby the uncured material is washed away with the help of a suitable solvent. A preferred method is described in detail in Richard Harding, Iain Gardiner, Hyun-Jin Yoon, Tara Perrett, Owain Parri, Karl Skjonnemand, "Reactive liquid crystal materials for optically anisotropic patterned retarders," Proc. SPIE 7140, Lithography Asia 2008, 71402J (4 Dec. 2008).

In another preferred embodiment patterned cholesteric LC polymer films are preferably obtainable from a cholesteric polymerizable LC material by a thermal process comprising the steps of providing a continuous layer of cholesteric polymerizable LC material onto a substrate, patterning by curing the layer of cholesteric polymerizable LC material through a photomask, heating the layer above the clearing point of the cholesteric polymerizable LC material and curing the remaining uncured cholesteric polymerizable LC material in its isotropic phase. A preferred method is described in detail in Richard Harding, Iain Gardiner, Hyun-Jin Yoon, Tara Perrett, Owain Parri, Karl Skjonnemand, "Reactive liquid crystal materials for optically anisotropic patterned retarders," Proc. SPIE 7140, Lithography Asia 2008, 71402J (4 Dec. 2008).

In another preferred embodiment patterned cholesteric LC polymer films are preferably obtainable from a cholesteric polymerizable LC material comprising a photoisomerisable polymerizable mesogenic compound, such as for example compounds of formula CRMb as described further below, by a photoisomerization patterning process comprising the steps of providing a continuous layer of cholesteric polymerizable LC material onto a substrate, curing with photo mask and a first UV irradiation capable to induce photoisomerisation of photoisomerisable compounds of cholesteric polymerizable LC material while being uncapable to cure the polymerizable compounds, curing the cholesteric polymerizable LC material with a second UV irradiation capable to induce polymerisation of the cholesteric polymerizable LC material. A preferred method is describe in J. Lub, W. P. M. Nijssen, R. T. Wegh, I. De Francisco, M. P. Ezquerro & B. Malo (2005) Photoisomerizable chiral compounds derived from isosorbide and cinnamic acid, Liquid Crystals, 32:8, 1031-1044.

Accordingly, the invention further relates to a process for the production of the optical component comprising at least the steps of providing a continuous or discontinuous layer of a cholesteric polymerizable LC material on a substrate and curing the cholesteric polymerizable LC material as described above and below.

Suitable substrate materials and substrates are known to the expert and described in the literature, as for example conventional substrates used in the optical films industry, such as glass or plastic. Especially suitable and preferred substrates for polymerization are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), in particular triacetylcellulose (TAC), cyclo olefin polymers (COP), the quarter wave plate as described above and below, commonly known colour filter materials or even on transparent electrode materials of an OLED.

The optical component in accordance with the present invention has preferably the following sequence of layers:

a polarizer located on top of the stack, a quarter wave plate sandwiched between the polarizer and the structured or patterned cholesteric LC polymer film, and a structured or patterned cholesteric LC polymer film on the bottom.

In a preferred embodiment, the optical component comprises additionally an optical compensation layer, which is preferably provided between the polarizer and adjacent to the structured or patterned cholesteric polymer film or the utilized light-emitting device for the optical component as described below.

Preferably, the optical compensation layer is obtainable from a polymerizable LC material. Such polymerizable liquid crystal materials are known in prior art for the preparation of anisotropic polymer films with uniform orientation. These films are usually prepared by coating a thin layer of a polymerizable liquid crystal mixture onto a substrate, aligning the mixture into uniform orientation and polymerizing the mixture. The orientation of the film can be planar, i.e. where the liquid crystal molecules are oriented substantially parallel to the layer, homeotropic (rectangular or perpendicular to the layer) or tilted, corresponding optical films are described, for example, in EP 0 940 707 B1, EP 0 888 565 B1 and GB 2 329 393 B1.

Preferably, the optical compensation layer serves as an optical indicatrix having no refractive index distribution in the in-plane direction and having a refractive index in the thickness direction different from that in the in-plane direction.

The optical component in accordance with the present invention may furthermore comprise filters which block light of certain wavelengths. In accordance with the invention, further functional layers, such as, for example, UV filters, protective films, heat-insulation films or metal-oxide layers, may also be present.

The invention further relates to the use of an optical component as described above and below in an electrooptical device, preferably in an OLED. In particular, the structured or patterned cholesteric LC polymer film of the optical component exhibits its function when selectively positioned at least in the light-emitting area of a pixel of an OLED, preferably in the light-emitting area of a subpixel of an OLED, more preferably in the light-emitting area of a blue subpixel of an OLED.

The invention further relates to the electrooptical device, preferably an OLED, comprising the optical component as described above and below.

Preferred is an OLED comprising the optical component in accordance with the present invention wherein at least 50%, preferably at least 60%, more preferably at least 70%, especially at least 80% and in particular at least 90% of blue subpixel area is covered with the light reflecting polymer film.

Preferred is an OLED comprising the optical component in accordance with the present invention wherein the main reflecting peak of the patterned or structured polymer film and the main light emitting peak of the blue sub pixel of the OLED are both in the range from 300 nm to 400 nm. Preferably the main reflecting peak of the patterned or structured polymer film and the main light emitting peak of the blue sub pixel of the OLED are in the range of +/−50 nm with respect to each other, more preferably in the range of +/−25 nm with respect to each other, even more preferably in the range of +/−10 nm with respect to each other.

It is also preferred that the main reflecting peak of the patterned or structured polymer film is located at a longer wavelength of +50 nm, preferably +25 nm and even more preferably +10 nm with and the main light emitting peak of the blue sub pixel of the OLED Especially preferred cholesteric polymerizable LC materials utilized for a patterned or structured cholesteric polymer film comprise one or more compounds of formula A,

I

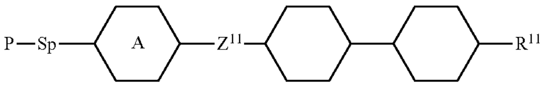

P is a polymerizable group,

Sp is a spacer group or a single bond, $R^{11}$ is alkyl, alkoxy, thioalkyl, alkylcarbonyl, alkoxycarbonyl, alkylcarbonyloxy or alkoxycarbonyloxy preferably with 1 to 15 C atoms which is optionally fluorinated.

A denotes, an aromatic or alicyclic group, which optionally containing one or more heteroatoms selected from N, O and S, and optionally mono- or polysubstituted by L, L is F, Cl, Br, I, —CN, —$NO_2$, —NCO, —NCS, —OCN, —SCN, —C(=O)$NR^xR^y$, —C(=O)$OR^x$, —C(=O)$R^x$, —$NR^xR^y$, —OH, —$SF_5$, or straight chain or branched alkyl, alkoxy, alkylcarbonyl, alkoxycarbonyl, alkylcarbonyloxy or alkoxycarbonyloxy with 1 to 12, wherein one or more H atoms are optionally replaced by F or Cl, preferably F, —CN or straight chain or branched alkyl, alkoxy, alkylcarbonyl, alkoxycarbonyl, alkylcarbonyloxy or alkoxycarbonyloxy 1 to 6 C atoms, $R^{00}$, $R^{000}$, $R^x$ and $R^y$ independently of each other denote H or alkyl with 1 to 12 C-atoms, $Z^{11}$ and $Z^{12}$ denotes, in case of multiple occurrence independently of one another, —O—, —S—, —CO—, —COO—, —OCO—, —S—CO—, —CO—S—, —O—COO—, —CO—$NR^{00}$—, —$NR^{00}$—CO—, —$NR^{00}$—CO—$NR^{000}$, —$NR^{00}$—CO—O—, —O—CO—$NR^{00}$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_{n1}$, —$CF_2CH_2$—, —$CH_2CF_2$—, —$CF_2CF_2$—, —CH=N—, —N=CH—, —N=N—, —CH=$CR^{00}$—, —$CY^1$=$CY^2$—, —C≡C—, —CH=CH—COO—, —OCO—CH=CH— or a single bond, preferably —COO—, —OCO— or a single bond, more preferably —COO— or —OCO—, $Y^1$ and $Y^2$ independently of each other denote H, F, Cl or CN, and n1 is an integer from 1 to 10, preferably 1, 2, 3 or 4.

Preferred compounds of formula A are those wherein

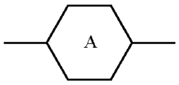

denotes a radical selected from the following groups:

a) a group consisting of 1,4-phenylene and 1,3-phenylene, wherein, in addition, one or two CH groups may be replaced by N and wherein, in addition, one or more H atoms may be replaced by L, b) a group selected from the group consisting of

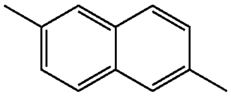,

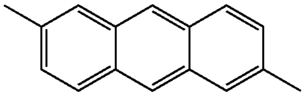,

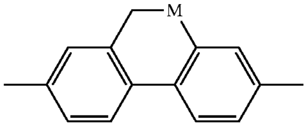,

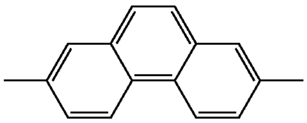,

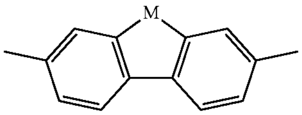,

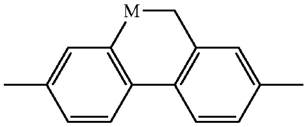,

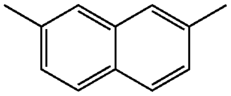,

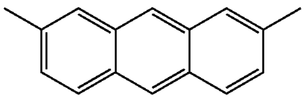, 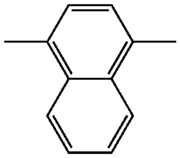,

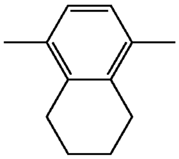, 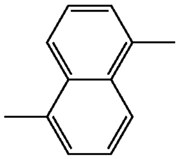, where, in addition, one or more H atoms in these radicals may be replaced by L, and/or one or more double bonds may be replaced by single bonds, and/or one or more CH groups may be replaced by N, c) group consisting of trans-1,4-cyclohexylene, 1,4-cyclohexenylene, wherein, in addition, one or more non-adjacent $CH_2$ groups may be replaced by —O— and/or —S— and wherein, in addition, one or more H atoms may be replaced by F, or d) a group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, and wherein L on each occurrence, identically or differently, denotes —OH, —F, —Cl, —Br, —I, —CN, —$NO_2$, $SF_5$, —NCO, —NCS, —OCN, —SCN, —C(═O)N($R^z$)$_2$, —C(═O)$R^z$, —N($R^z$)$_2$, optionally substituted silyl, optionally substituted aryl having 6 to 20 C atoms, or straight-chain or branched or cyclic alkyl, alkoxy, alkylcarbonyl, alkoxycarbonyl, alkylcarbonyloxy or alkoxycarbonyloxy having 1 to 25 C atoms, preferably 1 to 12 C atoms, more preferably 1 to 6 C atoms, in which, in addition, one or more H atoms may be replaced by F or Cl.

Further preferred compounds of formula A are those wherein

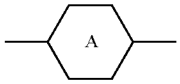

denotes a radical selected from a group consisting of 1,4-phenylene, wherein, in addition, one or two CH groups may be replaced by N and wherein, in addition, one or more H atoms may be replaced by L, wherein L on each occurrence, identically or differently, denotes —OH, —F, —Cl, or straight-chain, branched or cyclic alkyl, alkoxy, alkylcarbonyl, alkoxycarbonyl, alkylcarbonyloxy or alkoxycarbonyloxy having 1 to 25 C atoms, preferably 1 to 12 C atoms, more preferably 1 to 6 C atoms, in which, in addition, one or more H atoms may be replaced by F or Cl.

Further preferred compounds of formula A are those of the following table:

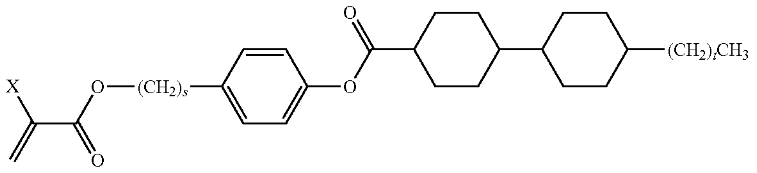
Ia-1

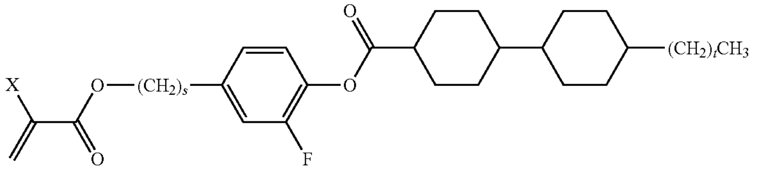
Ib-1

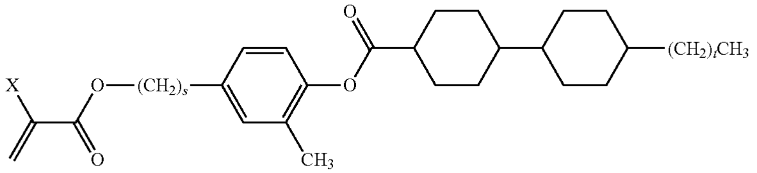
Ib-2

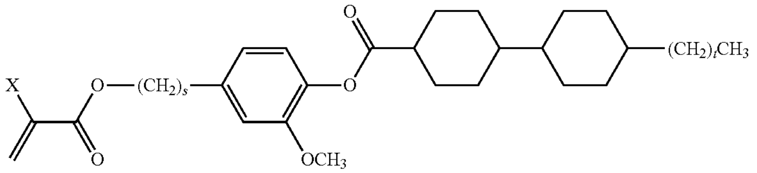
Ib-3

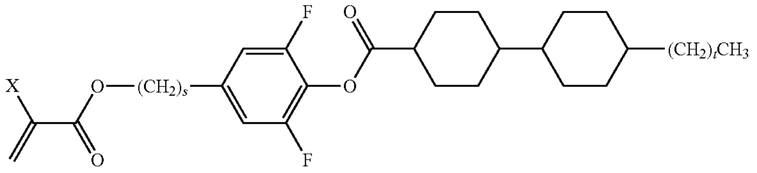
Ic-1

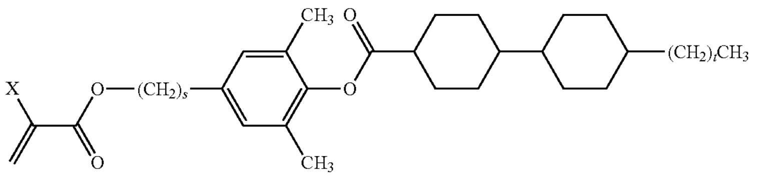
Ic-2

-continued

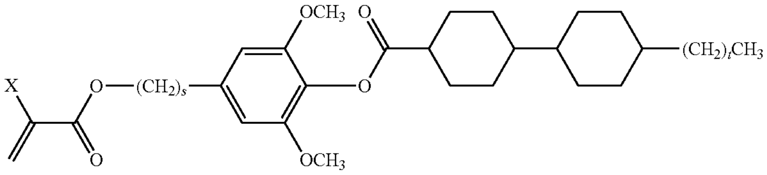

Ic-3

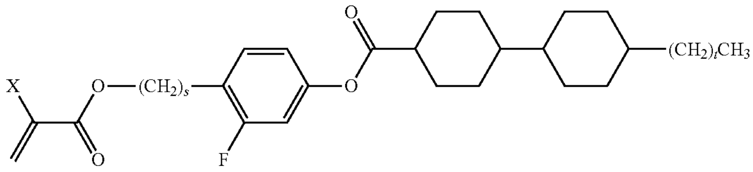

Id-1

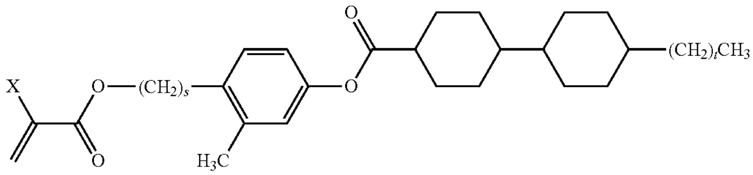

Id-2

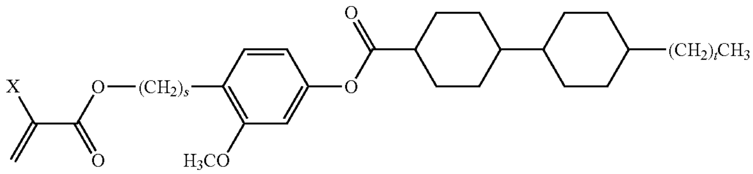

Id-3

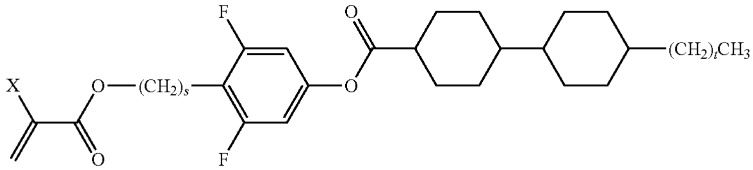

Ie-1

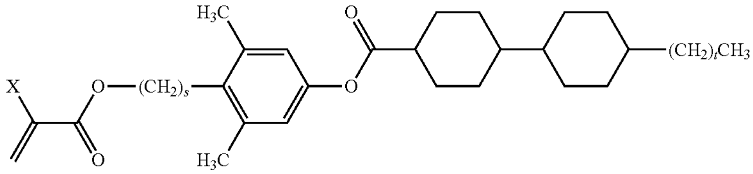

Ie-2

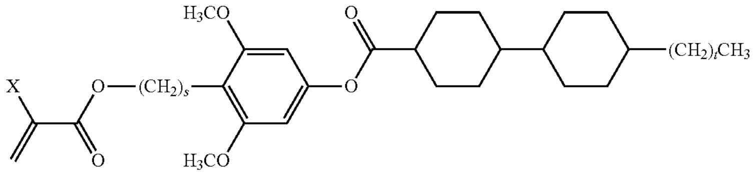

Ie-3 wherein

X denotes H or $-CH_3$, s denotes 0, 1, 2, 3, 4, 5, 6 or 7, preferably 5, 6 or 7, and t denotes 0, 1, 2, 3, 4, or 5, preferably 2, 3, 4 or 5.

In another preferred embodiment of the present invention, the utilized cholesteric polymerizable LC material comprises alternatively to or in combination with one or more compounds of formula A, one or more compounds of formula B,

B

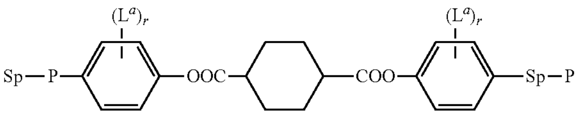

wherein

P is independently of one another, a polymerizable group, preferably having one of the meanings given for P below, and is more preferably an acryl, methacryl, oxetane, 3-ethyloxetane, epoxy, vinyloxy or styrene group, Sp is a spacer group or a single bond, preferably having one of the meanings given for Sp' below, $L^a$ is, in case of multiple occurrence identically or differently F, Cl, CN, SCN, $SF_5$ or straight-chain or branched, optionally mono- or polyfluorinated alkyl, alkoxy, alkenyl, alkynyl, alkylcarbonyl, alkoxycarbonyl, or alkylcarbonyloxy or alkoxycarbonyloxy having 1 to 12 C atoms, (wherein the groups different from alkyl and alkoxy contain at least 2 C atoms and branched groups contain at least 3 C atoms) or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4.

Preferably, the compounds of formula B are selected from the following sub formulae, (Ba)

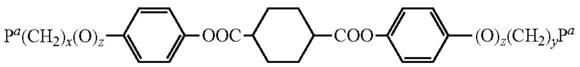

wherein the parameter P has one of the meanings as given above under formula B and x, y, z, are independently of each other 0 or identical or different integers from 1 to 12.

Furthermore, preference is given to a polymerizable LC medium wherein the compounds of formula B are selected from the following sub formulae, (B1)

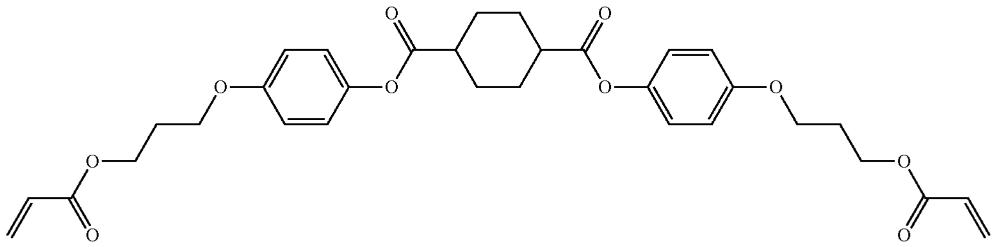

(B2)

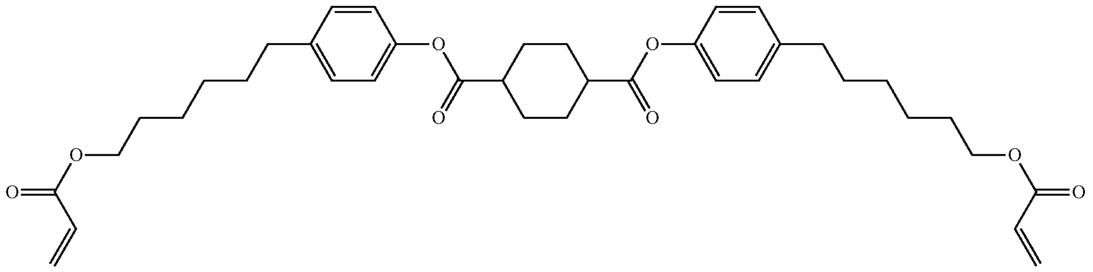

(B3)

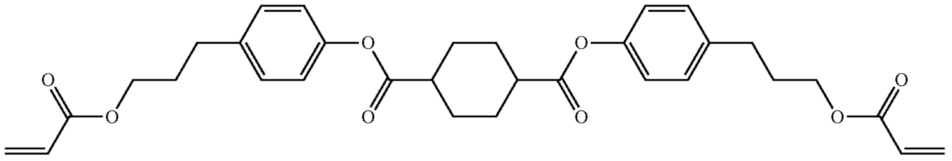

(B4)

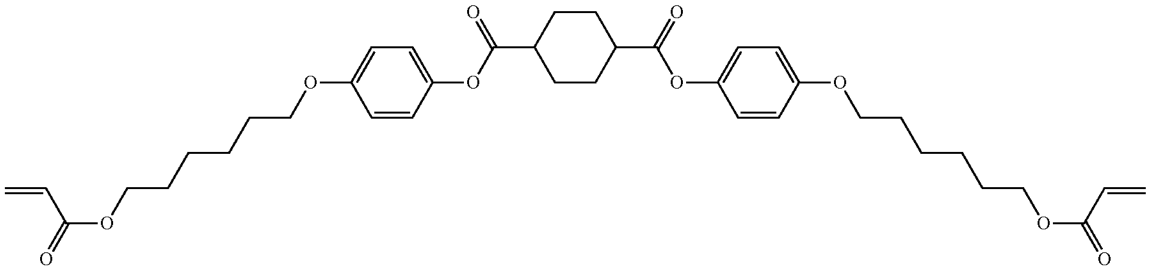

-continued (B5)

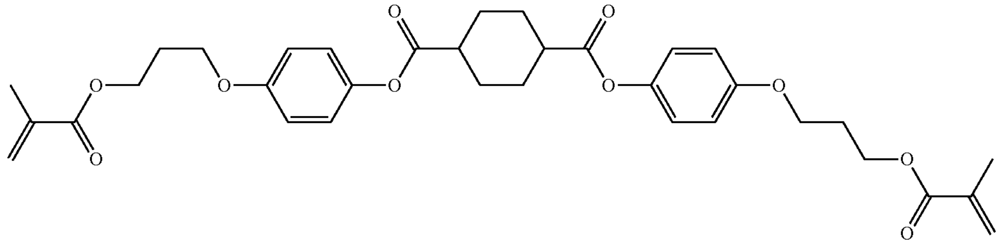

(B6)

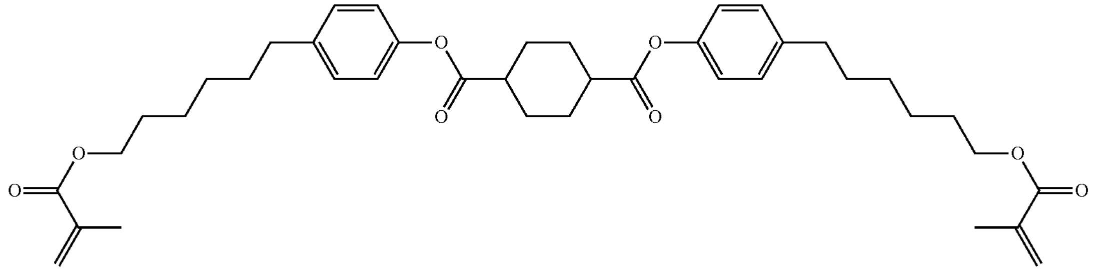

(B7)

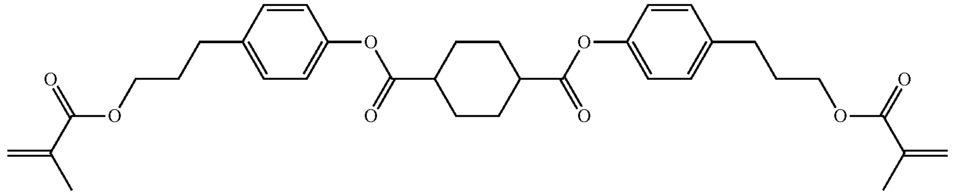

(B8)

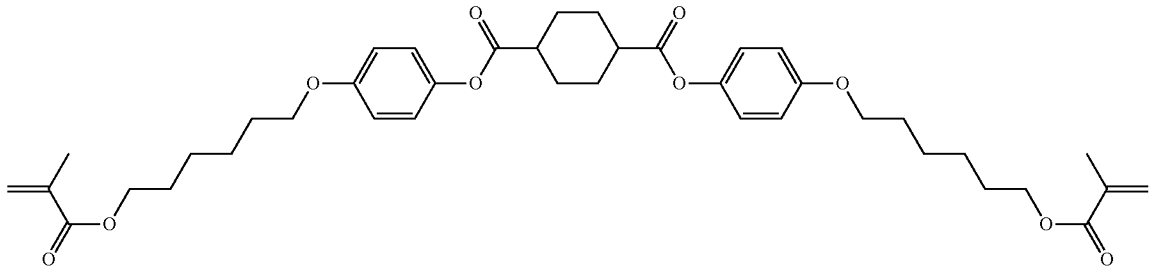

In a further preferred embodiment, the compounds of formula B are selected from the group of compounds of formula B2 or B6, in particular a compound of formula B2.

The cholesteric polymerizable LC material additionally comprises one or more chiral compounds. These chiral compounds may be non-mesogenic compounds or mesogenic compounds. Additionally, these chiral compounds, whether mesogenic or non-mesogenic, may be non-reactive, monoreactive or multireactive.

Preferably the utilized chiral compounds have each alone or in combination with each other an absolute value of the helical twisting power ($|HTP_{total}|$) of 20 $\mu m^{-1}$ or more, preferably of 40 $\mu m^{-1}$ or more, more preferably in the range of 60 $\mu m^{-1}$ or more, most preferably in the range of 80 $\mu m^{-1}$ or more to 260 $\mu m^{-1}$, in particular those disclosed in WO 98/00428.

Preferably, non-polymerizable chiral compounds are selected from the group of compounds of formulae C-I to C-III,

C-I

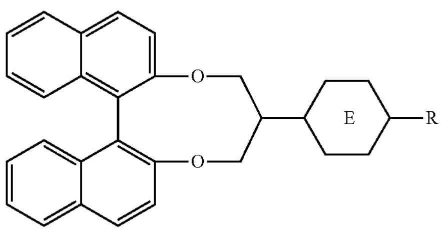

-continued

C-II

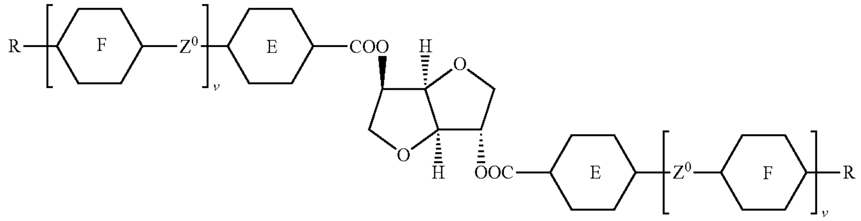

C-III

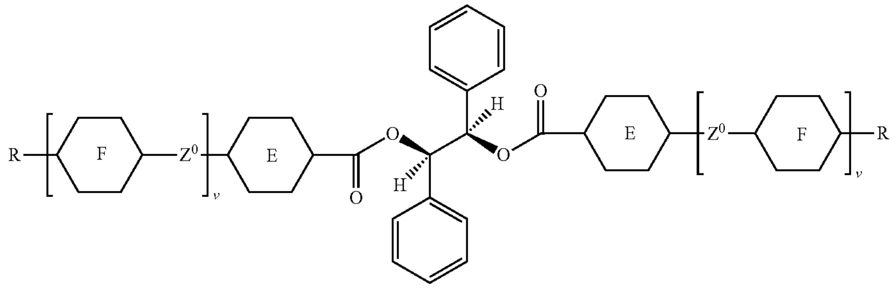

the latter ones including the respective (S,S) enantiomers, wherein E and F are each independently 1,4-phenylene or trans-1,4-cyclohexylene, v is 0 or 1, $Z^0$ is —COO—, —OCO—, —$CH_2CH_2$— or a single bond, and R is alkyl, alkoxy or alkanoyl with 1 to 12 C atoms.

Particularly preferred is a cholesteric polymerizable LC material that comprises one or more chiral compounds, which do not necessarily have to show a liquid crystalline phase.

The compounds of formula C-II and their synthesis are described in WO 98/00428. Especially preferred is the compound CD-1, as shown in table D below. The compounds of formula C-III and their synthesis are described in GB 2 328 207.

Further, typically used chiral compounds are e.g. the commercially available R/S-5011, CD-1, R/S-811 and CB-15 (from Merck KGaA, Darmstadt, Germany).

The above-mentioned chiral compounds R/S-5011 and CD-1 and the (other) compounds of formulae C-I, C-II and C-III exhibit a very high helical twisting power (HTP), and are therefore particularly useful for the purpose of the present invention.

The cholesteric polymerizable LC material preferably comprises 1 to 5, in particular 1 to 3, very preferably 1 or 2 chiral compounds, preferably selected from the above formula C-II, in particular CD-1, and/or formula C-III and/or R-5011 or S-5011, very preferably, the chiral compound is R-5011, S-5011 or CD-1.

Preferably the cholesteric polymerizable LC material comprise one or more non-reactive chiral compound and/or one or more reactive chiral compounds, which are preferably selected from mono- and/or multireactive chiral compounds.

Suitable mesogenic reactive chiral compounds preferably comprise one or more ring elements, linked together by a direct bond or via a linking group and, where two of these ring elements optionally may be linked to each other, either directly or via a linking group, which may be identical to or different from the linking group mentioned. The ring elements are preferably selected from the group of four-, five-, six- or seven-, preferably of five- or six-, membered rings.

Preferred mono-reactive chiral compounds are selected from compounds of formula CRMa to CRMc, CRMa

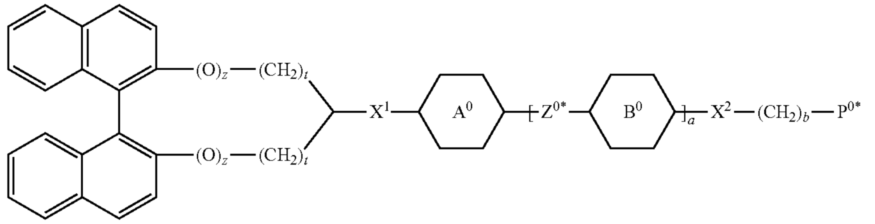

CRMb

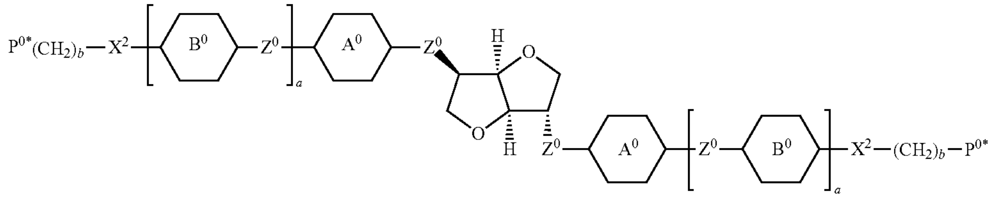

-continued

CRMc

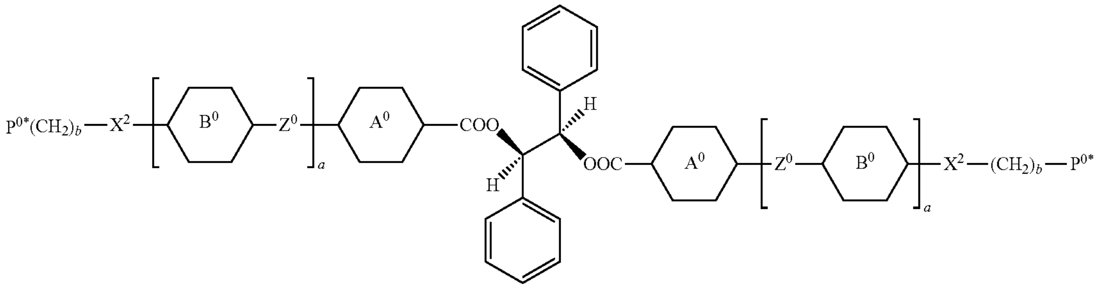

wherein $P^0$* denotes a polymerizable group P

Sp* denotes a spacer Sp $A^0$ and $B^0$ are, in case of multiple occurrence independently of one another, 1,4-phenylene that is unsubstituted or substituted with 1, 2, 3 or 4 groups L as defined above, or trans-1,4-cyclohexylene, $X^1$ and $X^2$ are independently of each other —O—, —COO—, —OCO—, —O—CO—O— or a single bond, $Z^0$* is, in case of multiple occurrence independently of one another, —COO—, —OCO—, —O—CO—O—, —$OCH_2$—, —$CH_2O$—, —$CF_2O$—, —$OCF_2$—, —$CH_2CH_2$—, —$(CH_2)_4$—, —$CF_2CH_2$—, —$CH_2CF_2$—, —$CF_2CF_2$—, —C≡C—, —CH=CH—, —CH=CH—COO—, —OCO—CH=CH— or a single bond, t is, independently of each other 0, 1, 2 or 3, a is 0, 1 or 2, b is 0 or an integer from 1 to 12, z is 0 or 1, and wherein the naphthalene rings in formula CRMa can additionally be substituted with one or more identical or different groups L, wherein L is, independently of each other F, Cl, CN, halogenated alkyl, alkoxy, alkylcarbonyl, alkoxycarbonyl, alkylcarbonyloxy or alkoxycarbonyloxy with 1 to 5 C atoms.

The compounds of formula CRMa are preferably selected from the group of compounds of formulae CRMa-1.

CRMa-1

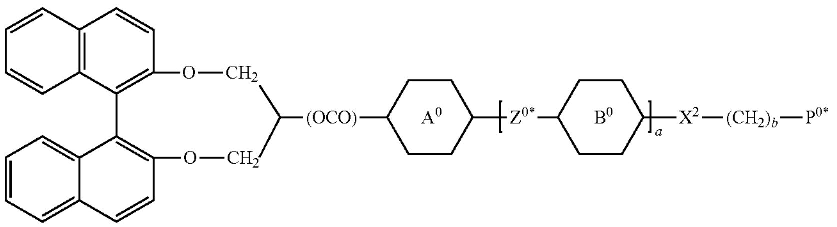

wherein $X^2$, $A^0$, $B^0$, $Z^0$*, $P^0$* and b have the meanings given in formula CRMa or one of the preferred meanings given above and below, and (OCO) denotes —O—CO— or a single bond.

Especially preferred compounds of formula CRM are selected from the group consisting of the following subformulae:

CRMa-1a

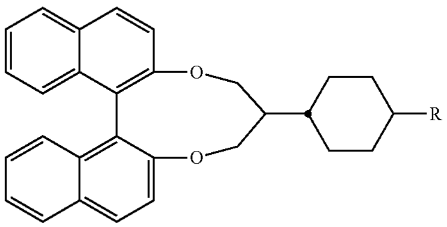

CRMa-1b

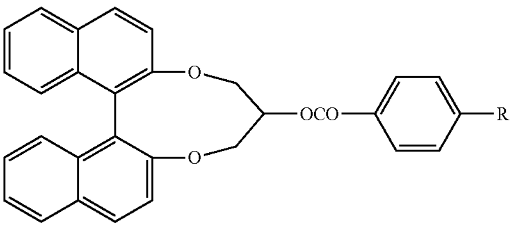

-continued
CRMa-1c
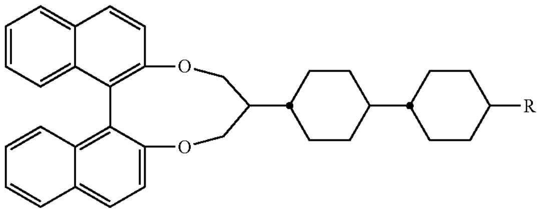
CRMa-1d
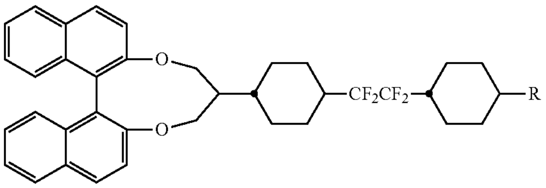
CRMa-1e
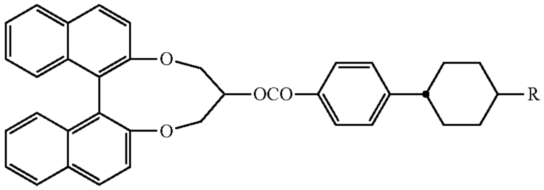
CRMa-1f
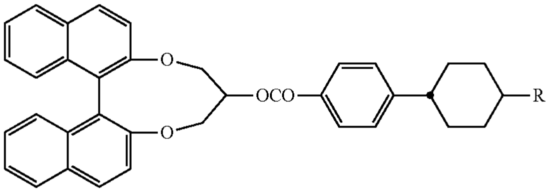
CRMa-1g
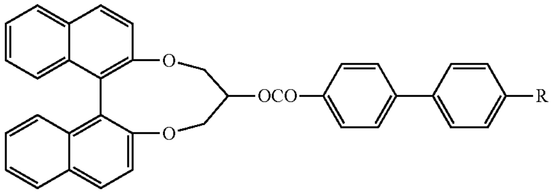
CRMa-1h
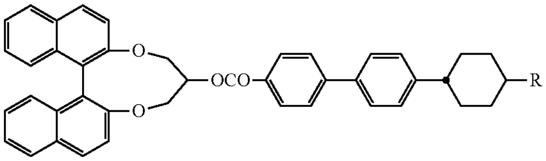
CRMa-1i
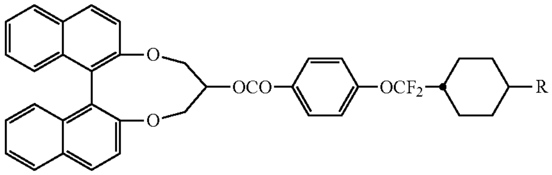
CRMa-1j
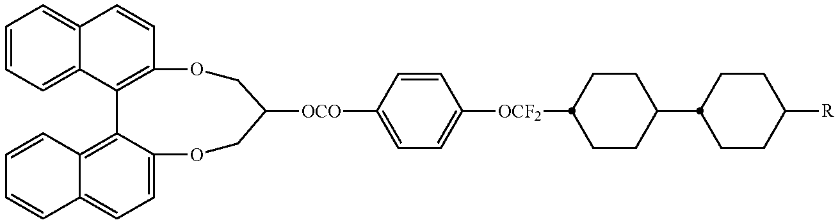
wherein R is $-X^2-(CH_2)_x-P^{0*}$ as defined in formula CRM-a, and the benzene and naphthalene rings are unsubstituted or substituted with 1, 2, 3 or 4 groups L as defined above and below.
The compounds of formula CRMb are preferably selected from the group of compounds of formulae CRMb-1 to CRMb-3,
CRMb-1
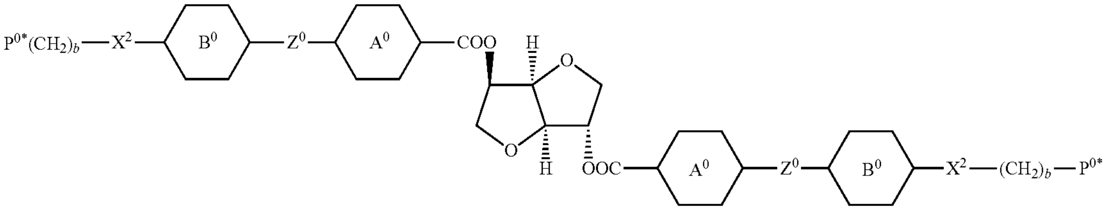

-continued
CRMb-2
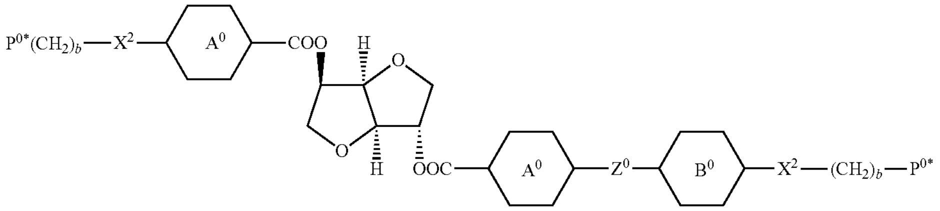
CRMb-3
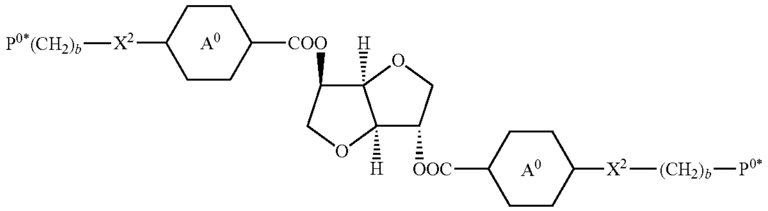
CRMb-4
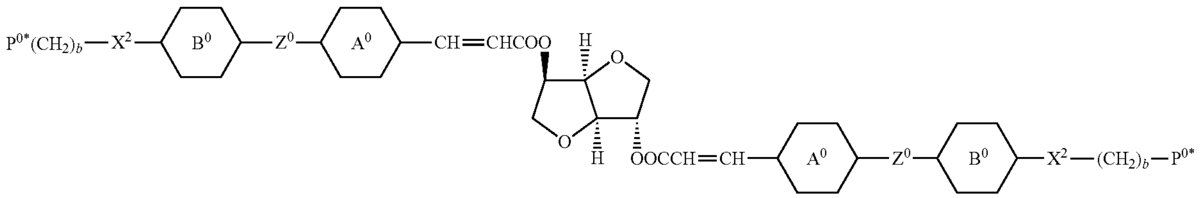
CRMb-5
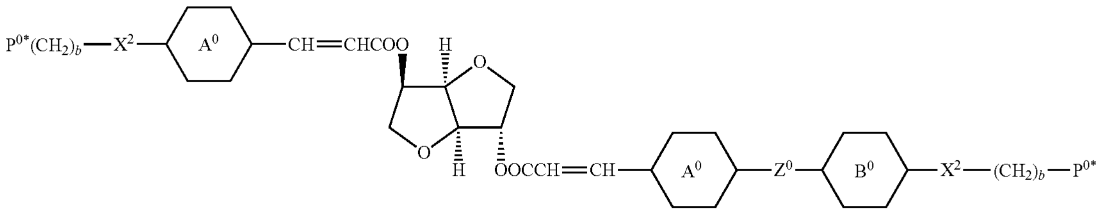
CRMb-6
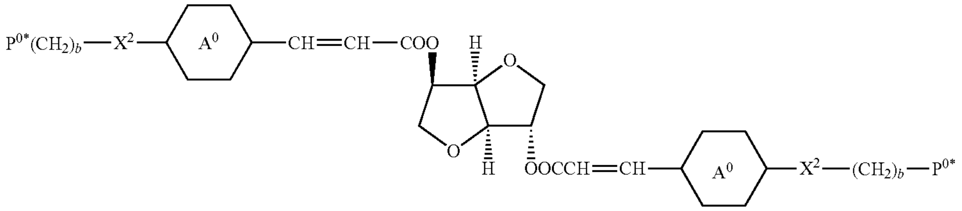
wherein $X^2$, $A^0$, $B^0$, $Z^0$*, $P^0$* and b have the meanings given in formula CRMa or one of the preferred meanings given above and below.
Preferred are compounds of formula CRMb-1 and CRMb-3, which are additionally and preferably are selected from the group of compounds of formulae CRMb-1a, CRMb-1b, and CRMb-3a, CRMb-6a
CRMb-1a
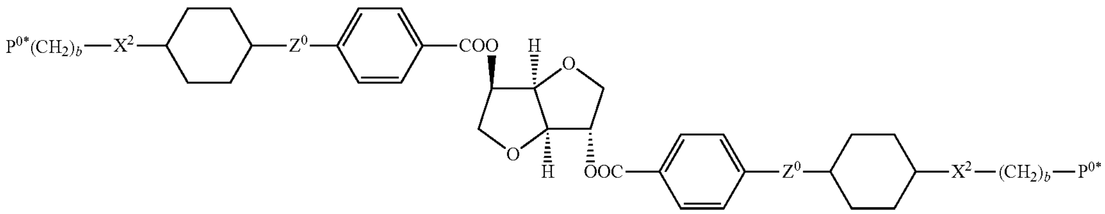

-continued

CRMb-1b

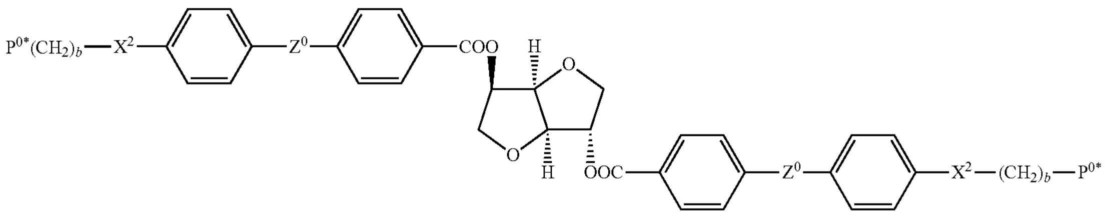

CRMb-3a

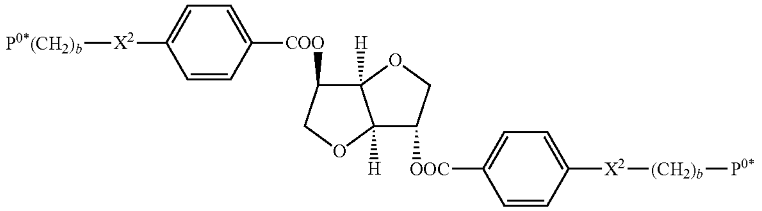

CRMb-6a

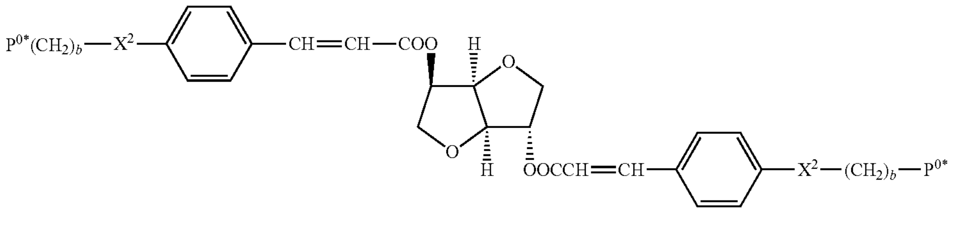

wherein $X^2$, $Z^0$*, $P^0$* and b have the meanings given in formula CRMa or one of the preferred meanings given above and below. Preferably in the compounds of formulae CRMb-1a and CRMb-1b, $Z^0$ denotes OCOO, COO, OCO or a single bond. Preferably in the compounds of formulae CRMb-1a, CRMb-1b, and CRMb-3a, CRMb-6a, $X^2$ denotes 0, OCOO, OCO, COO or a single bond, b denotes 3 or 6 and $P^0$* denotes methacrylic or an acrylic group.

The compounds of formula CRMc are preferably selected from the group of compounds of formulae CRMc-1, CRMc-1

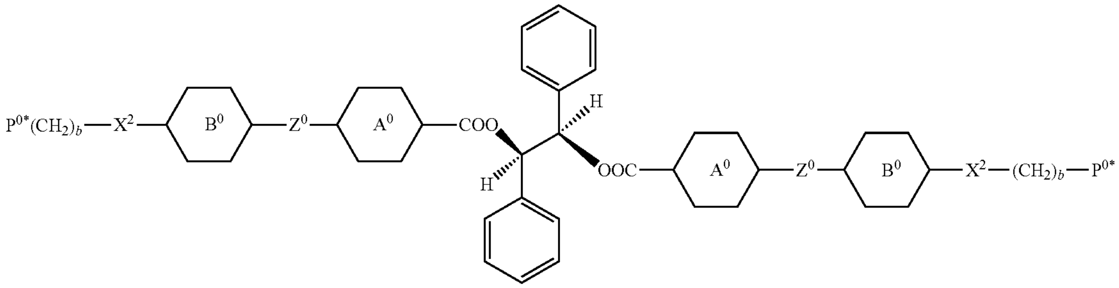

wherein $X^2$, $A^0$, $B^0$, $Z^{0*}$, $P^{0*}$ and b have the meanings given in formula CRMa or one of the preferred meanings given above and below.

Preferred compounds of formula CRMc-1 are preferably selected from the group of compounds of formulae CRMc-1a and CRMc-1b, CRMc-1a

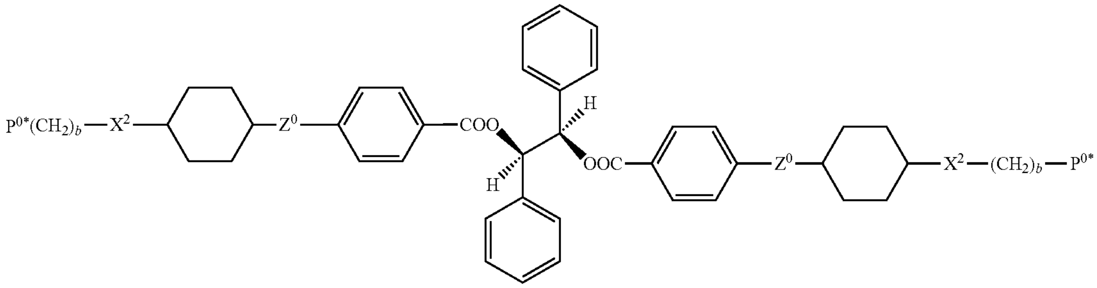

CRMc-1b

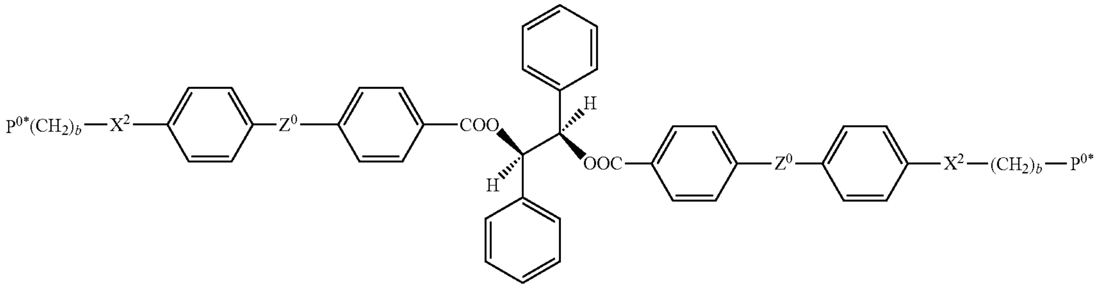

wherein $X^2$, $Z^{0*}$, $P^{0*}$ and b have the meanings given in formula CRMa or one of the preferred meanings given above and below. Preferably in the compounds of formulae CRMc-1a and CRMc-1b, $Z^0$ denotes OOCO, OCOO, COO, OCO or a single bond. Preferably in the compounds of formulae CRMc-1a and CRMc-1b, $X^2$ denotes O, OOCO, OCOO, OCO, COO or a single bond. Preferred are compounds of formula and CRMc-1a that are selected from the following compounds,

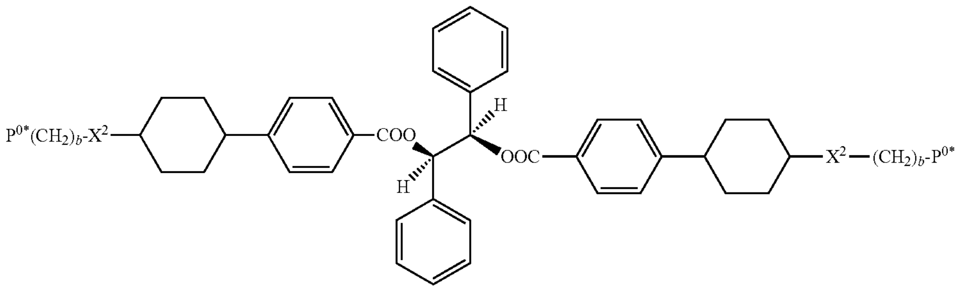

CRMc-1aI wherein $P^{0*}$ and b have the meanings given in formula CRMa or one of the preferred meanings given above and below.

The compound CRMc-1aI wherein $P^{0*}$ denotes in each occurrence an acrylate group and b denotes in each occurrence 3 or 6, and $X^2$ denotes in each occurrence O or a single bond is especially preferred.

The amount of chiral compounds in the liquid-crystalline medium is preferably from 1 to 20%, more preferably from 1 to 15%, even more preferably 1 to 10%, and most preferably 3 to 7%, by weight of the total mixture.

Additionally, further polymerizable compounds can be added to the cholesteric polymerizable LC material. These compounds are preferably mesogenic or liquid crystalline. More preferably the LC material comprises one or more additional compounds selected from reactive mesogens (RMs), most preferably selected from mono- and direactive RMs, which are commonly known by the skilled person.

In a further preferred embodiment the cholesteric polymerizable LC material optionally comprises one or more additives selected from the group consisting of polymerisation initiators, antioxidants, surfactants, stabilisers, catalysts, sensitizers, inhibitors, chain-transfer agents, co-reacting monomers, reactive thinners, surface-active compounds, lubricating agents, wetting agents, dispersing agents, hydrophobing agents, adhesive agents, flow improvers, degassing or defoaming agents, deaerators, diluents, reactive diluents, auxiliaries, colourants, dyes, pigments and/or nanoparticles.

In a preferred embodiment the cholesteric polymerizable LC material is dissolved in a suitable solvent, which are preferably selected from organic solvents.

The solvents are preferably selected from ketones such as acetone, methyl ethyl ketone, methyl propyl ketone, methyl isobutyl ketone, 2-pentanone, 3-pentanone, cyclopentanone or cyclohexanone; acetates such as methyl, ethyl or butyl acetate or methyl acetoacetate; alcohols such as methanol, ethanol or isopropyl alcohol; aromatic solvents such as toluene, anisole, 3-phenoxytoluene, cyclohexyl benzene, phenyl naphthalene or xylene; alicyclic hydrocarbons such as cyclopentane or cyclohexane; halogenated hydrocarbons such as di- or trichloromethane; glycols or their esters such as PGMEA (propyl glycol monomethyl ether acetate), γ-butyrolactone, PGME (propyl glycol methyl ether), EGBE (ethylene glycol butyl ether). It is also possible to use binary, ternary or higher mixtures of the above solvents. In particular, for multilayer applications, methyl iso butyl ketone, 3-pentanone, toluene, anisole or EGBE is the preferred utilized solvent system, either as a blend or separately.

In case the cholesteric polymerizable LC material contains one or more solvents, the total concentration of all solids, including the RMs, in the solvent(s) is preferably from 10 to 60%, more preferably from 20 to 50%, in particular from 30 to 45% The instant invention relates further to process for the production of the cholesteric polymerizable LC material, comprising the steps of mixing one or more compounds of formula A and/or B, with one or more chiral compounds.

The instant invention also relates to a process to convert the cholesteric polymerizable LC material into a cholesteric polymer film comprising the steps of

- providing a layer of a cholesteric polymerizable LC material as described above onto a substrate,
- polymerising the cholesteric polymerizable LC material by photopolymerisation, and
- optionally removing the polymer film from the substrate and/or optionally providing it onto another substrate.

Accordingly, the invention further relates a to polymer film obtainable from the cholesteric polymerizable LC material comprising one or more compounds of formula A and/or B, and one or more chiral compounds.

The polymerizable LC material can be coated or printed onto the substrate, for example by spin-coating, printing, or other known techniques, and the solvent is evaporated off before polymerization. In most cases, it is suitable to heat the mixture in order to facilitate the evaporation of the solvent.

The polymerizable LC material can be applied onto a substrate by conventional coating techniques like spin coating, bar coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

Suitable substrate materials and substrates are known to the expert and described in the literature, as for example conventional substrates used in the optical films industry, such as glass or plastic. Especially suitable and preferred substrates for polymerization are polyester such as polyethyleneterephthalate (PET) or polyethylenenaphthalate (PEN), polyvinylalcohol (PVA), polycarbonate (PC) triacetylcellulose (TAC), or cyclo olefin polymers (COP), or commonly known color filter materials, in particular triacetylcellulose (TAC), cyclo olefin polymers (COP), or commonly known colour filter materials or even on transparent electrode materials of an OLED.

In a preferred embodiment polymerizable LC material can be applied onto transparent electrode materials of an OLED or onto a quarter wave plate as described above.

The polymerizable LC material preferably exhibits a uniform alignment throughout the whole layer. Preferably the polymerizable LC material exhibits a uniform planar or a uniform homeotropic alignment.

The Friedel-Creagh-Kmetz rule can be used to predict whether a mixture will adopt planar or homeotropic alignment, by comparing the surface energies of the RM layer ($\gamma_{RM}$) and the substrate ($\gamma_s$):

If $\gamma_{RM}>\gamma_s$ the reactive mesogenic compounds will display homeotropic alignment, If $\gamma_{RM}<\gamma_s$ the reactive mesogenic compounds will display homogeneous alignment.

Without to be bound by theory, when the surface energy of a substrate is relatively low, the intermolecular forces between the reactive mesogens are stronger than the forces across the RM-substrate interface and consequently, reactive mesogens align perpendicular to the substrate (homeotropic alignment) in order to maximise the intermolecular forces.

Homeotropic alignment can also be achieved by using amphiphilic materials; they can be added directly to the polymerizable LC material, or the substrate can be treated with these materials in the form of a homeotropic alignment layer. The polar head of the amphiphilic material chemically bonds to the substrate, and the hydrocarbon tail points perpendicular to the substrate. Intermolecular interactions between the amphiphilic material and the RMs promote homeotropic alignment. Commonly used amphiphilic surfactants are described above.

Another method used to promote homeotropic alignment is to apply corona discharge treatment to plastic substrates, generating alcohol or ketone functional groups on the substrate surface. These polar groups can interact with the polar groups present in RMs or surfactants to promote homeotropic alignment.

When the surface tension of the substrate is greater than the surface tension of the RMs, the force across the interface dominates. The interface energy is minimised if the reactive mesogens align parallel with the substrate, so the long axis of the RM can interact with the substrate. One way planar alignment can be promoted is by coating the substrate with a polyimide layer, and then rubbing the alignment layer with a velvet cloth.

Other suitable planar alignment layers are known in the art, like for example rubbed polyimide or alignment layers prepared by photoalignment as described in U.S. Pat. Nos. 5,602,661, 5,389,698 or 6,717,644.

In general, reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A further review of alignment materials and techniques is given by J. Cognard, Mol. Cryst. Liq. Cryst. 78, Supplement 1 (1981), pages 1-77.

For the production of the polymer films according to the invention, the polymerizable compounds in the cholesteric polymerizable LC material is polymerized or crosslinked (if one compound contains two or more polymerizable groups) by in-situ photopolymerization.

The photopolymerization can be carried out in one step. It is also possible to photopolymerize or crosslink the compounds in a second step, which have not reacted in the first step ("end curing").

In a preferred method of preparation, the polymerizable LC material is coated onto a substrate and subsequently photopolymerized for example by exposure to actinic radiation as described for example in WO 01/20394, GB 2,315,072 or WO 98/04651.

Photopolymerization of the LC material is preferably achieved by exposing it to actinic radiation. Actinic radiation means irradiation with light, like UV light, IR light or visible light, irradiation with X-rays or gamma rays, or irradiation with high-energy particles, such as ions or electrons. Preferably, polymerization is carried out by photo irradiation, in particular with UV light. As a source for actinic radiation, for example a single UV lamp or a set of UV lamps can be used. When using a high lamp power, the curing time can be reduced. Another possible source for photo radiation is a laser, like e.g. a UV laser, an IR laser, or a visible laser. Another possible source for photo radiation is a LED lamp.

The curing time is dependent, inter alia, on the reactivity of the polymerizable LC material, the thickness of the coated layer, the type of polymerization initiator and the power of the UV lamp. The curing time is preferably ≤5 minutes, very preferably ≤3 minutes, most preferably ≤1 minute. For mass production, short curing times of ≤30 seconds are preferred.

A suitable UV radiation power is preferably in the range from 5 to 200 mWcm-2, more preferably in the range from 50 to 175 $mWcm^{-2}$ and most preferably in the range from 100 to 150 $mWcm^{-2}$.

In connection with the applied UV radiation and as a function of time, a suitable UV dose is preferably in the range from 25 to 7200 $mJcm^{-2}$ more preferably in the range from 100 to 7200 $mJcm^{-2}$ and most preferably in the range from 200 to 7200 $mJcm^{-2}$.

Photopolymerization is preferably performed under an inert gas atmosphere, preferably in a heated nitrogen atmosphere, but also polymerization in air is possible.

Photopolymerization is preferably performed at a temperature from 1 to 70° C., more preferably 5 to 50° C., even more preferably 15 to 30° C.

The polymerized LC film according to the present invention has good adhesion to plastic substrates, in particular to TAC, COP, and colour filters. Accordingly, it can be used as adhesive or base coating for subsequent LC layers which otherwise would not well adhere to the substrates.

The present invention is described above and below with particular reference to the preferred embodiments. It should be understood that various changes and modifications might be made therein without departing from the spirit and scope of the invention.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se but are not mentioned here.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following working examples, which are illustrative only and do not limit the scope of the invention.

EXAMPLES

The following cholesteric polymerizable LC mixtures are prepared as indicated in the following tables:

RMM-1

| Compound | Amount %-w/w |
|---|---|
| Irganox ® 1076 | 0.08 |
| Tego Rad ® 2500 | 0.05 |
| Darocure ® TPO | 1.00 |
| 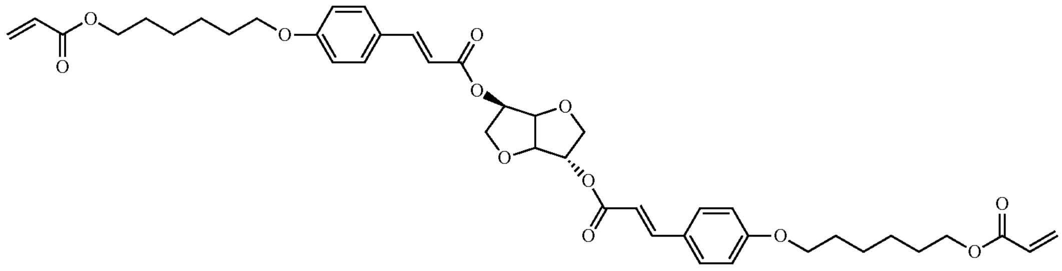 [SMILES: C=CC(=O)OCCCCCCOc1ccc(/C=C/C(=O)O[C@H]2COC3C2OC[C@H]3OC(=O)/C=C/c2ccc(OCCCCCCOC(=O)C=C)cc2)cc1] | 8.00 |
| 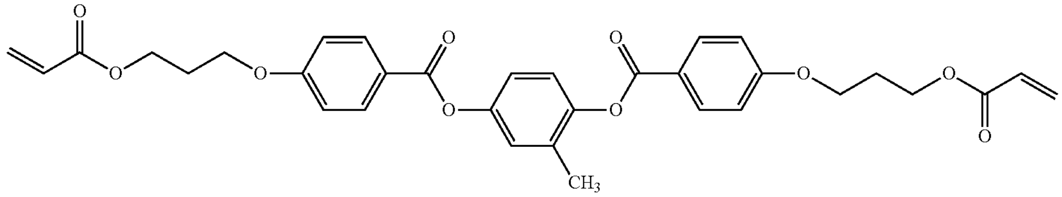 [SMILES: C=CC(=O)OCCCOc1ccc(C(=O)Oc2ccc(OC(=O)c3ccc(OCCCOC(=O)C=C)cc3)c(C)c2)cc1] | 18.61 |
| 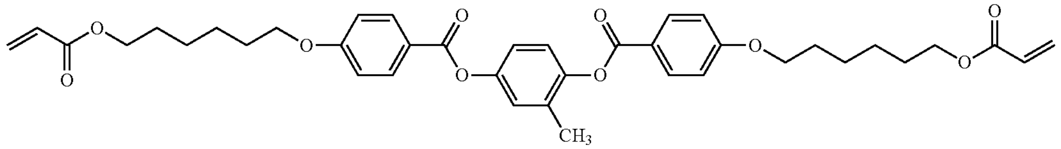 [SMILES: C=CC(=O)OCCCCCCOc1ccc(C(=O)Oc2ccc(OC(=O)c3ccc(OCCCCCCOC(=O)C=C)cc3)c(C)c2)cc1] | 72.26 |

Irganox ® 1076 is comercially available from BASF, Germany
Tego Rad ® 2500 is comercially available from TEGO, Germany
Darocure ® TPO is commercially available from BASF, Germany

RMM-2

| Compound | Amount %-w/w |
|---|---|
| Irganox ® 1076 | 0.08 |
| Tego Rad ® 2500 | 0.05 |
| Darocure ® TPO | 1.00 |
| 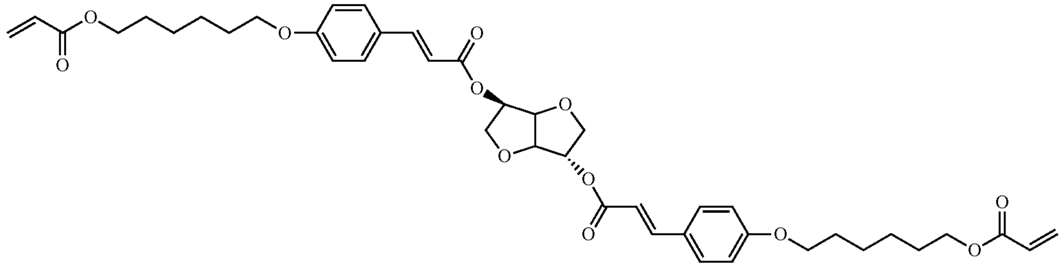 [SMILES: C=CC(=O)OCCCCCCOc1ccc(/C=C/C(=O)O[C@H]2COC3C2OC[C@H]3OC(=O)/C=C/c2ccc(OCCCCCCOC(=O)C=C)cc2)cc1] | 8.00 |
| 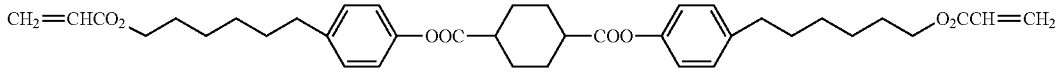 | 20.00 |

-continued
| RMM-2 | |
|---|---|
| Compound | Amount %-w/w |
| 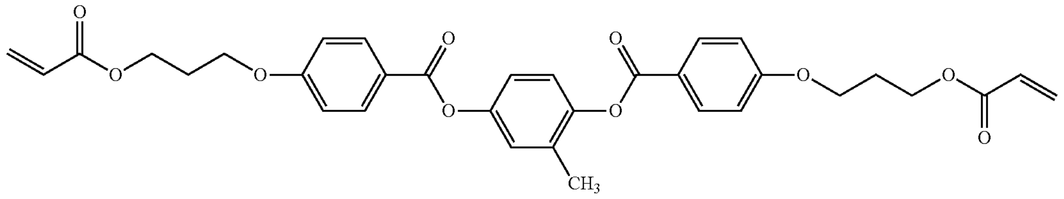 [SMILES: C=CC(=O)OCCCOc1ccc(C(=O)Oc2ccc(OC(=O)c3ccc(OCCCOC(=O)C=C)cc3)c(C)c2)cc1] | 56.35 |
| 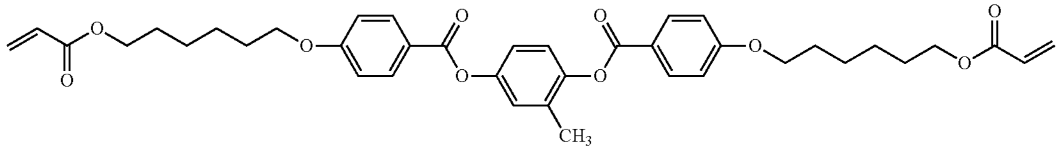 [SMILES: C=CC(=O)OCCCCCCOc1ccc(C(=O)Oc2ccc(OC(=O)c3ccc(OCCCCCCOC(=O)C=C)cc3)c(C)c2)cc1] | 14.52 |
Irganox ® 1076 is comercially available from BASF, Germany
Tego Rad ® 2500 is comercially available from TEGO, Germany
Darocure ® TPO is commercially available from BASF, Germany
| RMM-3 | |
|---|---|
| Compound | Amount %-w/w |
| Irganox ® 1076 | 0.08 |
| Tego Rad ® 2500 | 0.05 |
| Darocure ® TPO | 1.00 |
| 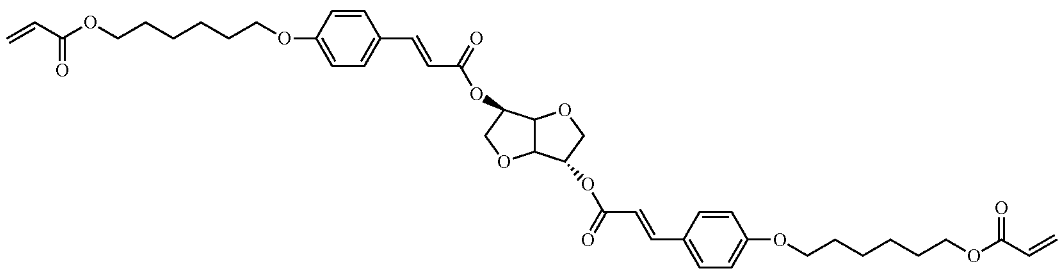 [SMILES: C=CC(=O)OCCCCCCOc1ccc(/C=C/C(=O)O[C@H]2COC3C2OC[C@H]3OC(=O)/C=C/c2ccc(OCCCCCCOC(=O)C=C)cc2)cc1] | 8.00 |
| 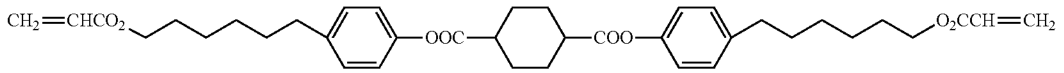 | 20.00 |
| 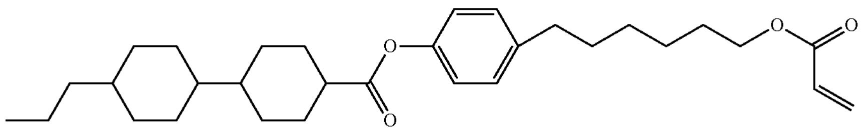 [SMILES: C=CC(=O)OCCCCCCc1ccc(OC(=O)C2CCC(C3CCC(CCC)CC3)CC2)cc1] | 20.00 |
| 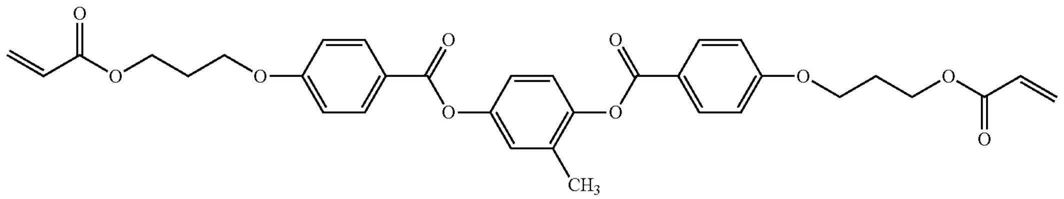 [SMILES: C=CC(=O)OCCCOc1ccc(C(=O)Oc2ccc(OC(=O)c3ccc(OCCCOC(=O)C=C)cc3)c(C)c2)cc1] | 40.45 |

-continued

RMM-3

| Compound | Amount %-w/w |
|---|---|
| 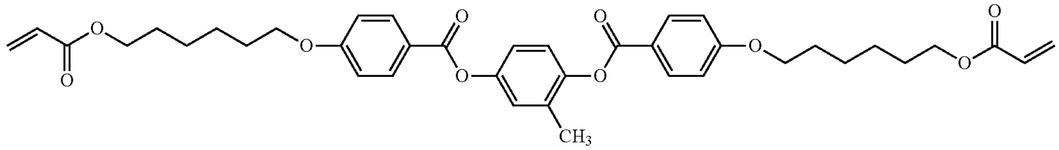 [SMILES: C=CC(=O)OCCCCCCOc1ccc(C(=O)Oc2ccc(OC(=O)c3ccc(OCCCCCCOC(=O)C=C)cc3)c(C)c2)cc1] | 10.42 |

Irganox ® 1076 is comercially available from BASF, Germany
Tego Rad ® 2500 is comercially available from TEGO, Germany
Darocure ® TPO is commercially available from BASF, Germany

RMM-4

| Compound | Amount %-w/w |
|---|---|
| Irganox ® 1076 | 0.08 |
| Tego Rad ® 2500 | 0.05 |
| Darocure ® TPO | 1.00 |
| 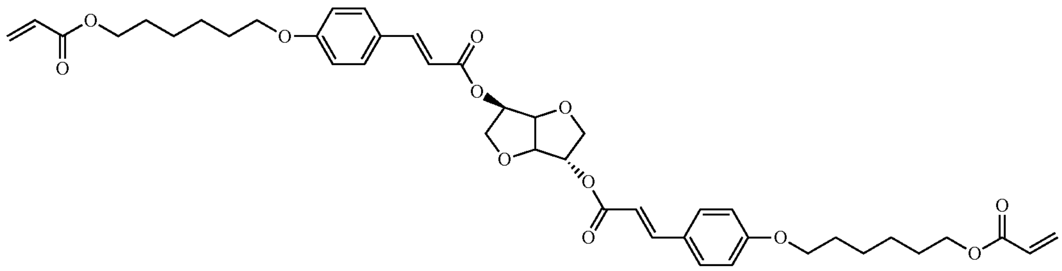 [SMILES: C=CC(=O)OCCCCCCOc1ccc(/C=C/C(=O)O[C@H]2COC3C2OC[C@H]3OC(=O)/C=C/c2ccc(OCCCCCCOC(=O)C=C)cc2)cc1] | 6.50 |
| 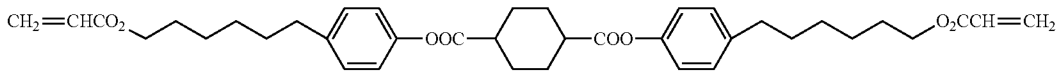 | 20.00 |
| 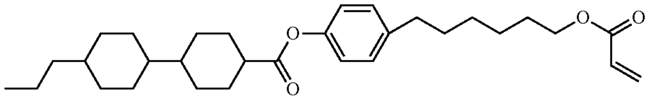 [SMILES: C=CC(=O)OCCCCCCc1ccc(OC(=O)C2CCC(C3CCC(CCC)CC3)CC2)cc1] | 20.00 |
| 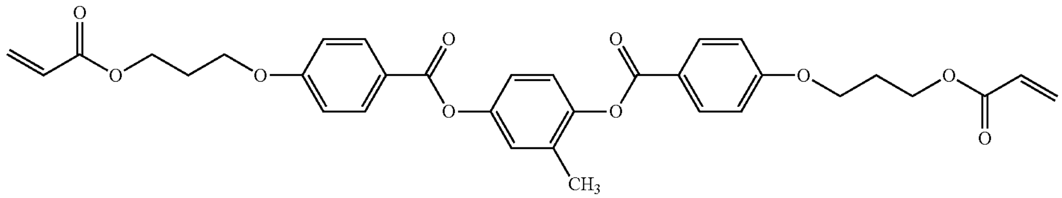 [SMILES: C=CC(=O)OCCCOc1ccc(C(=O)Oc2ccc(OC(=O)c3ccc(OCCCOC(=O)C=C)cc3)c(C)c2)cc1] | 41.95 |
| 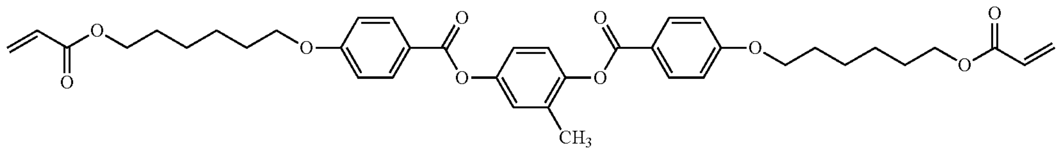 [SMILES: C=CC(=O)OCCCCCCOc1ccc(C(=O)Oc2ccc(OC(=O)c3ccc(OCCCCCCOC(=O)C=C)cc3)c(C)c2)cc1] | 10.42 |

Irganox ® 1076 is comercially available from BASF, Germany
Tego Rad ® 2500 is comercially available from TEGO, Germany
Darocure ® TPO is commercially available from BASF, Germany RMM-5
| Compound | Amount %-w/w |
|---|---|
| Irganox ® 1076 | 0.08 |
| Tego Twin ® 4200 | 0.50 |
| Irgacure ® 907 | 5.00 |
| 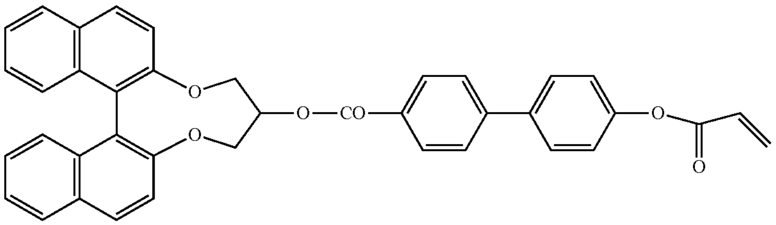 [SMILES: C=CC(=O)Oc1ccc(-c2ccc(C(=O)OC3COc4ccc5ccccc5c4-c4c(ccc5ccccc45)OC3)cc2)cc1] | 3.92 |
| 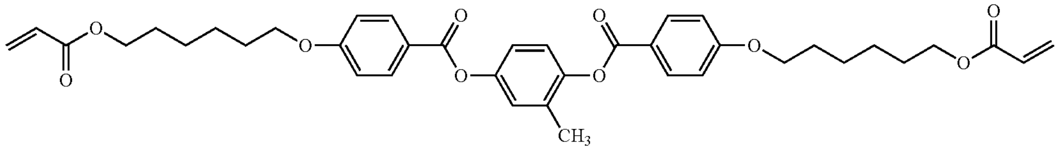 [SMILES: C=CC(=O)OCCCCCCOc1ccc(C(=O)Oc2ccc(OC(=O)c3ccc(OCCCCCCOC(=O)C=C)cc3)c(C)c2)cc1] | 11.50 |
| 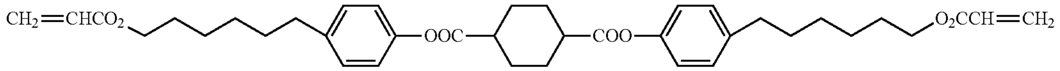 | 38.00 |
| 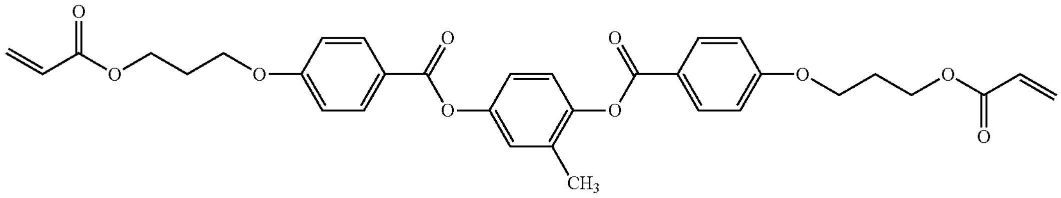 [SMILES: C=CC(=O)OCCCOc1ccc(C(=O)Oc2ccc(OC(=O)c3ccc(OCCCOC(=O)C=C)cc3)c(C)c2)cc1] | 41.00 |
Irganox ® 1076 is comercially available from BASF, Germany
Tego Twin ® 4200 is comercially available from TEGO, Germany
Irgacure ® 907 is commercially available from BASF, Germany
RMM-6
| Compound | Amount %-w/w |
|---|---|
| Irganox ® 1076 | 0.08 |
| Tego Twin ® 4200 | 0.50 |
| Irgacure ® 907 | 5.00 |
| 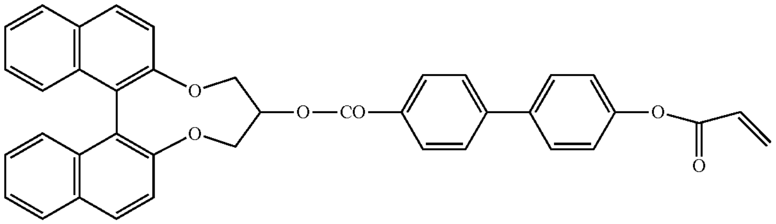 [SMILES: C=CC(=O)Oc1ccc(-c2ccc(C(=O)OC3COc4ccc5ccccc5c4-c4c(ccc5ccccc45)OC3)cc2)cc1] | 3.92 |
| 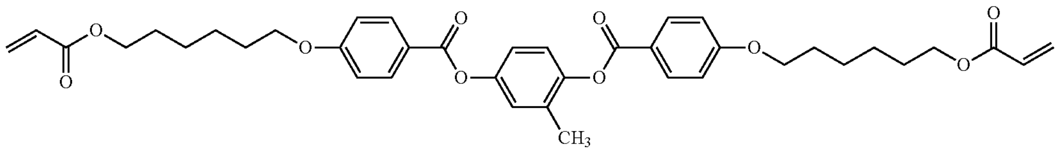 [SMILES: C=CC(=O)OCCCCCCOc1ccc(C(=O)Oc2ccc(OC(=O)c3ccc(OCCCCCCOC(=O)C=C)cc3)c(C)c2)cc1] | 11.50 |

-continued

RMM-6

| Compound | Amount %-w/w |
|---|---|
| 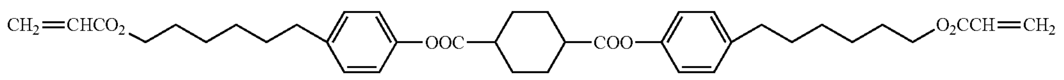 | 38.00 |
| 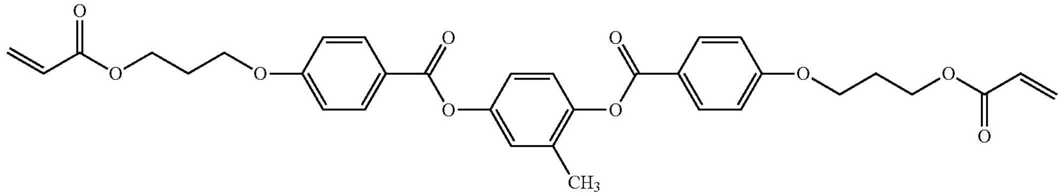 [SMILES: C=CC(=O)OCCCOc1ccc(C(=O)Oc2ccc(OC(=O)c3ccc(OCCCOC(=O)C=C)cc3)c(C)c2)cc1] | 41.00 |

Irganox ® 1076 is 126 commercially available from BASF, Germany
Tego Twin ® 4200 is 1260mmercially available from TEGO, Germany
Irgacure ® 907 is 1260mmercially available from BASF, Germany

RMM-7

| Compound | Amount %-w/w |
|---|---|
| Tego Rad ® 2500 | 0.03 |
| Irgacure ® 651 | 1.74 |
| 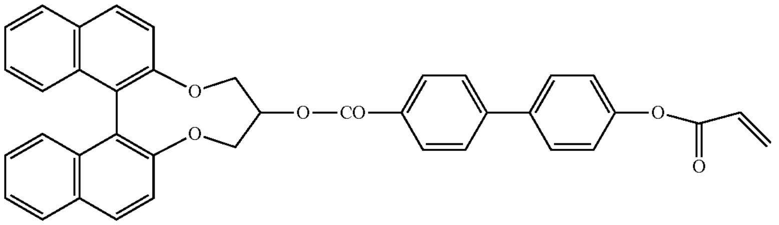 [SMILES: C=CC(=O)Oc1ccc(-c2ccc(C(=O)OC3COc4ccc5ccccc5c4-c4c(ccc5ccccc45)OC3)cc2)cc1] | 4.75 |
| 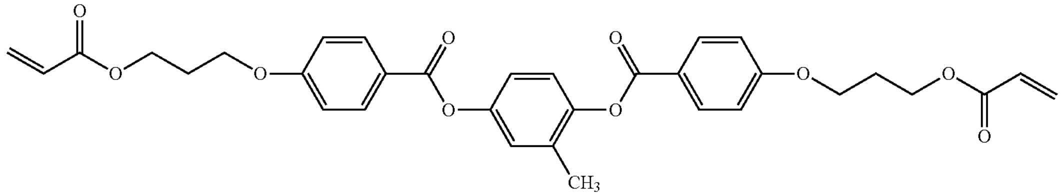 [SMILES: C=CC(=O)OCCCOc1ccc(C(=O)Oc2ccc(OC(=O)c3ccc(OCCCOC(=O)C=C)cc3)c(C)c2)cc1] | 32.50 |
| 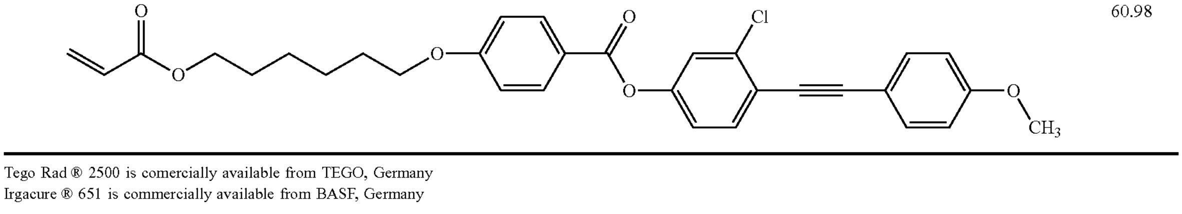 | 60.98 |

Tego Rad ® 2500 is comercially available from TEGO, Germany
Irgacure ® 651 is commercially available from BASF, Germany The mixtures RMM 1, 2, 3, 5, and 7 are dissolved in to 40% solids in Toluene and the mixtures RMM 4 and 6 are dissolved in to 40% solids in Cyclohexanone: 3-Phenoxytoluene (8:2).

Example 1

This example tests the change in reflection bandwidth between RMM 1-4. Smaller bandwidth is advantageous for this application to limit unwanted ambient light reflection. Therefore, RMM 1-4 are each spin-coated 1000 rpm on rubbed PI glasses, annealed at 90° C. for 60 s. followed by low power UV irradiation to photoisomerize chiral (10 mW $cm^{-2}$) for variable time in air atmosphere. The films are annealed at 90° C. for 60 s followed by high power UV irradiation to cure the polymer film (50 mW $cm^{-2}$) for 60 s in $N_2$ atmosphere, respectively.

| | | Before Low Power UV | | Low | After Low Power UV | |
|---|---|---|---|---|---|---|
| RMM | Film | Central λ [nm] | Band-width [nm] | Power UV Time [sec] | Central λ [nm] | Band-width [nm] |
| 1 | 1 | 381.8 | 52 | 2 | 443.9 | 63 |
| 2 | 2 | 393 | 49.7 | 1.7 | 449.1 | 57.4 |
| 3 | 3 | 395 | 43.4 | 0.8 | 451.3 | 51.8 |

| | | Before Low Power UV | | Low | After Low Power UV | |
|---|---|---|---|---|---|---|
| RMM | Film | Central λ [nm] | Band-width [nm] | Power UV Time [sec] | Central λ [nm] | Band-width [nm] |
| 1 | 1 | 381.8 | 52 | 3 | 475.6 | 81.2 |
| 2 | 2 | 393 | 49.7 | 2.8 | 478.2 | 60.4 |
| 3 | 3 | 395 | 43.4 | 1.7 | 481 | 58.4 |

From this data it is clear that the polymerizable cholesteric LC mixture in accordance with the present invention makes it possible to create very narrow bandwidth cholesteric polymer films.

Example 2

This experiment tests the effectiveness of a blue reflecting cholesteric polymer film in a simplified display stack for extracting more light from the display. Therefore, RMM-5 is spin-coated at 1000 rpm on a rubbed PI glass substrate and annealed at 72° C. for 60 s. The film is cured using Hoenle UVA Cube 2000 lamp under $N_2$ at 50 $mWcm^{-2}$ for 5 s. A blue reflecting cholesteric polymer film (Film 4) is produced and confirmed via visual inspection.

The light intensity of an OLED is measured in three different stacks as given below, to determine the effectiveness of the blue reflecting cholesteric polymer film. Light intensity is measured using an Ocean Optics UV-2000 spectrometer coupled into an Olympus microscope (5× objective.) The OLED is driven using a standard lab power supply at 4V. In this experiment the OLED device is a bottom-emission device. The utilized circular polarizers correspond to an industry standard circular polarizer.

| Stack | OLED | Film | Circular Polarizer | Light intensity, normalized [%] | λ [nm] |
|---|---|---|---|---|---|
| 1 | blue | – | – | 100 | 485 |
| 2 | blue | – | + | 35 | 485 |
| 3 | blue | Film 4 | + | 61 | 485 |

From this data, it is clear that including a blue reflecting cholesteric polymer film can significantly increase the efficiency of the Blue OLED in a bottom emission OLED device.

Example 3

This experiment tests the effectiveness of the blue reflecting cholesteric polymer film obtained from a polymerizable cholesteric LC mixture in accordance with the instant application in a simplified display stack for extracting more light from the display. RMM-7 is spin-coated at 1000 rpm on rubbed PI glass substrates and annealed at 90° C. for 60 s. The film cured using Hoenle UVA Cube 2000 lamp under $N_2$ at 50 $mWcm^{-2}$ for 5 s A blue reflecting cholesteric polymer film (Film 2) is produced and confirmed via visual inspection.

The light intensity of an OLED is measured in three different stacks as given below, to determine the effectiveness of the blue reflecting cholesteric polymer film. Light intensity is measured using an Ocean Optics UV-2000 spectrometer coupled into an Olympus microscope (5× objective.) The OLED is driven using a standard lab power supply at 4V. In this experiment the OLED device is a top-emission device. The utilized circular polarizers correspond to industry standard.

| Stack | OLED | Film | Circular Polarizer | Light intensity, normalized [%] | λ [nm] |
|---|---|---|---|---|---|
| 4 | blue | – | – | 100 | 460 |
| 5 | blue | – | + | 43 | 460 |
| 6 | blue | Film 5 | + | 58 | 460 |

Example 4

This experiment determines whether the increase in reflectivity when using a CLC film as part of the OLED display stack can be mitigated by reducing the area covered by visible reflective CLC. Different CLC films are prepared with varying area covered by blue CLC.

Film Coating Method for Film 6

This film is patterned using a photoisomerizable chiral and a masked, low dose, first irradiation step. This photoisomerizable chiral changes HTP depending on UV dose. In the unmasked areas where the initial, low dose UV hits the film, the HTP is changed and the CLC reflection band shifts from the UV to the blue. This has the effect of having a non-visible reflecting area and a visible reflecting area within a single homogenous film. RMM-1 is spin-coated at 1000 rpm on rubbed PI glass substrates, annealed at 90° C. for 60 s and cooled to room temperature. The film is cured under 1 mm striped mask at 30 $mWcm^{-2}$ for 2.5 s in air atmosphere using a Model 200 mask aligner from OAI, once again annealed at 90° C. for 60 s and subsequently cured without mask at 50 $mWcm^{-2}$ for 5 s in $N_2$ atmosphere using Honle UVA Cube 2000 lamp. A striped blue/clear cholesteric polymer film (Film 3-50% coverage) is produced and confirmed via visual inspection.

Film Coating Method for Film 7

This film is patterned using an inkjet print method. The print pattern was 320 μm×135 μm rectangle shapes with a unit area of 10% area covered by CLC. RMM-6 is printed using PiXDRO LP50 printer at 1000 dpi on a PI glass substrate and annealed at 72° C. for 120 s. The film is cured using Hoenle UVA Cube 2000 lamp under $N_2$ at 50 mWcm$^{-2}$ for 5 s.

A series of small blue reflecting cholesteric polymer film "pixels" are produced and confirmed via visual inspection.

The reflectivity of the OLED is measured in the following different stacks to determine detrimental effectiveness of the blue CLC and whether this detrimental effect is mitigated with patterning. Light intensity is measured using an Ocean Optics UV-2000 spectrometer coupled into an Olympus microscope (5× objective.) The light is generated from the microscope reflection light source. The baseline was as follows 100%; OLED substrate (OLED not emitting), 0%; Shutter closed to detector

| Stack | Film | CLC Coverage [%] | Circular Polarizer | OLED Reflectivity, normalized [%] | I [nm] |
|---|---|---|---|---|---|
| 1 | – | 0 | – | 100 | 475 |
| 2 | – | 0 | + | 7.0 | 475 |
| 3 | Film 4 | 100 | + | 25.4 | 475 |
| 7 | Film 6 | 50 | + | 20.5 | 475 |
| 8 | Film 7 | 10 | + | 7.5 | 475 |

From this data, it is clear that reducing the area covered by the blue reflective CLC reduces the ambient light reflections. The smaller the area covered by blue CLC, the closer the reflectivity gets to the Stack 2 value.

Example 5

This experiment tests the effectiveness of a blue CLC in a simplified display stack for extracting more light from the display.

Therefore, RMM-3 is spin-coated at 1000 rpm on rubbed PI glass substrates and annealed at 90° C. for 60 s, followed by a Low power UV irradiation to photoisomerize chiral (10 mW cm$^{-2}$) for 1.7 s in air atmosphere. The film is annealed at 90° C. for 60 s and subsequently irradiated with High power UV to cure the CLC film (50 mW cm$^{-2}$) for 60 s in $N_2$ atmosphere, resulting in UV reflective cholesteric film before the low power UV step and blue reflective cholesteric film after low power UV step, which is confirmed via visual inspection.

The light intensity of the OLED is measured in three different stacks to determine the effectiveness of the blue CLC. The light intensity is measured using an Ocean Optics UV-2000 spectrometer coupled into an Olympus microscope (5× objective.) The OLED is driven using a standard lab power supply at 4V. In this case the OLED device is a bottom-emission device.

| Stack | Film | CLC Coverage [%] | Circular Polarizer | OLED Reflectivity, normalized [%] | I [nm] |
|---|---|---|---|---|---|
| 1 | – | 0 | – | 100 | 490 |
| 2 | – | 0 | + | 34.5 | 490 |
| 9 | Film 8 | 100 | + | 62.1 | 490 |

From this data, it is clear that including a blue CLC can significantly increase the efficiency of the Blue OLED in a bottom emission OLED device.

Example 6

This experiment tests the effectiveness of a blue CLC in a simplified display stack for extracting more light from the display. Therefore RMM-3 is spin-coated on at 1000 rpm on rubbed PI glass substrate, annealed at 90° C. for 60 s and irradiated with Low power UV to photoisomerize chiral (10 mW cm$^{-2}$) for 0.8 s in air atmosphere, followed by annealing at 90° C. for 60 s and subsequent irradiation with High power UV to cure CLC film (50 mW cm$^{-2}$) for 60 s in $N_2$ atmosphere.

A UV cholesteric film is produced before the low power UV step and blue cholesteric film is produced after low power UV step, which is confirmed via visual inspection.

The light intensity of the OLED is measured in three different stacks to determine the effectiveness of the blue CLC. Light intensity is measured using an Ocean Optics UV-2000 spectrometer coupled into an Olympus microscope (5× objective.) The OLED is driven using a standard lab power supply at 4V. In this case the OLED device is a top-emission device.

| Stack | Film | CLC Coverage [%] | Circular Polarizer | OLED Reflectivity, normalized [%] | λ [nm] |
|---|---|---|---|---|---|
| 4 | – | 0 | – | 100 | 460 |
| 5 | – | 0 | + | 42.9 | 460 |
| 10 | Film 9 | 100 | + | 58.5 | 460 |

Experiment 7

This experiment determines whether the increase in reflectivity when using a CLC film as part of the OLED display stack can be mitigated by reducing the area covered by visible reflective CLC. Different CLC films are prepared with varying area covered by blue CLC.

Film Coating Method for Film 10

This film is patterned using a photoisomerizable chiral and a masked, low dose, first irradiation step. This photoisomerizable chiral changes HTP depending on UV dose. In the unmasked areas where the initial, low dose UV hits the film, the HTP is changed and the CLC reflection band shifts from the UV to the blue. This has the effect of having a non-visible reflecting area and a visible reflecting area within a single homogenous film. RMM-3 is spin-coated at 1000 rpm on rubbed PI glass substrates, annealed at 90° C. for 60 s and cooled to room temperature. The film is cured under 1 mm striped mask at 10 mWcm$^{-2}$ for 1.7 s in air atmosphere using a Model 200 mask aligner from OAI, once again annealed at 90° C. for 60 s and subsequently cured without mask at 50 mWcm$^{-2}$ for 5 s in $N_2$ atmosphere using Heonle UVA Cube 2000 lamp. A striped blue/clear cholesteric polymer film (Film 3-50% coverage) is produced and confirmed via visual inspection.

Film Coating Method for Film 11

This film is patterned using an inkjet print method. The print pattern was 320 μm×135 μm rectangle shapes with a unit area of 10% area covered by CLC. RMM-4 is printed using PiXDRO LP50 printer at 1000 dpi on a PI glass substrate and annealed at 72° C. for 120 s. The film is cured using Hoenle UVA Cube 2000 lamp under $N_2$ at 50 $mWcm^{-2}$ for 5 s.

A series of small blue reflecting cholesteric polymer film "pixels" are produced and confirmed via visual inspection.

The reflectivity of the OLED is measured in the following different stacks to determine detrimental effectiveness of the blue CLC and whether this detrimental effect is mitigated with patterning. Light intensity is measured using an Ocean Optics UV-2000 spectrometer coupled into an Olympus microscope (5× objective.) The light is generated from the microscope reflection light source. The baseline was as follows 100%; OLED substrate (OLED not emitting), 0%; Shutter closed to detector

| Stack | Film | CLC Coverage [%] | Circular Polarizer | OLED Reflectivity, normalized [%] | I [nm] |
|---|---|---|---|---|---|
| 1 | – | 0 | – | 100 | 475 |
| 2 | – | 0 | + | 7.0 | 475 |
| 10 | Film 9 | 100 | + | 58.2 | 475 |
| 11 | Film 10 | 50 | + | 20.5 | 475 |
| 12 | Film 11 | 10 | + | 7.5 | 475 |

From this data, it is clear that reducing the area covered by the blue reflective CLC reduces the ambient light reflections. The smaller the area covered by blue CLC, the closer the reflectivity gets to the Stack 2 value.

The invention claimed is:

1. An optical component, comprising a linear polarizer, a quarter wave plate, and a patterned or structured light reflecting polymer film, the patterned or structured light reflecting polymer film comprising a cholesteric liquid crystal polymer, wherein the patterned light reflecting polymer film is a non-continuous film covering only a part of a whole area of one surface of the optical component, wherein less than 90% of the whole area of the one surface of the optical component is covered by the film, or wherein the structured light reflecting polymer film is a continuous film that exhibits distinct areas of different selective wavelength reflection throughout a continuous layer of the film.

2. The optical component according to claim 1, wherein the linear polarizer comprises a reflective polarizer or an absorptive polarizer.

3. The optical component according to claim 1, comprising a a quarter wave plate obtained or obtainable from one or more polymerizable liquid crystalline materials comprising one or more compounds of formula T, $$R^{T1}\text{-}(A^{T1}Z^{T1})_{m1}\text{-}G^{T1}\text{-}(Z^{T2}\text{-}A^{T2})_{m2}\text{-}R^{T2} \qquad T$$

wherein $R^{T1}$ and $R^{T2}$ each and independently from another denotes H or hydrocarbon group having 1 to 20 carbon atoms, the group may have a substituent group, any carbon atom may be substituted with a heteroatom, and at least one of $R^{T1}$ and $R^{T2}$ denotes P-Sp-, P denotes a polymerizable group Sp denotes a spacer group, $A^{T1}$ and $A^{T2}$ each and independently and in each occurrence denote a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, whereby these groups may be unsubstituted or may be substituted with one or more of substituent groups L, L denotes each and independently in each occurrence F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear alkyl group having 1 to 20 carbon atoms or a branched alkyl group having 3 to 20 carbon atoms, in which one —$CH_2$— or two or more non-adjacent —$CH_2$— may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted by F, or L may denote a group represented by P-Sp-, $Z^{T1}$ and $Z^{T2}$ each independently represent —O—, —S—, —$OCH_2$—, —$CH_2O$—, —$CH_2CH_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —$SCH_2$—, —$CH_2S$—, —$CF_2O$—, —$OCF_2$—, —$CF_2S$—, —$SCF_2$—, —CH═CH—COO—, —CH═CH—OCO—, —COO—CH═CH—, —OCO—CH═CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH═CH—, —N═N—, —CH═N—, —N═CH—, —CH═N—N═CH—, —CF═CF—, —C≡C—, a single bond, or a group represented by —$CR^{01}R^{02}O$— or —$OCR^{01}R^{02}$—, $R^{01}$ and $R^{02}$ each independently represent a hydrogen atom, F, Cl, Br, I, or a linear alkyl group having 1 to 20 carbon atoms or a branched alkyl group having 3 to 20 carbon atoms, in which one —$CH_2$— or two or more non-adjacent —$CH_2$— may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted with F or Cl;

$G^{T1}$ denotes a group selected from formulae M-1 to M-9,

M-1

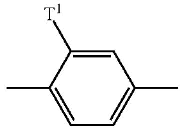

M-2

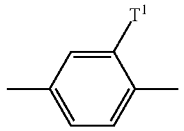

-continued

M-3

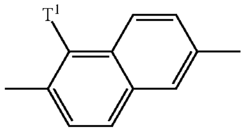

M-4

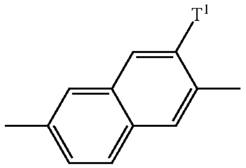

M-5

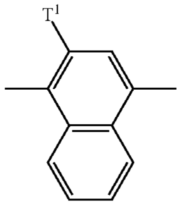

M-6

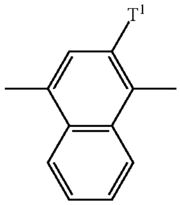

M-7

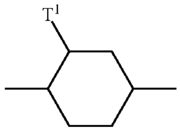

M-8

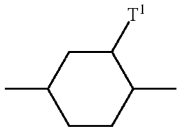

M-9

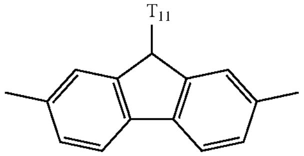

whereby these groups may be unsubstituted or substituted with one or more of the substituent groups L, $T^1$ denotes a group selected from formulae $T^{1-1}$ and $T^{1-2}$ below, $T^{1-1}$

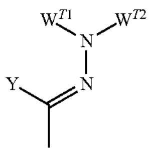

-continued $T^{1-2}$

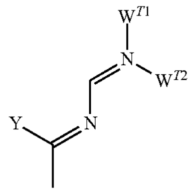

$W^{T1}$ denotes a group containing an aromatic group having 6 to 40 carbon atoms and/or a non-aromatic group having 1 to 40 carbon atoms, which may be substituted, the aromatic group may be a hydrocarbon ring or a heterocyclic ring, and the non-aromatic group may be a hydrocarbon group or a group in which any carbon atom in a hydrocarbon group is substituted with a heteroatom (provided that, oxygen atoms are not directly connected with each other), $W^{T2}$ denotes a hydrogen atom or a linear alkyl group having 1 to 20 carbon atoms or a branched alkyl group having 3 to 20 carbon atoms, in which one $—CH_2—$ or two or more non-adjacent $—CH_2—$ groups may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted with F, or $W^{T2}$ may denote a group of 2 to 30 carbon atoms, or a group of 6 to 30 carbon atoms having at least one aromatic group, and the group may be unsubstituted or may be substituted with one or more of substituent groups L, or $W^{T2}$ may denote a group by P-Sp-, Y denotes a hydrogen atom, F, Cl, Br, I, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms, in which one $—CH_2—$ or two or more non-adjacent $—CH_2—$ may be each independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and any hydrogen atom in the alkyl group may be substituted by F, or Y may represent a group represented by P-Sp-, m1 and m2 each independently represent an integer of 1 to 6, and/or one or more compounds of formula I,

I

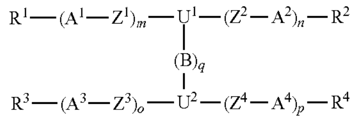

wherein $U^1$ and $U^2$ are independently of each other selected from

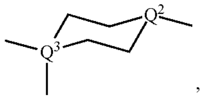 , 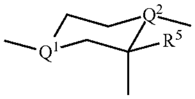 and

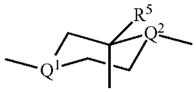

including their mirror images, wherein the rings $U^1$ and $U^2$ are each bonded to the group —$(B)_q$-via the axial bond, and one or two non-adjacent $CH_2$ groups in these rings are optionally replaced by O and/or S, and the rings $U^1$ and $U^2$ are optionally substituted by one or more groups L, $Q^1$ and $Q^2$ are independently of each other CH or SiH, $Q^3$ is C or Si, B is in each occurrence independently of one another —C≡C—, —$CY^1$═$CY^2$— or an optionally substituted aromatic or heteroaromatic group, $Y^1$ and $Y^2$ are independently of each other H, F, Cl, CN or $R^0$, q is an integer from 1 to 10, $A^1$ to $A^4$ are independently of each other, in each occurrence, selected from non-aromatic, aromatic or heteroaromatic carbocylic or heterocyclic groups, which are optionally substituted by one or more groups $R^5$, and wherein each of $-(A^1-Z^1)_m$—$U^1$—$(Z^2-A^2)_n$- and $-(A^3-Z^3)_o$—$U^2$—$(Z^4-A^4)_p$- does not contain more aromatic groups than non-aromatic groups, $Z^1$ to $Z^4$ are independently of each other, in each occurrence, —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_3$—, —$(CH_2)_4$—, —$CF_2CH_2$—, —$CH_2CF_2$—, —$CF_2CF_2$—, —CH═CH—, —$CY^1$═$CY^2$—, —CH═N—, —N═CH—, —N═N—, —CH═$CR^0$—, —C≡C—, —CH═CH—COO—, —OCO—CH═CH—, $CR^0R^{00}$ or a single bond, $R^0$ and $R^{00}$ are independently of each other H or alkyl with 1 to 12 C-atoms, m and n are independently of each other 0, 1, 2, 3 or 4, o and p are independently of each other 0, 1, 2, 3 or 4, $R^1$ to $R^5$ are independently of each other identical or different groups selected from H, halogen, —CN, —NC, —NCO, —NCS, —OCN, —SCN, —C(═O)$NR^0R^{00}$, —C(═O)$X^0$, —C(═O)$R^0$, —$NH_2$, —$NR^0R^{00}$, —SH, —$SR^0$, —$SO_3H$, —$SO_2R^0$, —OH, —$NO_2$, —$CF_3$, —$SF_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-, P is a polymerizable group, Sp is a spacer group or a single bond.

4. The optical component according to claim 1, wherein the quarter-wave plate is designed to have a retarded phase axis aligned in such a way that circularly polarized light transmitted by the polarizer and quarter wave plate rotates in a direction opposite to that of circularly polarized light to which the light reflecting polymer film exhibits selective reflection.

5. The optical component according to claim 1, wherein more than 3% of the whole area of one surface of the optical component is covered by the cholesteric LC polymer film.

6. The optical component according to claim 1, wherein the structured cholesteric LC polymer film exhibits a selective reflection wavelength of VIS light in the range from 350 nm to 500 nm.

7. The optical component according to claim 1, wherein the light reflecting polymer film exhibits areas having a selective wavelength reflection in the UV light and areas with selective wavelength reflection of VIS light.

8. The optical component according to claim 1, wherein less than 90% of the whole area of the cholesteric LC polymer film exhibits a selective wavelength reflection of VIS light.

9. The optical component according to claim 1, wherein more than 3% of the whole area of the cholesteric LC polymer film exhibit a selective wavelength reflection of VIS light.

10. The optical component according to claim 1, wherein the patterned cholesteric LC polymer film exhibits a selective reflection wavelength of VIS light in the range from 350 nm to 500 nm.

11. The optical component according to claim 1, comprising additionally an optical compensation layer.

12. An electrooptical device, comprising the optical component according to claim 1.

* * * * *